US010627933B2

(12) United States Patent
Kurasawa et al.

(10) Patent No.: US 10,627,933 B2
(45) Date of Patent: Apr. 21, 2020

(54) DISPLAY APPARATUS

(71) Applicant: Japan Display Inc., Tokyo (JP)

(72) Inventors: Hayato Kurasawa, Tokyo (JP);
Hiroshi Mizuhashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 74 days.

(21) Appl. No.: 15/287,075

(22) Filed: Oct. 6, 2016

(65) Prior Publication Data

US 2017/0108972 A1 Apr. 20, 2017

(30) Foreign Application Priority Data

Oct. 16, 2015 (JP) .................................. 2015-205086

(51) Int. Cl.
*G06F 3/041* (2006.01)
*G06F 3/046* (2006.01)
(Continued)

(52) U.S. Cl.
CPC ........ *G06F 3/0412* (2013.01); *G02F 1/13338* (2013.01); *G06F 3/03545* (2013.01);
(Continued)

(58) Field of Classification Search
CPC ............. G02F 1/13306; G02F 1/13338; G02F 1/134309; G02F 1/136286;
(Continued)

(56) References Cited

U.S. PATENT DOCUMENTS 5,854,881 A * 12/1998 Yoshida ................ G06F 3/0412
345/104
7,279,641 B2 * 10/2007 Shikina ............... G02F 1/13338
174/254
(Continued)

FOREIGN PATENT DOCUMENTS

JP   H08-50535 A   2/1996
JP   H10-49301 A   2/1998
(Continued)

OTHER PUBLICATIONS

Japanese Office Action dated Feb. 19, 2019 in corresponding Japanese Application No. 2015-205086.

*Primary Examiner* — Michael J Jansen, II
(74) *Attorney, Agent, or Firm* — K&L Gates LLP

(57) ABSTRACT

A display apparatus with a touch detection function that can improve detection characteristics is provided. The display apparatus includes: a pixel array having a plurality of pixels arranged in a matrix form; a plurality of signal lines arranged along each column in the pixel array, the signal lines supplying an image signal to a plurality of pixels arranged along the corresponding column; and a plurality of drive electrodes arranged in parallel with each other in the pixel array, the drive electrodes supplying a drive signal to the plurality of pixels in image display. When an externally-approaching object is detected by using a magnetic field, a coil clock signal for generating magnetic field is supplied to a first drive electrode arranged in the pixel array, and a magnetic field from the externally-approaching object is (Continued)

detected by second drive electrodes intersecting with the first drive electrode when seen in a plan view.

10 Claims, 35 Drawing Sheets

(51) Int. Cl.
    *G02F 1/1333* (2006.01)
    *G06F 3/0354* (2013.01)
    *G06F 3/044* (2006.01)

(52) U.S. Cl.
    CPC .............. *G06F 3/044* (2013.01); *G06F 3/046* (2013.01); *G06F 3/0416* (2013.01); *G06F 2203/04101* (2013.01); *G06F 2203/04105* (2013.01)

(58) Field of Classification Search
    CPC .......... G02F 2001/133302; G06F 2203/04101; G06F 2203/04105; G06F 3/03545; G06F 3/0412; G06F 3/044; G06F 3/046; G06F 3/0416
    See application file for complete search history.

(56) References Cited

U.S. PATENT DOCUMENTS

| | | | | |
|---|---|---|---|---|
| 7,755,616 B2* | 7/2010 | Jung | | G02F 1/13338 345/173 |
| 8,743,086 B2* | 6/2014 | Chen | | G06F 3/044 178/18.06 |
| 8,780,081 B2* | 7/2014 | Li | | G06F 3/046 345/173 |
| 8,890,828 B2* | 11/2014 | Yoo | | G06F 3/046 345/173 |
| 8,890,829 B2* | 11/2014 | Cho | | G06F 3/03545 345/173 |
| 8,933,897 B2* | 1/2015 | Liu | | G06F 3/0412 178/18.06 |
| 9,069,421 B2* | 6/2015 | Liu | | G06F 3/0412 |
| 9,256,320 B2* | 2/2016 | Katsuta | | G06F 3/0418 |
| 9,323,384 B2* | 4/2016 | Kim | | G06F 3/0416 |
| 9,389,737 B2* | 7/2016 | Lee | | G06F 3/044 |
| 9,459,722 B2* | 10/2016 | Pyun | | G06F 3/0412 |
| 9,612,702 B2* | 4/2017 | Jiang | | G06F 3/044 |
| 9,837,033 B2* | 12/2017 | Katsuta | | G06F 3/0418 |
| 9,904,432 B2* | 2/2018 | Choi | | G06F 3/047 |
| 9,965,121 B2* | 5/2018 | Teranishi | | G06F 3/044 |
| 9,990,069 B2* | 6/2018 | Yao | | G06F 3/0412 |
| 10,139,927 B2* | 11/2018 | Mizuhashi | | G06F 3/046 |
| 10,176,777 B2* | 1/2019 | Katsuta | | G06F 3/044 |
| 10,191,580 B2* | 1/2019 | Lee | | G06F 3/044 |
| 10,353,512 B2* | 7/2019 | Kurasawa | | G02F 1/13338 |
| 10,474,276 B2* | 11/2019 | Mizuhashi | | G06F 3/0416 |
| 2004/0189587 A1* | 9/2004 | Jung | | G02F 1/13338 345/102 |
| 2007/0117415 A1* | 5/2007 | Shikina | | G02F 1/13338 439/55 |
| 2007/0124515 A1* | 5/2007 | Ishikawa | | G06F 3/046 710/15 |
| 2007/0200487 A1* | 8/2007 | Uno | | G06F 3/046 313/500 |
| 2012/0154326 A1* | 6/2012 | Liu | | G06F 3/0412 345/174 |
| 2012/0154327 A1* | 6/2012 | Liu | | G06F 3/0412 345/174 |
| 2013/0155006 A1* | 6/2013 | Li | | G06F 3/044 345/174 |
| 2013/0181937 A1* | 7/2013 | Chen | | G06F 3/044 345/174 |
| 2014/0035838 A1* | 2/2014 | Yoo | | G06F 3/03545 345/173 |
| 2014/0055404 A1* | 2/2014 | Cho | | G06F 3/03545 345/174 |
| 2014/0078104 A1* | 3/2014 | Lee | | G06F 3/044 345/174 |
| 2014/0210752 A1* | 7/2014 | Katsuta | | G06F 3/0418 345/173 |
| 2015/0070297 A1* | 3/2015 | Mao | | G06F 3/046 345/174 |
| 2015/0091861 A1* | 4/2015 | Tanaka | | G06F 3/044 345/174 |
| 2015/0227254 A1* | 8/2015 | Kim | | G06F 3/0416 345/174 |
| 2015/0277633 A1* | 10/2015 | Jiang | | G06F 3/044 345/174 |
| 2015/0370388 A1* | 12/2015 | Choi | | G06F 3/047 345/173 |
| 2016/0118008 A1* | 4/2016 | Katsuta | | G09G 3/3648 345/174 |
| 2016/0147339 A1* | 5/2016 | Teranishi | | G06F 3/044 345/174 |
| 2016/0154511 A1* | 6/2016 | Yao | | G06F 3/0412 345/174 |
| 2016/0283033 A1* | 9/2016 | Lee | | G06F 3/044 |
| 2016/0306489 A1* | 10/2016 | Mizuhashi | | G06F 3/046 |
| 2016/0349921 A1* | 12/2016 | Mizuhashi | | G06F 3/046 |
| 2017/0269731 A1* | 9/2017 | Wang | | G06F 3/046 |
| 2018/0032173 A1* | 2/2018 | Kim | | G06F 3/044 |
| 2018/0061345 A1* | 3/2018 | Katsuta | | G06F 3/0418 |

FOREIGN PATENT DOCUMENTS

| | | |
|---|---|---|
| JP | 2005-352572 A | 12/2005 |
| JP | 2006-085488 A | 3/2006 |
| JP | 2006-085489 A | 3/2006 |
| JP | 2006-085490 A | 3/2006 |
| JP | 2006-163745 A | 6/2006 |
| JP | 2007-066248 A | 3/2007 |
| JP | 2007-115146 A | 5/2007 |
| JP | 2007-257619 A | 10/2007 |
| JP | 2014164770 | 9/2014 |
| JP | 2014167619 | 9/2014 |

\* cited by examiner

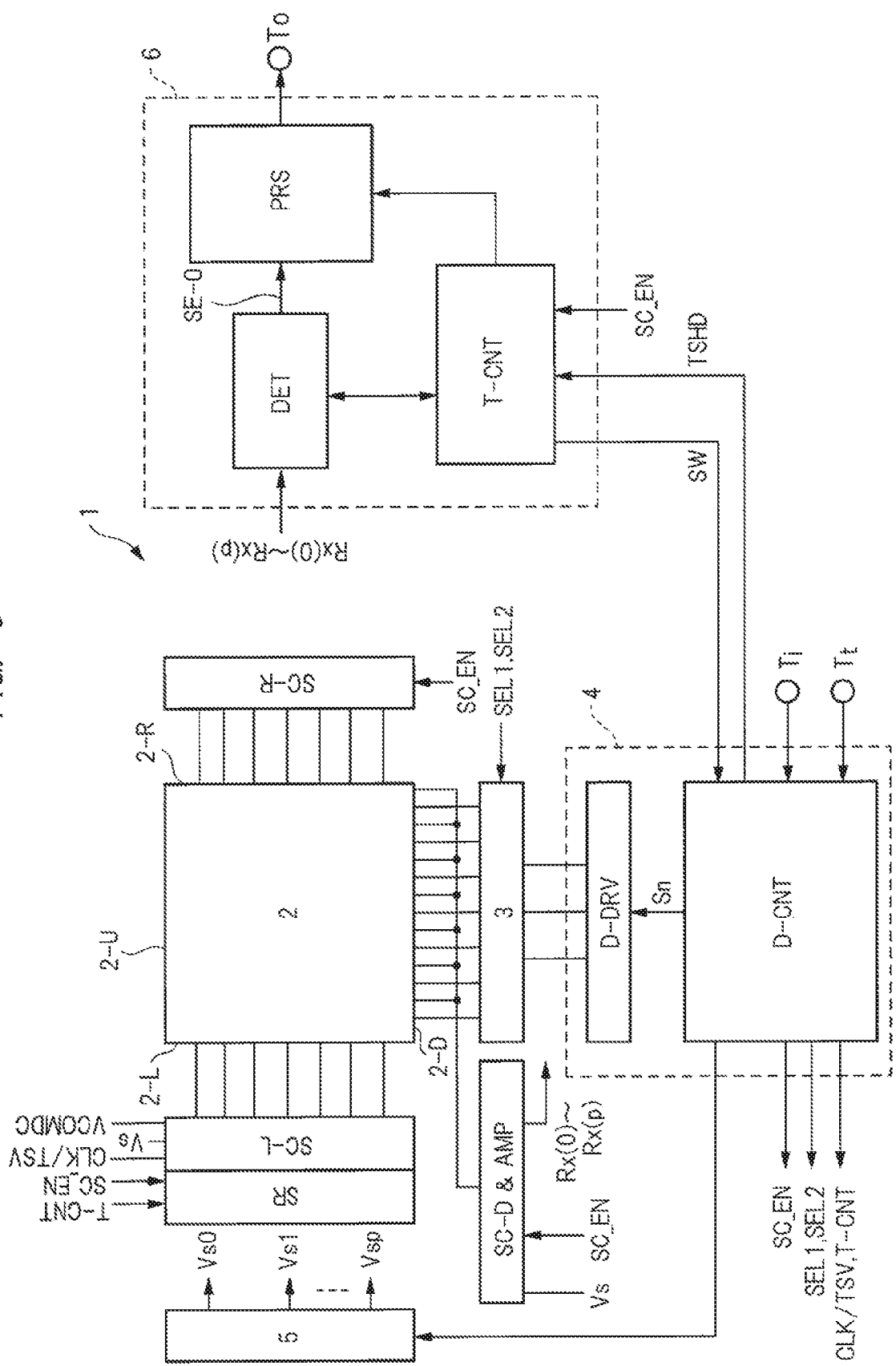

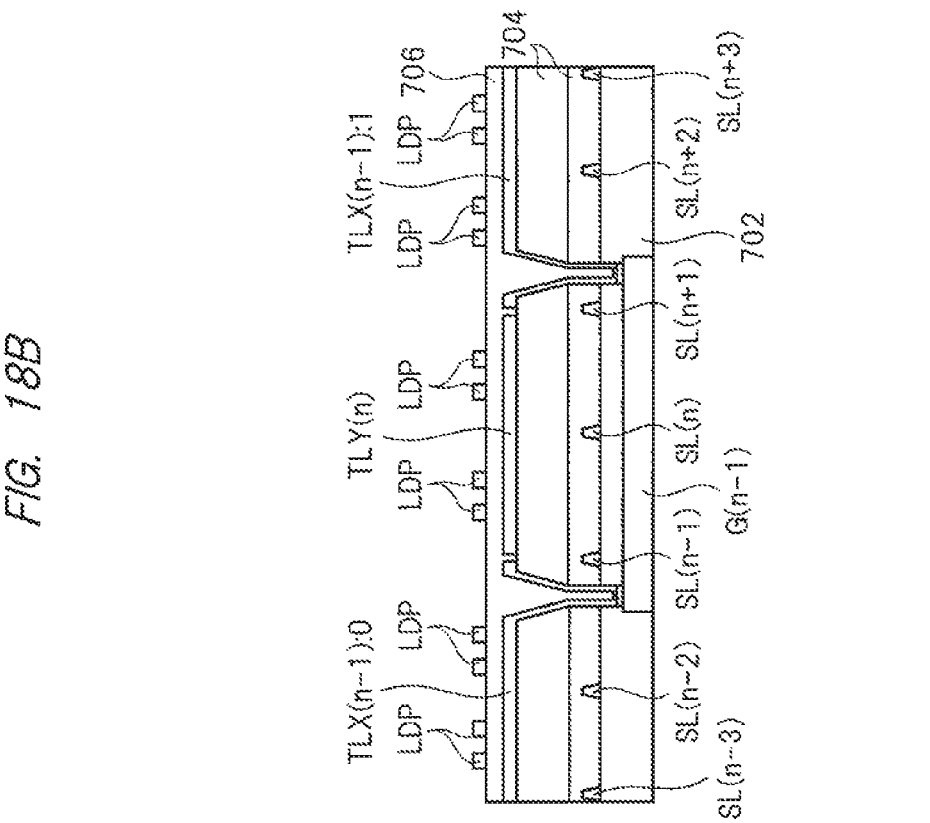
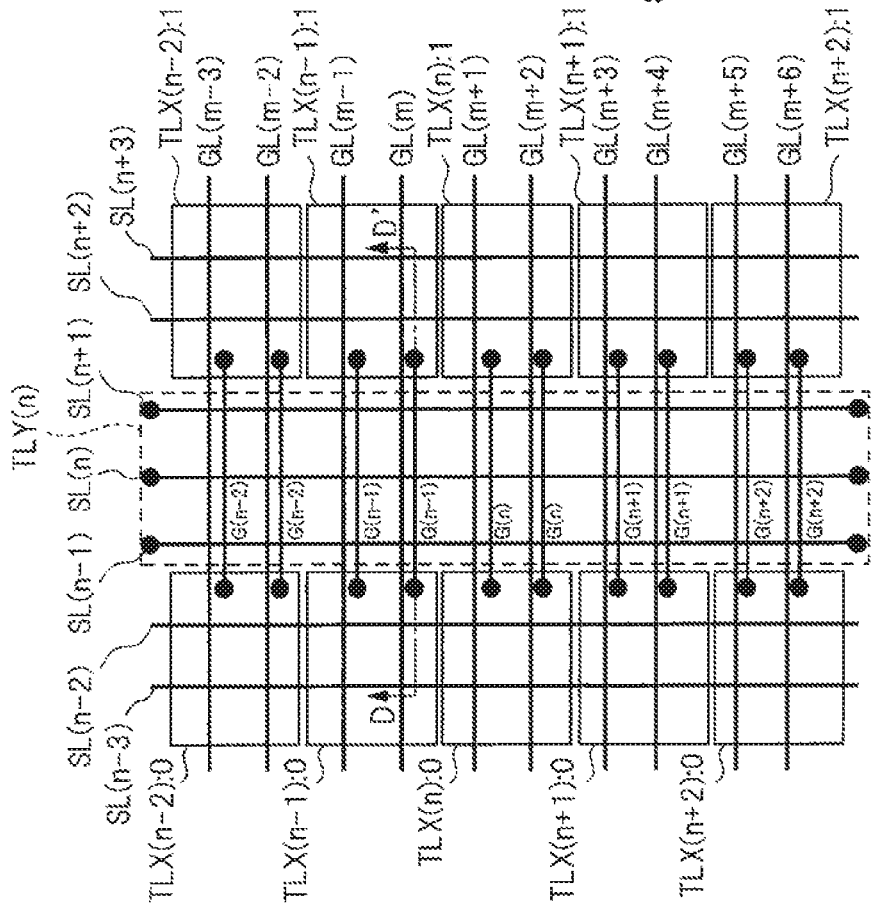
FIG. 18A
FIG. 18B

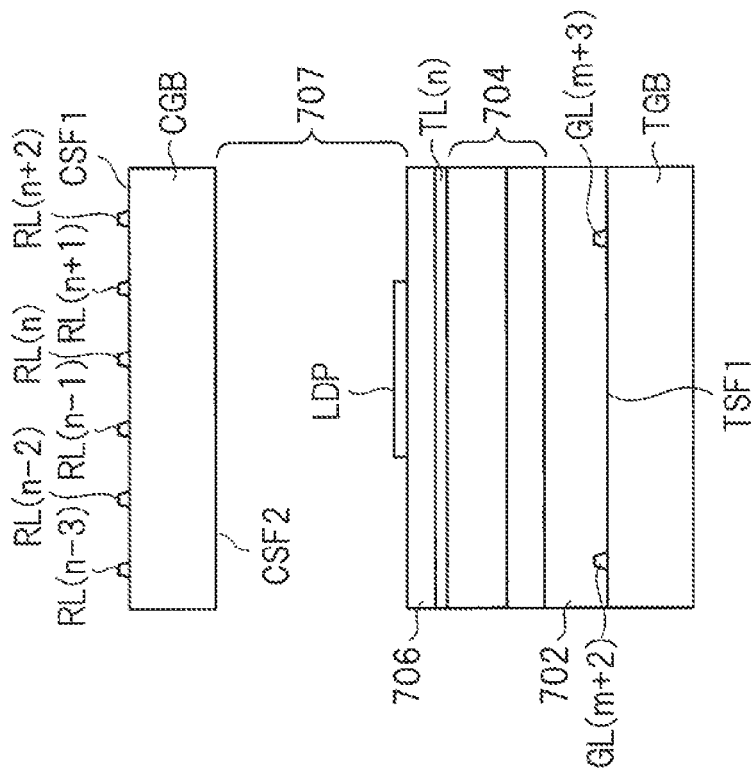
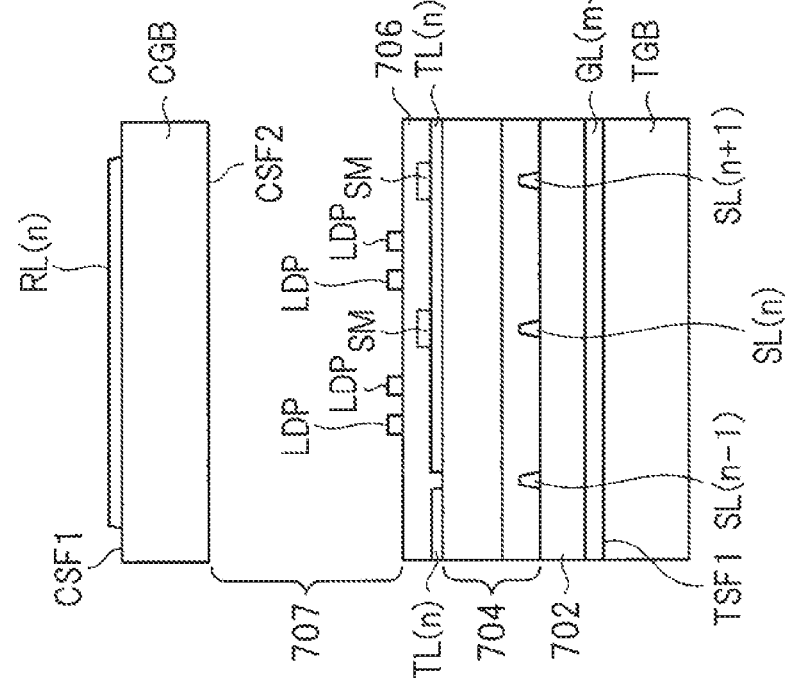

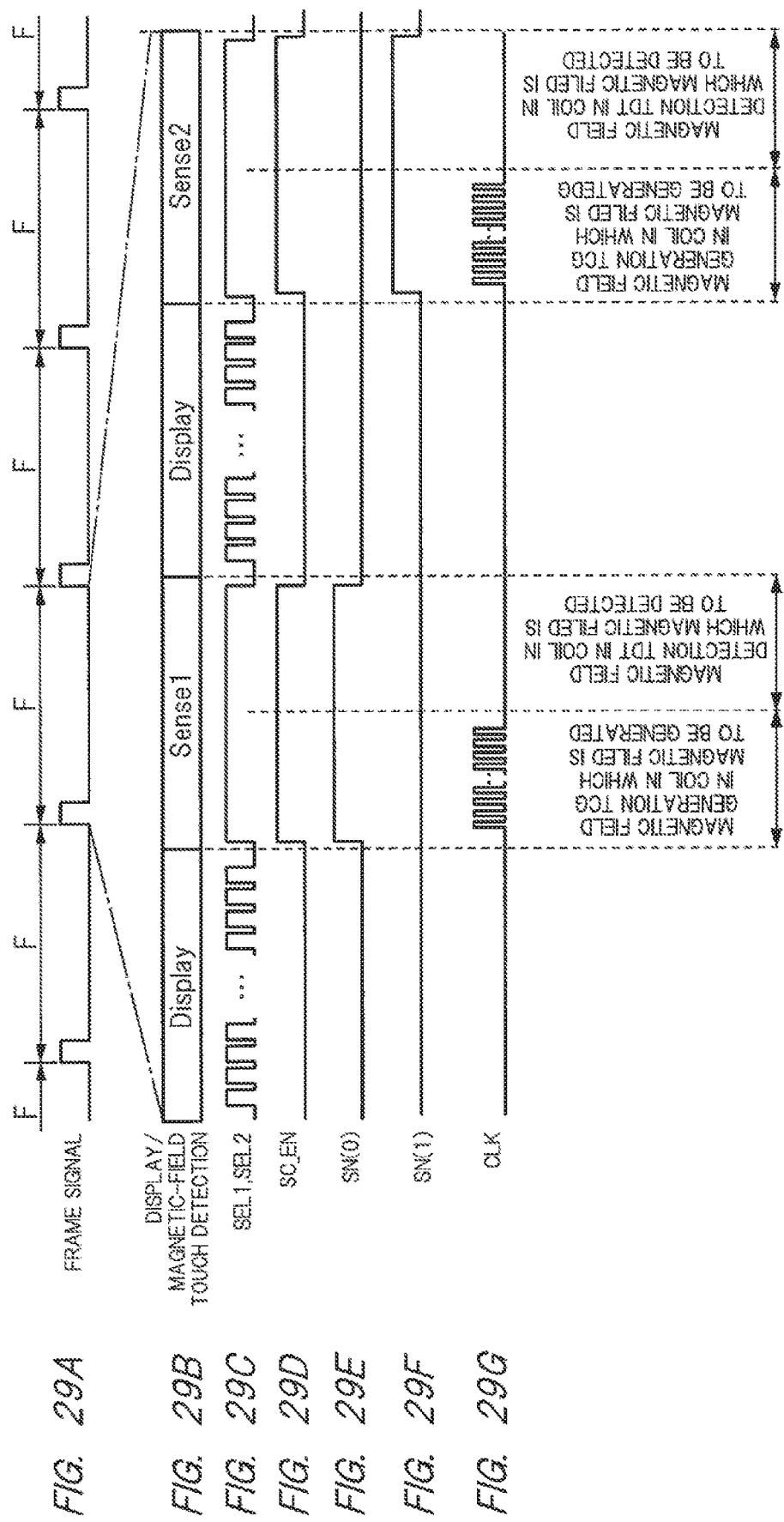

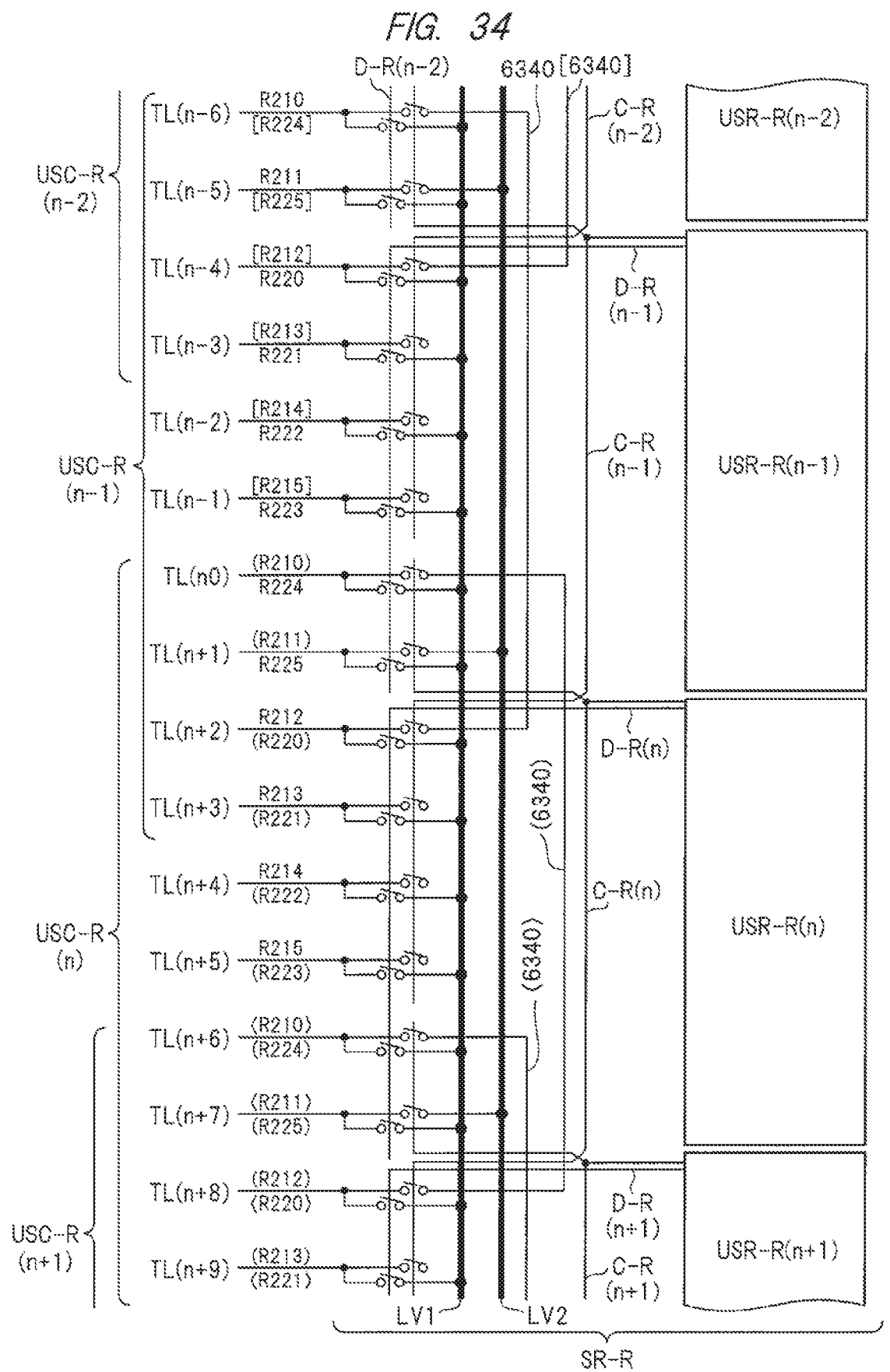

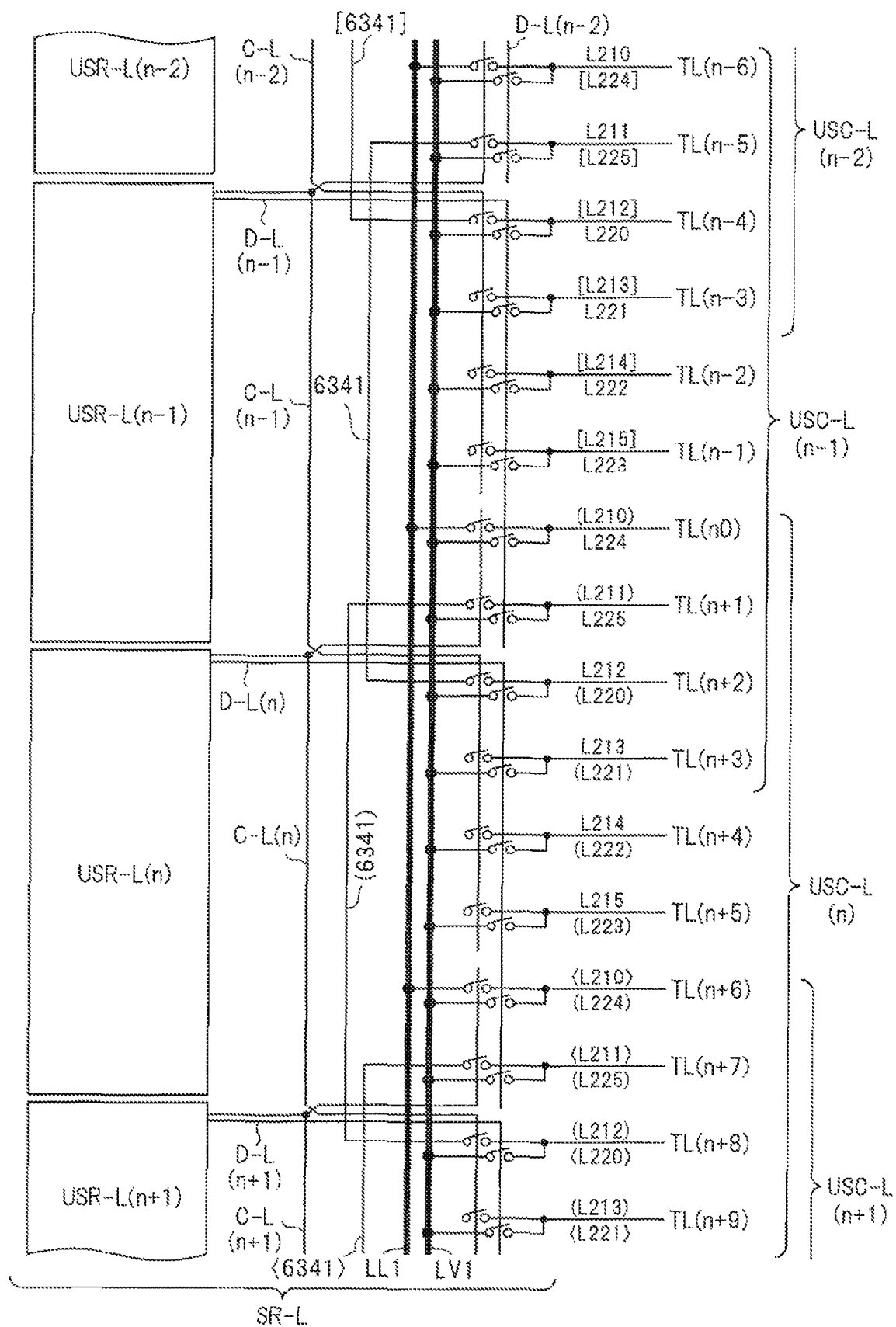

DISPLAY APPARATUS

CROSS-REFERENCE TO RELATED APPLICATION

The present application claims priority from Japanese Patent Application No. 2015-205086 filed on Oct. 16, 2015, the content of which is hereby incorporated by reference into this application.

TECHNICAL FIELD OF THE INVENTION

The present invention relates to a display apparatus. More particularly, the present invention relates to a display apparatus with a touch detection function capable of detecting an externally-approaching object.

BACKGROUND OF THE INVENTION

In recent years, a touch detection device which is so called touch panel capable of detecting an externally-approaching object has been attracted attention. A touch panel is mounted on a display apparatus such as a liquid crystal display apparatus or integrated with a liquid crystal display apparatus so as to be provided as a display apparatus with a touch detection function.

As the externally-approaching object, a touch panel enabled to use, for example, a pen is known. By enabling the touch panel to use a pen, for example, a small area can be assigned or hand-written characters can be input. Various techniques to detect the touch by a pen are known. As one of the various techniques, an electromagnetic induction system is known. In the electromagnetic induction system, high accuracy and high handwriting pressure detection accuracy can be achieved, and a hovering detection function in a state in which an externally-approaching object is separated from the touch panel surface can be also achieved, and therefore, the system is a leading technique as the technique to detect the touch by a pen.

The touch detection technique using the electromagnetic induction system is described in, for example, Japanese Patent Application Laid-Open Publication No. H10-49301 (Patent Document 1), Japanese Patent Application Laid-Open Publication No. 2005-352572 (Patent Document 2), and Japanese Patent Application Laid-Open Publication No. 2006-163745 (Patent Document 3).

A touch detecting device capable of detecting a finger, etc., as the externally-approaching object is known. In this case, an object to be detected is different from the pen, and therefore, a system different from the electromagnetic induction system is employed for the touch detection technique. For example, systems of detecting optical change, resistance value change, or electric field change, caused by the finger touch, etc., are cited. As the system of detecting the electric field change among these systems, for example, a capacitive system utilizing a capacitance is cited. This capacitive system has a relatively simple structure and less power consumption, and therefore, is used for a portable information terminal, etc.

SUMMARY OF THE INVENTION

As the electromagnetic induction system, a system is cited, the system of mounting a coil and a capacitor on a pen, generating a magnetic field in a touch panel, charging magnetic energy in the capacitor mounted on the pen, and detecting the magnetic energy in the touch panel. This system requires a sensor plate that generates the magnetic field in the touch panel and that receives the magnetic energy from the pen. When the sensor plate is mounted so as to achieve the display apparatus with the touch detection function, a price (a production cost) of the display apparatus with the touch detection function increases. Also in the case of the capacitive system, the touch panel requires an electrostatic electrode for detecting the capacitance change. Therefore, the price increases.

The present inventors of the present application have thought that the electromagnetic induction system is suitable for the touch detection by the pen and that the capacitive system is suitable for the touch detecting by the finger. The inventors have also though that the touch panel used by the electromagnetic induction system and the touch panel used by the capacitive system are achieved by a layer in the display apparatus in order to suppress the increase in the price. In this case, it is considered that a wiring formed by the layer of the display apparatus has a higher resistance and a larger parasitic capacitance than those of the sensor plate, which results in deteriorating the detection characteristics.

The Patent Documents 1 to 3 describe the touch detection device using the electromagnetic induction system. However, a technique capable of both of the touch detection by the pen and the touch detection by the finger is neither described nor recognized therein.

An object of the present invention is to provide a display apparatus with a touch detection function capable of improving detection characteristics.

A display apparatus according to an aspect of the present invention includes: a pixel array having a plurality of pixels arranged into a matrix formation; a plurality of signal lines arranged along columns in the pixel array and supplying an image signal to a plurality of pixels arranged in the respective columns; and a plurality of drive electrodes arranged in parallel with each other in the pixel array and supplying a drive signal to a plurality of pixels when an image is displayed. When the externally-approaching object is detected by using a magnetic field, a magnetic field drive signal for generating the magnetic field is supplied to a first wiring arranged in the pixel array, and the magnetic field from the externally-approaching object is detected by a second wiring intersecting with the first wiring when seen when seen in a plan view.

When the magnetic field from the externally-approaching object is detected by supplying the magnetic field drive signal to the first wiring to generate the magnetic field, and then, using the same first wiring, a voltage at the first wiring still changes depending on the resistance value and the parasitic capacitance of the first wiring even when the supply of the magnetic field drive signal stops. Therefore, it is required to delay a timing of the detection of the magnetic field from the externally-approaching object. On the other hand, the magnetic field from the externally-approaching object is detected by using the second wiring different from the first wiring, and therefore, it is not required to delay the timing of the detection. Accordingly, long detection time for the touch detection can be prevented, so that the detection characteristics can be improved. While the magnetic field from the externally-approaching object becomes weaker as time further elapses, it is not required to delay the timing of the detection, and therefore, a strong magnetic field can be detected, the detection accuracy can be improved, and the detection characteristics can be improved.

And, a display apparatus according to another aspect of the present invention includes: a first glass substrate having a first main surface; a liquid crystal layer whose transmittance changes depending on a potential; and a second glass substrate having a first main surface and a second main surface opposite to the first main surface of the first glass substrate across the liquid crystal layer. Here, on the first main surface of the first glass substrate, a plurality of signal lines and a plurality of drive electrodes are arranged. The plurality of signal lines are parallel with each other and extend in a first direction on the first main surface of the first glass substrate when seen in a plan view, and the plurality of drive electrodes are parallel with each other and are electrically insulated from the plurality of signal lines on the first main surface of the first glass substrate when seen in a plan view. On the first main surface of the second glass substrate, a plurality of detection electrodes are arranged. The plurality of detection electrodes are arranged to be parallel with each other and intersect with the plurality of drive electrodes on the first main surface of the second glass substrate when seen in a plan view.

Further, the display apparatus includes: a drive circuit that supplies a drive signal to a first coil when the externally-approaching object is detected by using the magnetic field, the first coil being formed of a plurality of first drive electrodes among the plurality of drive electrodes; and a detection circuit that detects a signal change at a second coil when the externally-approaching object is detected by using the magnetic field, the second coil being formed of a plurality of first detection electrodes among the plurality of detection electrodes.

The number of wirings (detection electrodes) arranged on the first main surface of the second glass substrate is smaller than the number of wirings (signal lines and drive electrodes) arranged on the first main surface of the first glass substrate. Therefore, a parasitic capacitance between the detection electrode arranged on the first main surface of the second glass substrate and other wiring is small. This manner can prevent deterioration of the signal change at the second coil caused by the magnetic field from the externally-approaching object. In the drive electrode, a combined resistance can be reduced by, for example, an auxiliary electrode, and therefore, a strong magnetic field can be generated on the first main surface of the first glass substrate.

The string magnetic field can be generated by the first coil, and the deterioration of signal change can be reduced by the second coil, and therefore, the detection characteristics can be improved.

BRIEF DESCRIPTIONS OF THE DRAWINGS

FIG. 5 is a block diagram showing a configuration of a display apparatus according to a first embodiment;

FIGS. 18A and 18B are a plan view and a cross-sectional view showing a partial plane of the display apparatus according to the modification example of the first embodiment;

FIGS. 28A and 28B are cross-sectional views in an E-E' cross section and an F-F' cross section in FIG. 27;

FIGS. 29A to 29G are waveform charts each showing an operation of the display apparatus according to the second embodiment;

FIG. 34 is a circuit diagram showing a configuration of a switching control drive circuit in a display apparatus according to a fourth embodiment; and FIG. 35 is a circuit diagram showing a configuration of a switching control drive circuit in the display apparatus according to the fourth embodiment.

DESCRIPTIONS OF THE PREFERRED EMBODIMENTS

Figure 1:
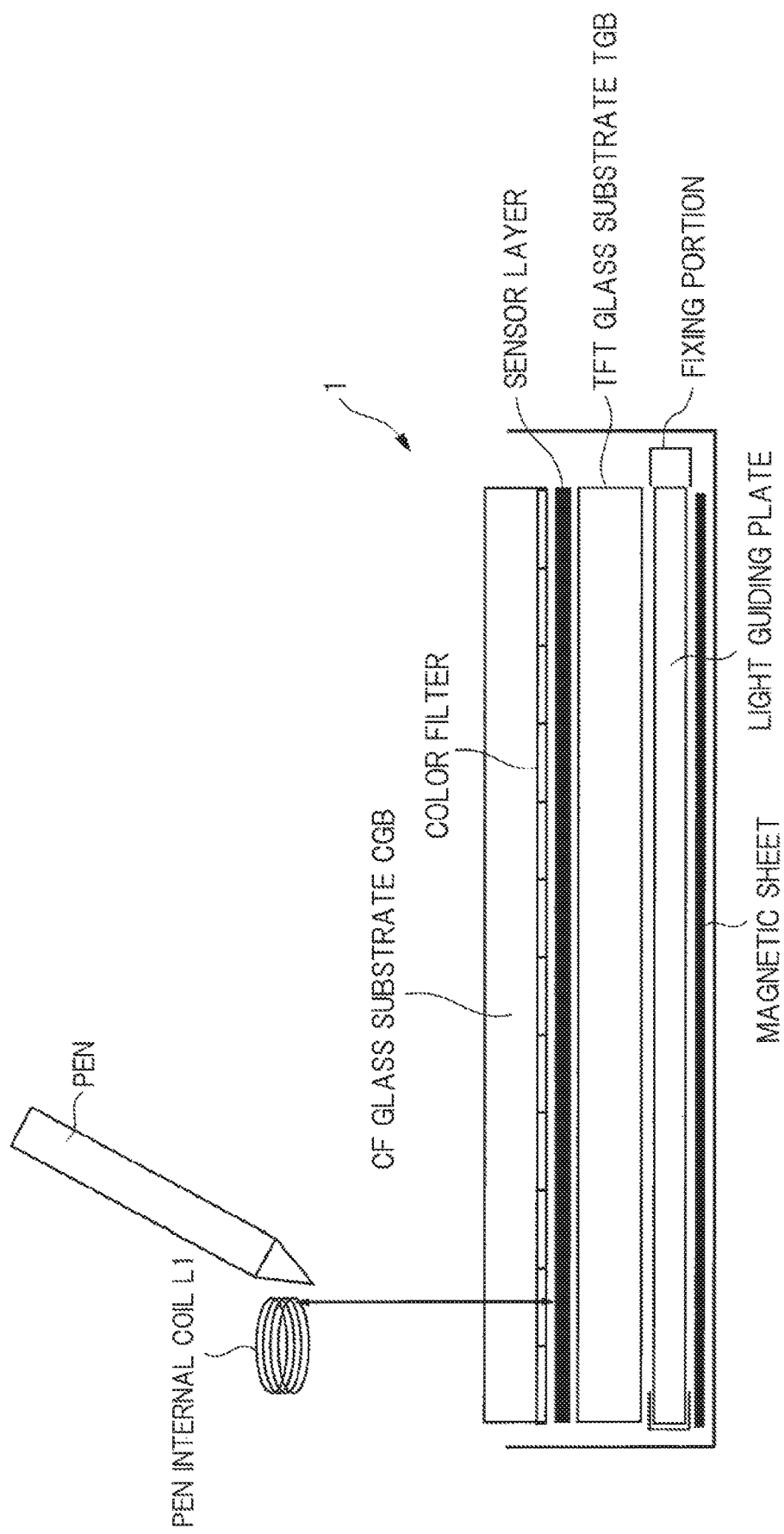
FIG. 1 is an explanatory diagram showing a relation between a pen and an electronic apparatus having a display apparatus.

The following is explanation for each embodiment of the present invention with reference to drawings. Note that disclosure is merely one example, and appropriate change with keeping the concept of the present invention which can be easily thought up by those who skilled in the art is obviously contained in the scope of the present invention. Also, in order to make the clear description, the drawings are illustrated more schematically for a width, a thickness, a shape, and others of each portion than those in an actual aspect in some cases. However, they are merely examples, and do not limit the interpretation of the present invention.

In the present specification and each drawing, similar elements to those described earlier for the already-described drawings are denoted by the same or similar reference characters, and detailed description for them is appropriately omitted in some cases.

The following explanation describes a liquid crystal display apparatus with a touch detection function as an example as a display apparatus with a touch detection function. However, the display apparatus is not limited to this, and an OLED display apparatus with a touch detection function is also applicable.

(First Embodiment)

A first embodiment provides a liquid crystal display apparatus with a touch detection function (which is also simply called liquid crystal display apparatus or display apparatus in this specification) capable of detecting both of a touch by a pen and a touch by a finger. First, a basic principle for detecting a touch by a pen and a basic principle for detecting a touch by a finger will be described.

<<Basic Principle of Electromagnetic Induction System>>

An electromagnetic induction system is adopted for detecting a touch by a pen, and therefore, the basic principle of this electromagnetic induction system will be described first. FIG. 1 is an explanatory diagram schematically showing a relation between a pen and an electronic device having a display apparatus. Also, FIGS. 2A to 2D are explanatory diagrams for explaining the principle of the electromagnetic induction system.

In FIG. 1, the electronic device includes a liquid crystal display apparatus 1 housed in a metallic cover, a light guiding plate, and a magnetic sheet. This drawing schematically shows a cross section of the liquid crystal display apparatus 1. That is, the liquid crystal display apparatus 1 includes a thin film transistor (TFT) glass substrate (first substrate or first glass substrate) TGB, a sensor layer stacked on the TFT glass substrate TGB, a color filter, and a CF (color filter) glass substrate (second substrate or second glass substrate) CGB. A plurality of coils are formed of the sensor layer formed on the TFT glass substrate TGB.

A coil and a capacitative element are embedded in the pen corresponding to the externally-approaching object. Although the capacitative element is omitted, FIG. 1 schematically shows the coil embedded in the pen as a pen internal coil L1. The pen internal coil L1 (hereinafter, also simply called coil L1) and a coil formed of a sensor layer are coupled to each other by a magnetic field. In FIG. 1, although the coil formed of the sensor layer is omitted, the coil formed of the sensor layer is explained as a coil L2 for convenience of the explanation.

Although omitted in FIG. 1 in order to schematically show the structure of the liquid crystal display apparatus 1, note that, for example, a liquid crystal layer not shown is sandwiched between the TFT glass substrate TGB and the color filter substrate. The light guide plate is arranged so as to be sandwiched between the magnetic sheet and the liquid crystal display apparatus 1, and is fixed with a fixing portion.

The pen approaches the electronic device, so that the coil L1 approaches the coil L2 formed of the sensor layer. Accordingly, magnetic coupling between the coil L1 and the coil L2 occurs, and the approach of the pen is detected.

The detection will be described with reference to FIG. 2. FIG. 2A shows a state in which the coil L2 generates a magnetic field and FIG. 2B shows a state in which the coil L1 generates a magnetic field.

Figures 2A, 2B, 2C, 2D:
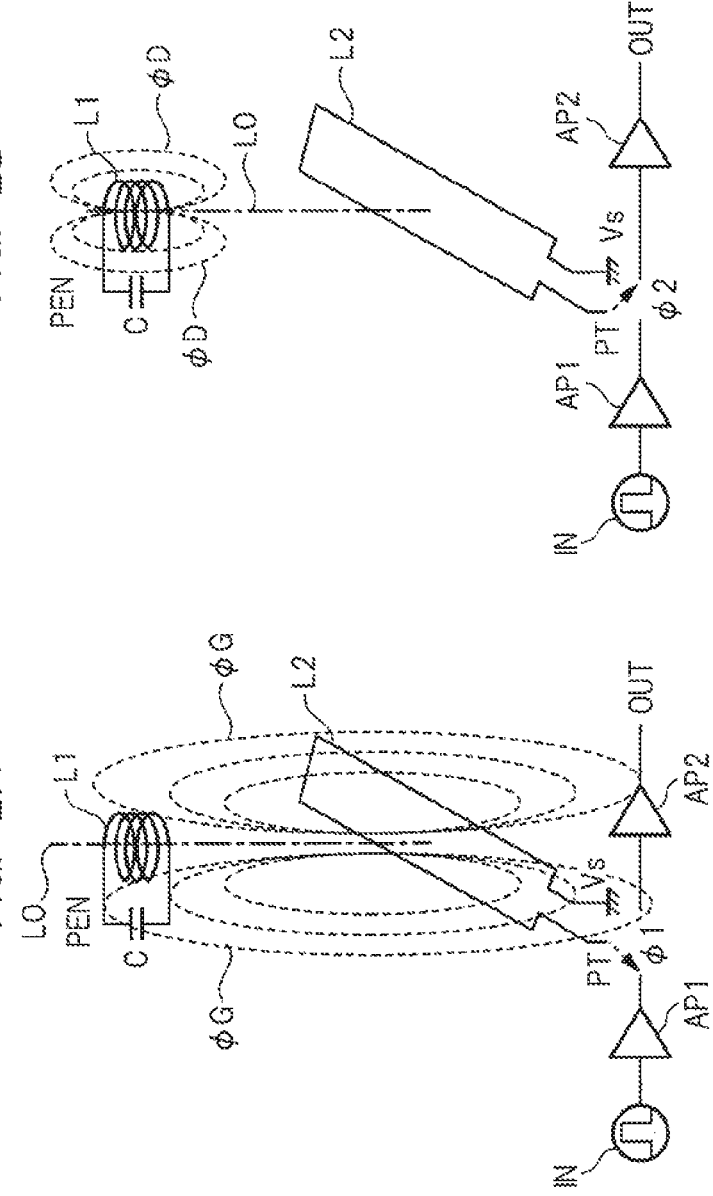
FIG. 2A to 2D are explanatory diagrams each showing a principle of an electromagnetic induction system.

In FIG. 2, the coil L2 and a pen internal capacitative element (hereinafter, may be also simply called a capacitative element) "C" are connected in parallel to each other to configure a resonance circuit. A single-winding coil formed of the sensor layer is shown as an example of the coil L1 and has a pair of terminals. When a touch is detected (in the touch detection), one terminal PT of the coil L2 is connected to output of a transmitting amplifier AP1 for a predetermined time as shown in FIG. 2A. Then, after the elapse of the predetermined time, the terminal PT of the coil L2 is connected to input of a receiving amplifier AP2 for a predetermined time as shown in FIG. 2B. The other terminal of the coil L2 is connected to a ground voltage Vs in touch detection as shown in FIGS. 2A and 2B.

FIGS. 2C and 2D are waveform charts showing the operation in touch detection. Each horizontal axis of FIGS. 2C and 2D represents the time, FIG. 2C shows a waveform of the output of the transmitting amplifier AP1, and FIG. 2D shows a waveform of the output of the receiving amplifier AP2.

When one terminal PT of the coil L2 is connected to the output of the transmitting amplifier AP1, a transmission signal IN changing periodically is supplied to the input of the transmitting amplifier AP1. Accordingly, the transmitting amplifier AP1 supplies a drive signal φ1 changing periodically in accordance with changes of the transmission signal IN to one terminal PT of the coil L2 for a predetermined time (magnetic field generation period) TG as shown in FIG. 2C. The coil L2 generates the magnetic field in accordance with this drive signal φ1. The line of magnetic force at this time is shown as φG in FIG. 2A.

The line of magnetic force φG is generated so as to center the winding wire of the coil L2, and thus, the magnetic field on the inner side of the coil L2 is enhanced. When the coil L1 approaches the coil L2 and a center axis LO of the coil L1 is inside the coil L2 as shown in, for example, FIG. 2A, the line of magnetic force of the coil L2 reaches the coil L1. That is, the coil L1 is arranged inside a magnetic field generated in the coil L2, so that the coil L1 and the coil L2 are magnetically coupled. The coil L2 generates a magnetic field changing periodically in accordance with changes of the drive signal φ1. Thus, an induced voltage is generated in the coil L1 by the action of mutual induction between the coil L1 and the coil L2. The capacitative element C is charged by the induced voltage generated by the coil L1.

After the elapse of the predetermined time, the one terminal PT of the coil L2 is connected to the input of the receiving amplifier AP2 for a predetermined time (a magnetic field detection period) TD. In the magnetic field detection period TD, if the capacitative element C has been charged in the previous magnetic field generation period TG, the coil L1 generates a magnetic field by the charge charged in the capacitative element C. FIG. 2B shows the line of magnetic force of the coil L1 generated by the charge charged in the capacitative element C as φD.

If the coil L1 approaches the coil L2 in the touch detection, that is, in the magnetic field generation period TG and the magnetic field detection period TD, the capacitative element C is charged in the magnetic field generation period TG, and the line of magnetic force φD of the coil L1 reaches the coil L2 in the magnetic field detection period TD. The resonance circuit is configured by the coil L1 and the capacitative element C, and thus, a magnetic field generated by the coil L1 changes in accordance with the time constant of the resonance circuit. By the changes of the magnetic field generated by the coil L1, an induced voltage is generated in the coil L2. By the induced voltage, a signal changes at the one terminal PT of the coil L2. The change of the signal is input into the receiving amplifier AP2 as a detection signal φ2 in the magnetic field detection period TD, is amplified, and is output as a sensor signal OUT from the receiving amplifier AP2.

On the other hand, if the coil L1 does not approach the coil L2 in touch detection, the capacitative element C is not charged or the amount of charge to be charged decreases in the magnetic field generation period TG. As a result, the line of magnetic force φD of the magnetic field generated by the coil L1 does not reach the coil L2, or the line of magnetic force φD which has reached becomes weak, in the magnetic field detection period TD. Thus, the detection signal φ2 at the one terminal PT of the coil L2 does not change, or the signal change is small, in the magnetic field detection period TD.

Each of FIGS. 2C and 2D shows both of a state in which the coil L1 approaches the coil L2 and a state in which the coil L1 does not approach the coil L2. That is, the state in which the coil L1 does not approach the coil L2 is shown on the left side of each of FIGS. 2C and 2D, and the state in which the coil L1 approaches the coil L2 is shown on the right side thereof. Thus, in FIG. 2D, the detection signal φ2 does not change in the magnetic field detection period TD (without the pen) shown on the left side, and the detection signal φ2 changes in the magnetic field detection period TD (with the pen) shown on the right side. The touch by the pen can be detected by determining the case of change of the detection signal φ2 to be a case with the pen, and determining the case of no change of the detection signal φ2 to be a case without the pen.

While FIG. 2 shows the determinations of the cases with and without the pen, the value of the detection signal φ2 changes depending on the distance between the coil L1 and the coil L2, and thus, the distance between the pen and the sensor plate or a pen pressure of the pen can be also determined.

When the terminal PT of the coil L2 is switched from the output terminal of the transmitting amplifier API to the input terminal of the receiving amplifier AP2, note that the terminal PT of the coil L2 is kept in a floating state for a predetermined time until the energy charged in the coil L2 formed of the sensor layer is discharged, and the terminal PT is connected to the input terminal of the receiving amplifier AP2 after an elapse of a predetermined time.

In this manner, when the pen approaches (or is in contact with) the coil L2 formed of the sensor layer in the touch detection period, an output signal from the receiving amplifier AP2 changes in the magnetic field detection period TD. On the other hand, if the pen does not approach (or is not in contact with) the coil L2, the output signal from the receiving amplifier AP2 does not change in the magnetic field detection period TD. That is, by the output signal from the receiving amplifier AP2, it can be detected whether or not the pen touches the vicinity of the coil L2 formed of the sensor layer. When the coils L2 and L1 are close to each other, magnetic energy provided from the coil L1 gives to the coil L2 changes in accordance with the distance between both coils, and therefore, the pens pressure can be also determined from the value of the output signal from the receiving amplifier AP2.

<<Basic Principle of Capacitive System>>

Figure 3A:
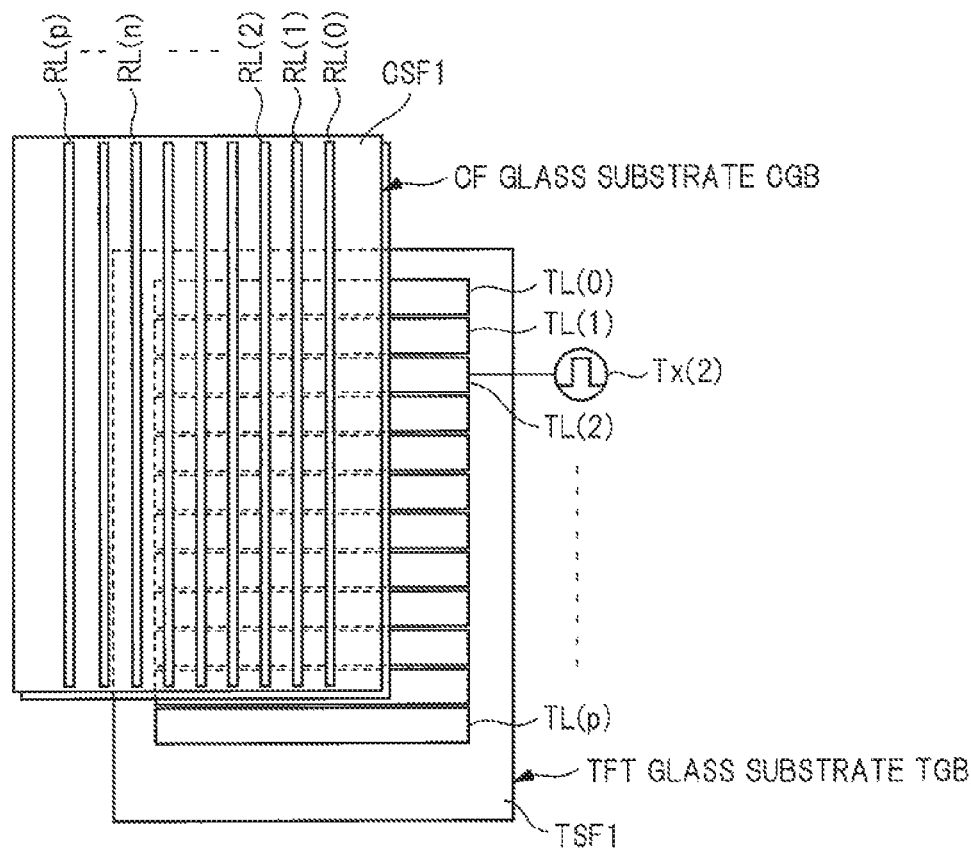
FIGS. 3A and 3B are a plan view and a cross-sectional view showing a configuration of the display apparatus.
Figure 3B:
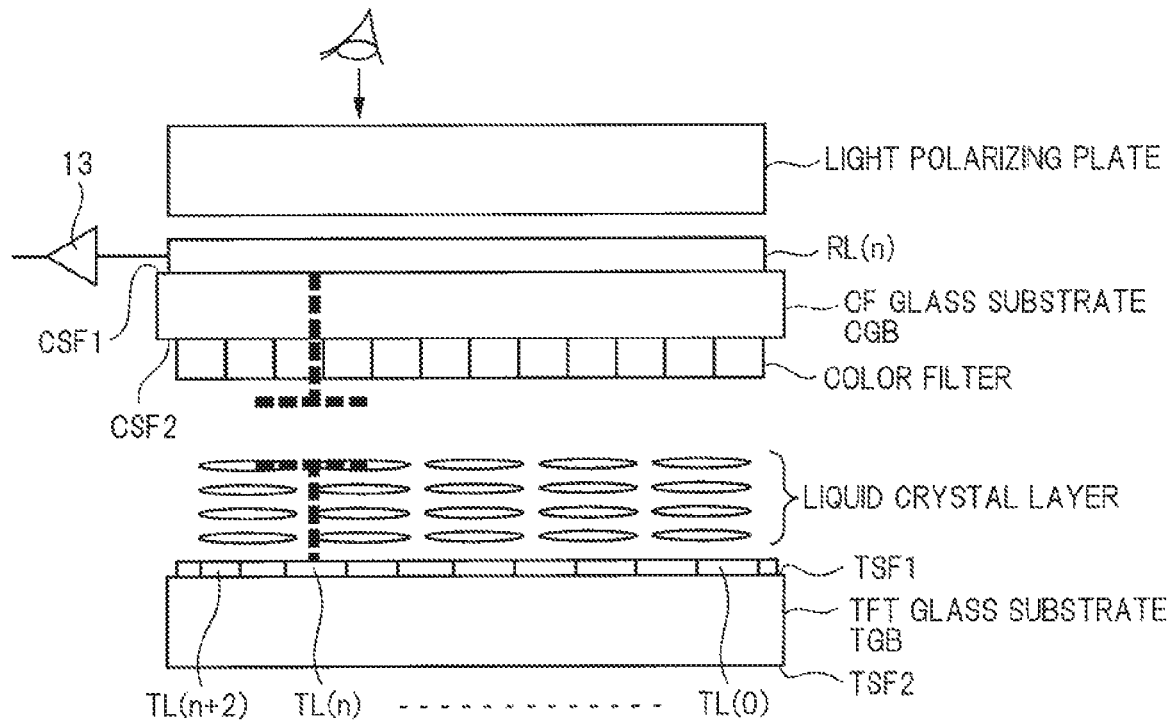

Nest, a system for detecting the touch by the finger will be described. In the first embodiment, the capacitive system is adopted for detecting the touch by the finger, and therefore, the basic principle of this capacitive system will be described. FIG. 3 is a diagram schematically showing a configuration of the liquid crystal display apparatus 1. Here, FIG. 3A is a plan view schematically showing a plane section the liquid crystal display apparatus 1, and FIG. 3B is a cross-sectional view schematically showing a cross-section of the liquid crystal display apparatus 1. In FIG. 3B, a cross section of the liquid crystal display apparatus 1 shown in FIG. 1 is shown in more detail.

In FIG. 3A, TL(0) to TL(p) represent drive electrodes formed of a layer on a first main surface TSF1 of the TFT glass substrate TGB (first glass substrate). And, RL(0) to RL(p) represent detection electrodes formed of a layer on a first main surface CSF1 of the CF glass substrate CGB (second glass substrate). The TFT glass substrate TGB has the first main surface TSF1 and a second main surface TSF2 opposite to the first main surface TSF1 (FIG. 3B). A plurality of layers are formed on the first main surface TSF1 of the TFT glass substrate TGB. However, FIG. 3 shows only the layer in which the drive electrodes TL(0) to TL(p) are formed.

The CF glass substrate CGB also has the first main surface CSF1 and a second main surface CSF2 opposite to the first main surface CSF1 (FIG. 3B). FIG. 3 shows only the layer in which the detection electrodes RL(0) to RL(p) arranged on the first main surface CSF1 are formed. For easy understanding, in FIG. 3A, the TFT glass substrate TGB and the CF glass substrate CGB are shown so as to be separated from each other. However, specifically, as shown in FIG. 3B, the first main surface TSF1 of the TFT glass substrate TGB and the second main surface CSF2 of the CF glass substrate CGB are arranged so as to be opposite to each other across the liquid crystal layer.

As shown in FIG. 3B, a plurality of layers, the liquid crystal layer, etc., are sandwiched between the first main surface TSF1 of the TFT glass substrate TGB and the second main surface CSF2 of the CF glass substrate CGB. However, FIG. 3 shows only the drive electrodes TL(0) to TL(n+2), a liquid crystal layer, and a color filter sandwiched between the first main surface TSF1 and the second main surface CSF2. On the first main surface CSF1 of the CF glass substrate CGB, the plurality of detection electrodes RL(0) to RL(p) and a polarizing plate are arranged as shown in FIG. 3A. In FIG. 3B, only the detection electrode RL(n) out of the plurality of detection electrodes RL(0) to RL(p) is shown as an example of the detection electrodes.

In the present specification, the liquid crystal display apparatus 1 is described so that its state viewed from the main surface CSF1 and TSF1 side of the CF glass substrate CGB and the TFT glass substrate TGB is as a plan view as shown in FIG. 3B. That is, when seen in a plan view, a case viewed from the main surface CSF1 and TSF1 side of the CF glass substrate CGB and the TFT glass substrate TGB is described. Therefore, although it is described that the detection electrode and the polarizing plate are arranged on the first main surface CSF1 side of the CF glass substrate CGB, the detection electrode and the polarizing plate are arranged on, for example, the right side, left side, or lower side of the CF glass substrate CGB by changing the view direction. In FIG. 3B, a reference character "13" denotes an amplifying circuit connected to the detection electrode RL(n).

When seen in a plan view from the first main surface CSF1 and TSF1 side, the drive electrodes TL(0) to TL(p) extend in a row direction (horizontal direction) and are arranged in parallel with each other in a column direction (vertical direction) on the first main surface TSF1 of the TFT glass substrate TGB as shown in FIG. 3A. Also, the detection electrodes RL(0) to RL(p) extend in the column direction (vertical direction) and are arranged in parallel with each other in the row direction (horizontal direction) on the first main surface CSF1 of the CF glass substrate CGB as shown in FIG. 3A.

As shown in FIG. 3B, the CF glass substrate CGB, the liquid crystal layer, etc., are interposed between the drive electrodes TL(0) to TL(p) and the detection electrodes RL(0) to RL(p). Therefore, the drive electrodes TL(0) to TL(p) and the detection electrodes RL(0) to RL(p) intersect with each other when seen in a plan view but are electrically insulated from each other. A capacitance is provided between the drive electrode and the detection electrode. Therefore, in FIG. 3B, this capacitance is shown by a broken line as a capacitive element. Note that the drive electrodes TL(0) to TL(p) are separated from each other, and the detection electrodes RL(0) to RL(p) are also separated from each other.

To the drive electrodes TL(0) to TL(p), a drive signal for display (display drive signal) is supplied in the display, and a drive signal for touch detection is supplied in the touch detection by the finger.

According to the first embodiment, the touch by the finger is detected by using an electric field, and the touch by the pen is detected by using a magnetic field (see FIGS. 1 and 2). Therefore, in the present specification, the touch detection using the magnetic field is called magnetic field touch detection, and the touch detection using the electric field is called electric field touch detection. Although described later, the drive signal for touch detection is supplied to the drive electrodes TL(0) to TL(p) also in the magnetic field touch detection. Therefore, to the drive electrodes TL(0) to TL(p), respective drive signals are supplied in the display, the electric field touch detection, and the magnetic field touch detection. That is, the drive electrodes TL(0) to TL(p) are commonly used in (shared among) the display, the electric field touch detection, and the magnetic field touch detection. From the viewpoint of the common use, each of the drive electrodes TL(0) to TL(p) can be regarded as a common electrode.

In a period of the electric field touch detection, a drive signal Tx for electric field is supplied to the drive electrodes TL(0) to TL(p). A signal whose voltage changes periodically is supplied as the drive signal Tx to a drive electrode selected so as to detect the touch, and, for example, a predetermined fix voltage is supplied as the drive signal Tx to a drive electrode selected so as not to detect the touch. In a period of the electric field touch detection, the drive electrodes TL(0) to TL(p) are sequentially selected in, for example, this order. FIG. 3A shows a state in which a signal whose voltage changes periodically is supplied to a drive electrode TL(2) as a drive signal Tx(2), and, for example, the drive electrodes are sequentially selected from the drive electrode TL(0) to the drive electrode TL(p), and the dive signal whose voltage changes periodically is supplied thereto.

Meanwhile, in a period of the display, a predetermined fix voltage or a voltage corresponding to an image to be displayed is supplied as a display drive signal to the drive electrodes TL(0) to TL(p).

Figure 4A:
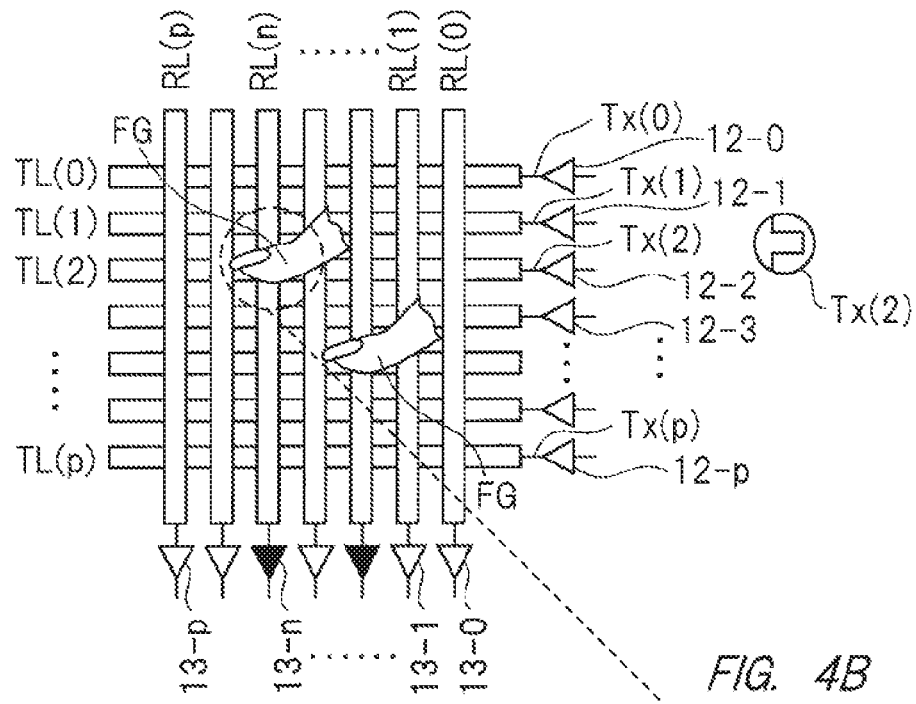
FIGS. 4A to 4C are explanatory diagrams each showing a principle of a capacitive system.

Next, the basic principles of the capacitive system will be described with reference to FIG. 4. In FIG. 4, TL(0) to TL(p) indicate the drive electrodes shown in FIG. 3, and RL(0) to RL(p) denote the detection electrodes shown in FIG. 3. In FIG. 4A, the drive electrodes TL(0) to TL(p) extend in the row direction, and are arranged in parallel with each other in the column direction. And, the detection electrodes RL(0) to RL(p) extend in the column direction so as to intersect with the drive electrodes TL(0) to TL(p), and are arranged in parallel with each other in the row direction. In order to make a gap between the detection electrodes RL(0) to RL(p) and the drive electrodes TL(0) to TL(p), the liquid crystal layer, etc., is arranged between the detection electrodes RL(0) to RL(p) and the drive electrodes TL(0) to TL(p) as shown in FIG. 3B.

In FIG. 4A, reference characters "12-0" to "12-p" schematically show unit drive electrode drivers. In this drawing, from the unit drive electrode drivers 12-0 to 12-p, drive signals Tx(0) to Tx(p) are output. Reference characters "13-0" to "13-p" schematically show unit amplifying circuits. In FIG. 4A, a pulse signal surrounded by a circle with a solid line shows the waveform of the drive signal Tx supplied to the selected drive electrode. In this drawing, a finger FG is shown as the externally-approaching object.

Figure 4B:
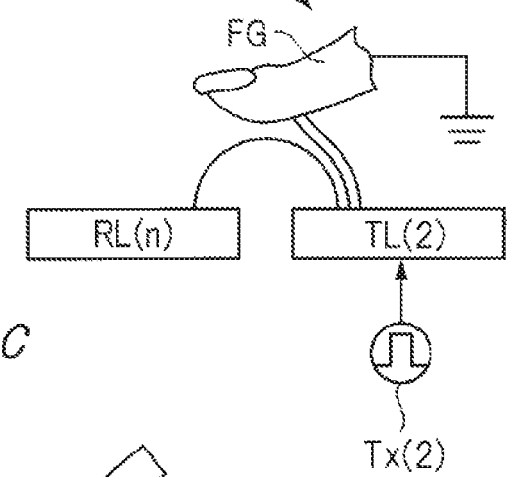
Figure 4C:
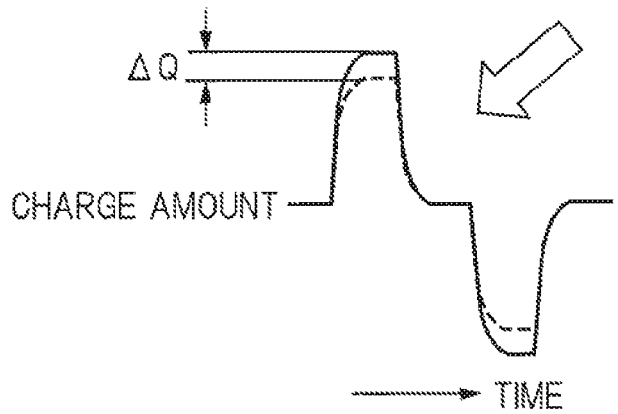

In an example of FIG. 4A, a pulse signal is supplied as the drive signal Tx(2) from the unit drive electrode driver 12-2 to the drive electrode TL(2). By supplying the drive signal Tx(2), which is a pulse signal, to the drive electrode TL(2), an electric field is generated between the drive electrode TL(2) and a detection electrode RL(n) intersecting with the drive electrode TL(2) as shown in FIG. 4B. At this time, if the finger FG touches a position close to the drive electrode TL(2) of the liquid crystal panel, an electric field is also generated between the finger FG and the drive electrode TL(2), and the electric field generated between the drive electrode TL(2) and the detection electrode RL(n) is reduced. In this manner, a charge amount between the drive electrode TL(2) and the detection electrode RL(n) is reduced. As a result, as shown in FIG. 4C, the charge amount generated in response to the supplied drive signal Tx(2) is smaller by ΔQ when the finger FG touches than when the finger FG does not touch. A difference in the charge amount becomes available on a detection signal Rx(n) as a voltage difference, is supplied to the unit amplifying circuit 13-n, and is amplified therein.

In FIG. 4C, note that the horizontal axis represents time and the vertical axis represents the charge amount. In response to a rising edge of the drive signal Tx(2), the charge amount increases (increases upward in this drawing). In response to a falling edge of the drive signal Tx(2), the charge amount increases (increases downward in this drawing). At this time, the increased charge amount changes depending on the touching/non-touching by the finger FG. In this drawing, the charge amount is reset after the upward increase and before the downward increase. Similarly, the charge amount is reset after the downward increase and before the upward increase. In this manner, the charge amount changes upward and downward based on the reset charge amount. In other words, a signal changes at the detection electrode RL(n) in response to the touch.

The drive electrodes TL(0) to TL(p) are sequentially selected, and the drive signals Tx(0) to Tx(p), which are pulse signals, are supplied to the selected respective drive electrodes, so that the plurality of respective detection electrodes RL(0) to RL(p) intersecting with the selected drive electrodes output the detection signals Rx(0) to Rx(p) that have voltage values obtained depending on whether or not the finger FG touches the position close to the respective intersects. At the time at which the charge amount has the difference ΔQ, each of the detection signals Rx(0) to Rx(p) is sampled and is converted into a digital signal through an analog/digital conversion unit. A signal processing is performed to the converted digital signal, so that the coordinates of the touched position can be extracted.

<<Overview of Liquid Crystal Display Apparatus>>

FIG. 5 is a block diagram showing the configuration of the liquid crystal display apparatus 1 according to the first embodiment. In FIG. 5, the liquid crystal display apparatus 1 includes a display panel (liquid crystal panel) 2, a signal line selector 3, a display control device 4, a gate driver 5, and a touch control device 6. The liquid crystal display apparatus 1 also includes a switching drive circuit (drive circuit, first switching circuit) SC-L, a switching drive circuit SC-R, a detection control circuit SR, and a switching amplification circuit SC-D&. The display panel includes a display area (display portion) where the display is performed and a peripheral area (peripheral portion). From the viewpoint of the display, the display area is an active area, and the peripheral area is a non-active area. In FIG. 5, a reference character "2" is shown as the display area (active area).

The display panel 2 has a pixel array LCD in which a plurality of pixels are arranged in a matrix form. Although described later with reference to FIGS. 6 to 8 and others, in the pixel array LCD, a plurality of signal lines, a plurality of drive electrodes (first electrodes), a plurality of scanning lines, and a plurality of detection electrodes (second electrodes) are arranged. Here, the signal line is arranged in each column of the pixel array LCD, the drive electrode is arranged in a row of the pixel array LCD, the plurality of scanning lines are arranged in each row of the pixel array LCD, and the detection electrode is arranged in each column of the pixel array LCD.

In the description with reference to FIG. 5, the signal lines extend in a vertical direction (column direction) and are arranged in parallel in a horizontal direction (row direction). The drive electrodes extend in the horizontal direction and are arranged in parallel in the vertical direction. Further, the scanning lines extend in the horizontal direction and are arranged in parallel in the vertical direction, and the detection electrodes extend in a vertical direction and are arranged in parallel in a horizontal direction. In this case, a pixel is arranged in a portion where a signal line and a scanning line intersect. In a period of display (display period), pixels are selected by signal lines and scanning lines, the voltage of the signal line and the voltage of the drive electrode at that time are applied to the selected pixels, and the selected pixels produce a display in accordance with a voltage difference between the signal line and the drive electrode.

The display control device 4 includes a control circuit D-CNT and a signal line driver D-DRV. The control circuit D-CNT receives a timing signal supplied to an external terminal Tt and image information supplied to an input terminal Ti, forms an image signal Sn in accordance with the image information supplied to the input terminal Ti, and supplies the image signal Sn to the signal line driver D-DRV. The signal line driver D-DRV supplies the supplied image signal Sn to a signal line selector 3 in the display in a time-division mode. The control circuit D-CNT also receives a timing signal supplied to the external terminal Tt and a control signal SW from the touch control device 6 to form various control signals. As the control signals formed by the control circuit D-CNT, there are selection signals SEL1, SEL2 supplied to the signal line selector 3, a synchronizing signal TSHD, a magnetic-field enable signal SC_EN, a control signal TSV whose voltage changes periodically, a control signal T-CNT related to touch detection, a coil clock signal CLK, and others.

The liquid crystal display apparatus 1 according to this first embodiment is configured so that the magnetic field touch detection and the electric field touch detection are possible. Among signals formed by the control circuit D-CNT, the magnetic-field enable signal SC_EN is an enable signal indicating the execution of the magnetic field touch detection. This magnetic-field enable signal SC_EN becomes, for example, at a high level in the magnetic field touch detection and at a low level in the electric field touch detection. The synchronizing signal TSHD is a synchronizing signal that identifies a period (display period) in which the display is performed in the display area 2 and a period (touch detection period) in which the touch detection is performed. When the synchronizing signal TSHD shows the display period, the magnetic-field enable signal SC_EN becomes at the low level.

According to the first embodiment, the control circuit D-CNT generates the coil clock signal CLK whose voltage changes periodically in the magnetic field touch detection, and generates the control signal TSV whose voltage changes periodically in the electric field touch detection. According to the first embodiment, the coil clock signal CLK and the control signal TSV are supplied to the same signal wire in time division although described later. Therefore, FIG. 5 shows the coil clock signal CLK and the control signal TSV as a reference character "CLK/TSV".

In the display period, the signal line driver D-DRV supplies an image signal Sn to the signal line selector 3 in time division in accordance with the selection signals SEL1 and SEL2. The signal line selector 3 is connected to the plurality of signal lines arranged in the display area 2, and supplies the supplied image signal to a proper signal line in the display period in accordance with the selection signals SEL1 and SEL2. By this manner, the number of signal wires between the display control device 4 and the signal line selector 3 can be reduced.

In the display period, the gate driver 5 generates scanning line signals Vs0 to Vsp in accordance with a timing signal from the control circuit D-CNT, and supplies the scanning line signals Vs0 to Vsp to scanning lines in the display area 2. In the display period, a pixel connected to a scanning line to which a scanning signal with a high level is supplied is selected, and this selected pixel displays an image in accordance with an image signal that is supplied to the signal line at this time.

The touch control device 6 includes a detection circuit DET that receives detection signals Rx(0) to Rx(p), a processing circuit PRS that extracts coordinates of the touched position by performing processing on a detection signal SE-O output from the detection circuit DET, and a control circuit T-CNT. The control circuit T-CNT receives the synchronizing signal TSHD and the magnetic-field enable signal SC_EN from the display control device 4, and controls the touch control device 6 so as to operate in synchronization with the display control device 4.

That is, when the synchronizing signal TSHD indicate the touch detection period, the control circuit T-CNT performs control so that the detection circuit DET and the processing circuit PRS operate. Although not particularly limited, the control circuit T-CNT also receives a detection signal from the detection circuit DET, forms the control signal SW, and supplies the control signal SW to the control circuit D-CNT. The processing circuit PRS outputs extracted coordinates from the external terminal To as the coordinate information.

The display area 2 has sides 2-U, 2-D parallel to the row of the pixel array LCD and sides 2-R, 2-L parallel to the column of the pixel array LCD. Here, the side 2-U and the side 2-D are sides opposite to each other, and the plurality of drive electrodes and the plurality of scanning lines in the pixel array LCD are arranged so as to be sandwiched therebetween. The side 2-R and the side 2-L are also sides opposite to each other, and the plurality of signal lines and the plurality of detection electrodes in the pixel array LCD are arranged so as to be sandwiched therebetween.

In vicinity of the side 2-D of the display area 2, the plurality of detection electrodes arranged in the display area 2 are connected to the switching amplification circuit SC-D&. To the switching amplification circuit SC-D&, the magnetic-field enable signal SC_EN is supplied. When the magnetic field touch detection is instructed by the magnetic-field enable signal SC_EN, the switching amplification circuit SC-D& forms a coil using the detection electrodes to supply a ground voltage Vs to one end of the formed coil and to amplify a signal change at the other end of the coil. On the other hand, when the magnetic-field enable signal SC_EN becomes at the low level to instruct the electric field touch detection, the switching amplification circuit SC-D& amplifies a signal change at the detection electrode. The signal change amplified by the switching amplification circuit SC-D& is supplied to the detection circuit DET as each of the detection signals Rx(0) to Rx(p).

The switching circuit SC-R is in a peripheral area of the display panel and is arranged along the side 2-R of the display area 2. Also, the switching drive circuit SC-L is in a peripheral area of the display panel and is arranged along the side 2-L of the display area 2. The switching circuit SC-R is connected to the plurality of drive electrodes arranged in the display area 2 on the side 2-R side of the display area 2, and the switching drive circuit SC-L is connected to the plurality of drive electrodes arranged in the display area 2 on the side 2-L side of the display area 2. That is, the switching circuit SC-R and the switching drive circuit SC-L are arranged in the peripheral area (outside) of the display panel, and is connected to the drive electrodes arranged in the display area 2 in vicinity of the sides of the display area 2.

Although not particularly limited, the detection control circuit SR is in the peripheral area of the display panel and is arranged along the side 2-L of the display area 2, corresponds to the switching drive circuit SC-L arranged along the same side 2-L, and controls the corresponded switching drive circuit SC-L in the touch detection (magnetic field touch detection, electric filed touch detection) period.

The above-described switching circuit SC-R receives the magnetic-field enable signal SC_EN, and electrically connects the predetermined drive electrodes to each other in vicinity of the side 2-R of the display area 2 when the magnetic-field enable signal SC_EN indicates the magnetic field touch detection, that is, is at a high level. On the other hand, when the magnetic-field enable signal SC_EN is at a low level, the switching circuit SC-R electrically insulates the drive electrodes from each other in vicinity of the side 2-R of the display area 2.

To the above-described switching drive circuit SC_L, a predetermined voltage VCOMDC, the ground voltage (first voltage) Vs, the coil lock signal CLK, and the control signal TSV are supplied. To the detection control circuit SR, the control signal T-CNT and the magnetic-field enable signal SC_EN are supplied.

According to the first embodiment, the drive electrodes and the detection electrodes arranged in the display area 2 are used for touch detection in both cases of the magnetic field touch detection and the electric field touch detection. That is, in the magnetic field touch detection, a coil (first coil) is formed of the drive electrodes, and the ground voltage Vs and a drive signal for magnetic field (magnetic field drive signal) are supplied from the switching drive circuit SC_L to one end of a coil selected out of the formed coils and to the other end of the same. In the magnetic field touch detection, a coil (second coil) is formed of detection electrodes arranged in the display area 2, and the ground voltage Vs is supplied to one end of the formed coil. In the magnetic field touch detection, a magnetic field generated by a pen is detected at the other end of the coil formed of the detection electrodes. That is, a signal change at the other end of the coil is amplified by the switching amplification circuit SC-D&, and the amplified signal change is supplied to the detection circuit DET as each of the detection signals Rx(0) to Rx(p).

In the electric field touch detection, an electric field drive signal for generating an electric field is supplied from the switching drive circuit SC-L to the drive electrode arranged in the display area 2. At this time, a signal change at the detection electrode is amplified by the switching amplification circuit SC-D&, and the amplified signal change is supplied to the detection circuit DET as each of the detection signals Rx(0) to Rx(p).

The operations of the switching circuit SC-R, the switching drive circuit SC-L, the detection control circuit SR, and the switching amplification circuit SC-D& in the magnetic field touch detection and the electric field touch detection are described as follows.

When the magnetic field touch detection is designated by the magnetic-field enable signal SC_EN in the touch detection period, the predetermined drive electrodes are electrically connected to each other by the switching circuit SC-R. In this manner, a plurality of coils are formed of the plurality of drive electrodes arranged in the display area 2. The switching drive circuit SC-L is controlled by the detection control circuit SR so as to supply the ground voltage Vs and the coil clock signal CLK (magnetic field drive signal) to one end of a coil selected out of the formed coils and the other end of the same. The ground voltage Vs and the coil clock signal CLK are supplied to the selected coil, and therefore, a magnetic field which changes in accordance with the voltage change of the coil clock signal CLK is generated. In the magnetic field touch detection, the switching amplification circuit SC-D& supplies the ground voltage Vs to one end of each of a plurality of coils formed of the plurality of detection electrodes arranged in the display area 2, and amplifies a signal change at the other end of each coil. When the pen generates the magnetic field, the magnetic field generated by the pen is detected by the coil formed of the detection electrode, is amplified, and is supplied to the detection circuit DET.

In this manner, in the magnetic field touch detection, a magnetic field is generated at a coil selected out of the plurality of coils formed of the respective drive electrodes. At this time, if the pen (having the coil L1 and the capacitive element C) shown in FIG. 1 exists in vicinity of the selected coil, the capacitive element C is charged. When the magnetic field is generated in the pen internal coil L1 by the capacitive element C charged by the electric charge, a signal change based on the ground voltage Vs supplied to one end of the coil formed of the detection electrodes is generated at the other end of the coil. In this manner, it can be detected whether or not the pen exists in vicinity of the selected coil.

On the other hand, when the magnetic-field enable signal SC_EN becomes at a low level to designate the electric field touch detection, the switching circuit SC-R electrically insulates the drive electrodes from each other. The switching drive circuit SC-L is controlled by the detection control circuit SR so as to supply the control signal TSV whose voltage changes periodically to a selected drive electrode as an electric field drive signal. At this time, the switching amplification circuit SC-D& amplifies a signal change at the detection electrode, and supplies the amplified signal change to the detection circuit DET.

In this manner, in the electric field touch detection, the electric field drive signal is supplied to the selected drive electrode, and therefore, as described above with reference to FIG. 4, the signal change at the detection electrode varies in accordance with whether or not the finger exists in vicinity of the selected drive electrode. As a result, the existence of the finger can be detected.

The detection control circuit SR has, for example, a shift register. This shift register has a plurality of stages corresponding to the respective coils formed of the drive electrodes. By the control signal T-CNT, a predetermined stage out of the plurality of stages forming the shift register is set to have a predetermined value. For example, a stage corresponding to the coil formed of the drive electrode closest to the side 2-U of the display area 2 is designated as the first stage of the shift register, and a predetermined value is set to this first stage. For every magnetic field touch detection (or electric field touch detection), the value set to the shift register sequentially shifts. The predetermined value shifting through the shift register serves as information for designating the coil to be selected. Thus, for every magnetic field touch detection (or electric field touch detection), the coils (of drive electrodes) arranged from the side 2-U to side 2-D of the display area 2 is selected, so that the touch by the pen (or finger) can be detected over the entire display area 2.

In the display, note that the switching drive circuit SC-L is controlled by the detection control circuit SR so as to supply the predetermined voltage VCOMDC to the plurality of drive electrodes arranged in the display area 2. Therefore, in the display, the display drive signal (voltage VCOMDC) is supplied to each drive electrode.

<<Module Configuration of the Liquid Crystal Display Apparatus 1>>

Figure 6:
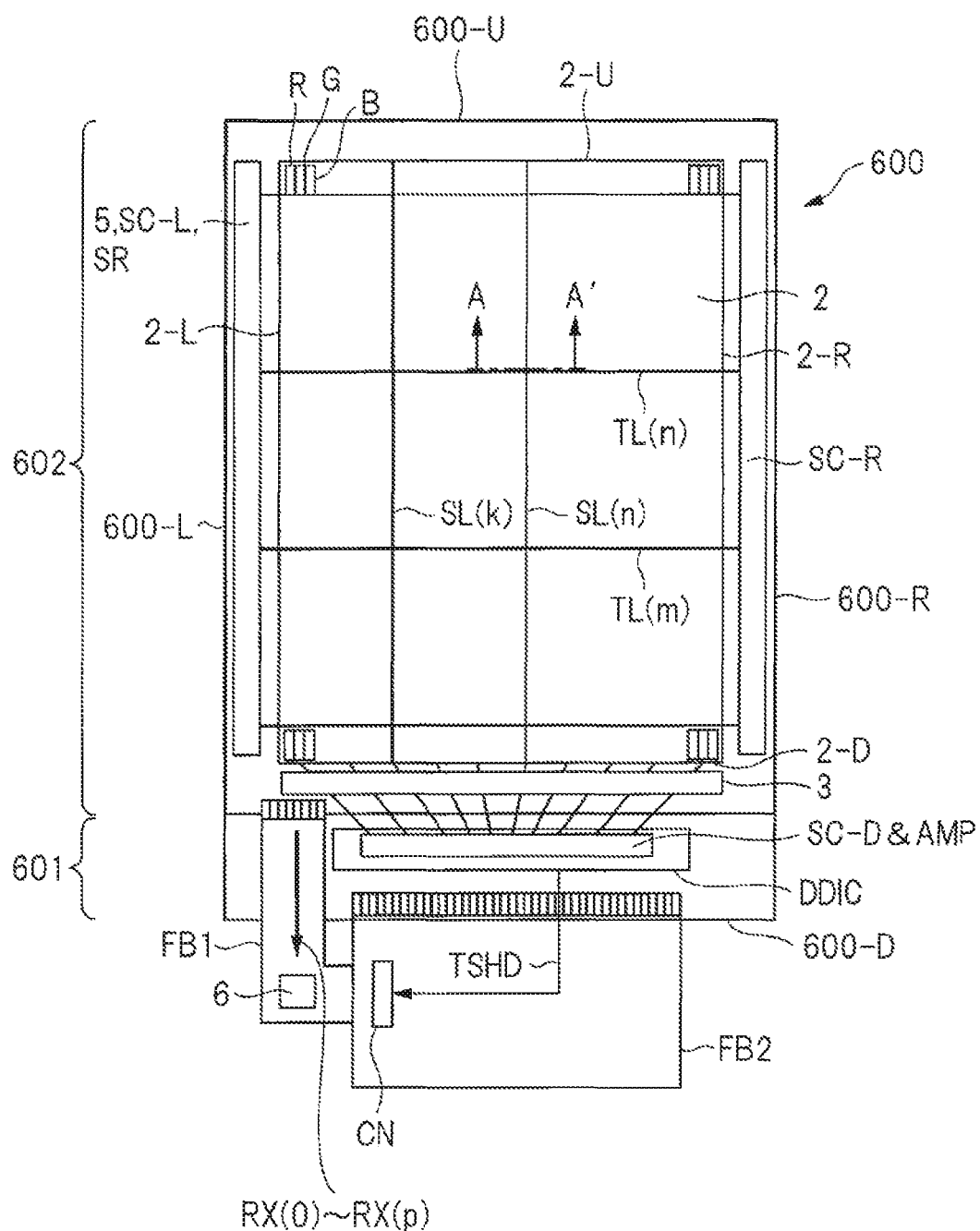
FIG. 6 is a plan view showing a configuration of a module on which the display apparatus according to the first embodiment is mounted.

FIG. 6 is a schematic plan view showing an overall configuration of a module 600 mounted with the liquid crystal display apparatus 1. Although schematically shown, FIG. 6 shows practical arrangement. In this drawing, reference character 601 indicates an area of the TFT glass substrate TGB shown in FIG. 3, and reference character 602 indicates an area where the TFT glass substrate TGB and the CF glass substrate CGB shown in FIG. 3 are stacked. In the module 600, the TFT glass substrate TGB is integrated in the areas 601 and 602. That is, the TFT glass substrate TGB is common between the area 601 and the area 602. And, the CF glass substrate CGB is mounted on the TFT glass substrate TGB in the area 602 so that the first main surface TSF1 of the TFT glass substrate TGB and the second main surface CSF2 of the CF glass substrate CGB are opposite to each other as shown in FIG. 3.

In FIG. 6, reference character 600-U indicates a short side of the module 600, and reference character 600-D indicates a side of the module 600 which is a short side opposite to the short side 600-U. Also, reference character 600-L indicates a long side of the module 600, and reference character 600-R indicates a side of the module 600 which is a long side opposite to the long side 600-L.

The gate driver 5, the switching drive circuit SC-L, and the detection control circuit SR shown in FIG. 5 are arranged in an area between the side 2-L of the display area 2 and the long side 600-L of the module 600 in the area 602. Also, the switching circuit SC-R shown in FIG. 5 is arranged in an area between the side 2-R of the display area 2 and the long side 600-R of the module 600. The signal line selector 3, the switching amplification circuit SC-D&, and the semiconductor device for drive DDIC shown in FIG. 5 are arranged in an area between the side 2-D of the display area 2 and the short side 600-D of the module 600.

In the first embodiment, the signal line driver D-DRV and the control circuit D-CNT shown in FIG. 5 are embedded in one semiconductor device. In the present specification, one semiconductor device is shown as the semiconductor device for drive DDIC. Also, the touch control device 6 shown in FIG. 5 is further embedded in one semiconductor device. In the present specification, In order to distinguish from the semiconductor device for drive DDIC, the semiconductor device in which the touch control device 6 is embedded is called the semiconductor device for touch 6. Naturally, each of the semiconductor device for drive DDIC and the semiconductor device for touch 6 may be configured of a plurality of semiconductor devices, or the semiconductor device for drive DDIC and the semiconductor device for touch 6 may be configured of one semiconductor device.

In the first embodiment, the switching amplification circuit SC-D& is arranged in the area 601 and configured of wires and components formed in the first main surface TSF1 of the TFT glass substrate of the area 601. As the components, a switching component is cited, and the switching component is, for example, an electric field type transistor (hereinafter, called a MOSFET transistor). Also, the semiconductor device for drive DDIC is mounted on the TFT glass substrate TGB so as to cover the switching amplification circuit SC-D& when seen in plan view. Also, the components configuring the switching circuit SC-R, the switching driver SC-L, and the detection control circuit SR are also formed on the first main surface TSF1 of the TFT glass substrate TGB of the area 602.

The detection signals Rx(0) to Rx(p) described in FIG. 5 are transmitted to a flexible cable FB1 although not particularly limited thereto. The touch semiconductor device 6 is mounted on the flexible cable FB1, and the detection signals Rx(0) to Rx(p) are supplied to the touch semiconductor device 6 via wires in the flexible cable FB1. A flexible cable FB2 is connected to the area 601, and a connector CN is mounted on the flexible cable FB2. Through this connector CN, signals are transmitted/received between the touch semiconductor device 6 and the drive semiconductor device DDIC. In FIG. 6, a synchronizing signal TSHD is shown as an example of the transmitted/received signals. Obviously, the detection signals Rx(0) to Rx(p) may be supplied from the switching amplification circuit SC-D& to the touch semiconductor device 6 via the flexible cable FB2 and connector CN.

As described above, the display area 2 includes the pixel array made up of a matrix of a plurality of pixels. The pixel array has the plurality of drive electrodes TL(0) to TL(p) and the plurality of scanning lines GL(0) to GL(p) arranged along rows in the array, and the plurality of signal lines SL(0) to SL(p) and the plurality of detection electrodes RL(0) to RL(p) arranged along columns in the array. In FIG. 6, two drive electrodes TL(n) and TL(m) and two signal wires SL(k) and SL(n) are shown as an example. Note that the scanning lines and detection electrodes are omitted in FIG. 6. However, the scanning lines GL(0) to GL(p) each extend in parallel with the exemplified drive electrodes TL(n) and TL(m), and the detection electrodes RL(0) to RL(p) each extend in parallel with the exemplified signal lines SL(k) and SL(n). The pixel are arranged at the intersections between the signal lines SL(0) to SL(p) and the scanning lines GL(0) to GL(p) or drive electrodes TL(0) to TL(p). Reference characters "R", "G", and "B" indicated on four sides of the display area 2 shown in FIG. 6 represent pixels corresponding to the three primary colors.

<<Structure of the Display Panel>>

Figure 7:
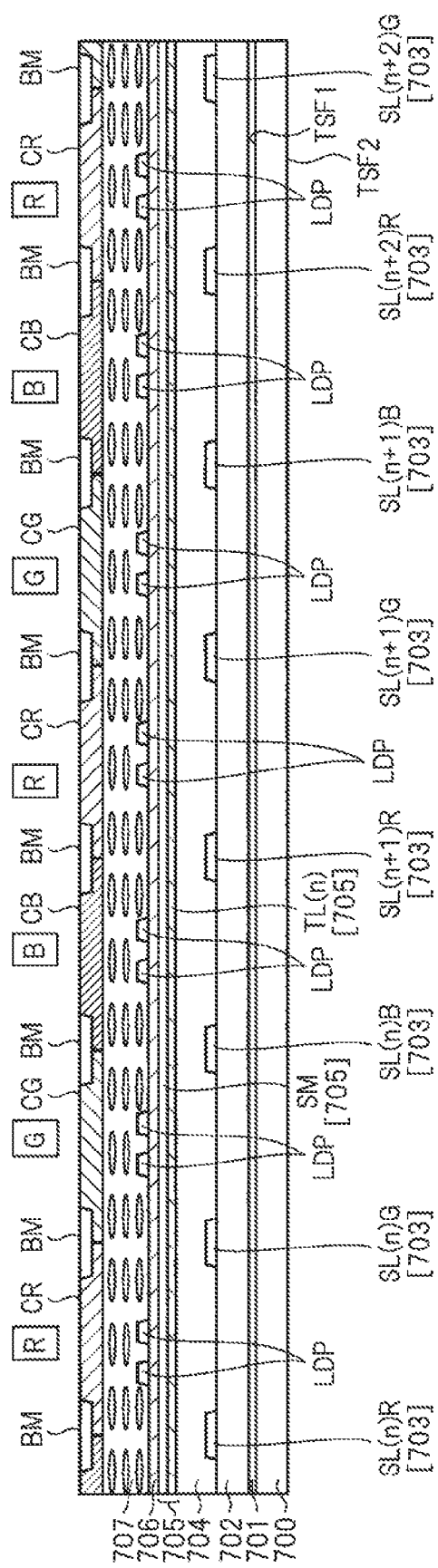
FIG. 7 is a cross-sectional view showing a structure of the display apparatus according to the first embodiment.

FIG. 7 is a cross-sectional view showing the configuration of the display area 2 included in the liquid crystal display apparatus 1 according to the first embodiment. From the viewpoint of display, the display area 2 (first area) which is the display part of the display panel 2 can be considered to be an active area, and an area (second area) in the peripheral part of the display panel (outside the display area 2) can be considered to be a non-active area or a peripheral area. In this case, in explanation with reference to FIG. 6 as an example, the active area is an area surrounded by the sides 2-U, 2-D, 2-R, 2-L of the display area 2.

FIG. 7 shows an A-A' cross section of the display area 2 shown in FIG. 6. In the first embodiment, in order to produce a color display, one color pixel is displayed by using three pixels corresponding to three primary colors of R(red), G(green), and B(blue). That is, one color pixel can be considered to be formed of three sub-pixels. In this case, in the display period, signal lines that transfer a color image signal are formed of three signal lines, respectively. In order to concretely show a structure of the display area 2, FIG. 7 shows a case of producing the color display.

Before the explanation of FIG. 7, reference characters of the signal lines used in FIG. 7 will be described. Each of the signal lines SL(0) to SL(p) indicates a signal line that transfers a color image signal in a display period. Each signal line includes three signal lines that transfer an image signal to three sub-pixels. In FIG. 7, the three signal lines are distinguished from one another by attaching an alphabetical character of the corresponding sub-pixel to the end of the reference character of the signal line. When the signal line SL(n) is exemplified, the signal line SL(n) includes signal lines SL(n)R, SL(n)G, SL(n)B. Here, the alphabetical character "R" attached to the end of the reference character SL(n) indicates a red color (R) of the three primary colors, and the signal line SL(n)R indicates a signal line that transfers an image signal to a sub-pixel corresponding to red (R) of the three primary colors in the display period. The alphabetical character "G" attached to the end of the reference character SL(n) indicates a green color (G) of the three primary colors, and the signal line SL(n)G indicates a signal line that transfers an image signal to a sub-pixel corresponding to green (G) of the three primary colors. The alphabetical character "B" attached to the end of the reference character SL(n) indicates a blue color (B) of the three primary colors, and the signal line SL(n)B indicates a signal line that transfers an image signal to a sub-pixel corresponding to the signal line SL(n)B.

In FIG. 7, reference character 700 indicates a TFT glass substrate TGB. On the first main surface TSF1 of the TFT glass substrate (TGB) 700, a first wiring layer (conductive layer) 701 is formed. The scanning line GL(n) is configured of a wire formed in the first wiring layer 701. An insulating layer 702 is formed on the first wiring layer 701, and a second wiring layer (conductive layer) 703 is formed on the insulating layer 702. Signal lines SL(n)R, SL(n)G, SL(n)B, signal lines SL(n+1)R, SL(n+1)G, SL(n+1)B, and signal lines SL(n+2)R, SL(n+2)G are configured of a wire formed in the second wiring layer 703. In this drawing, in order to show the fact that these signal lines are configured of the second wiring layer 703, reference character 703 indicating the second wiring layer is attached to the end of the signal line in parenthesis []. For example, the signal line SL(n)G is indicated as SL(n)G[703].

An insulating layer 704 is formed on the second wiring layer 703, and a third wiring layer (conductive layer) 705 is formed on the insulating layer 704. The drive electrode TL(n) and the auxiliary electrode SM are configured of a wire formed in the third wiring layer 705. Here, the drive electrode TL(n) is a transparent electrode (first electrode). The auxiliary electrode SM (secondary electrode) has a resistance value lower than that of the drive electrode TL(n) and is formed so as to be electrically connected to the drive electrode TL(n). The resistance value of the drive electrode TL(n) which is a transparent electrode is relatively high. However, by electrically connecting the auxiliary electrode SM to the drive electrode TL(n), the resistance of the drive electrode can be reduced by the combined resistance. Also here, a reference character [705] attached to the reference characters of the drive electrode and the auxiliary electrode indicates that they are configured of the third wiring layer 705.

An insulating layer 706 is formed on the third wiring layer 705, and a pixel electrode LDP is formed on the top surface of the insulating layer 706. In FIG. 7, each of CR, CB, and CG is a color filter. A liquid crystal layer 707 is sandwiched between the color filters CR(red), CG(green), CB(blue) and the insulating layer 706. Here, the pixel electrode LDP is surrounded by a scanning line and a signal line, and the color filter CR, CG, or CB corresponding to each of the pixel electrodes LDP is provided so as to be opposite to each pixel electrode LDP. A black matrix BM is provided between the color filters CR, CG, CB.

Although omitted in FIG. 7, the CF glass substrate CGB is stacked so as to be opposite to the first main surface TSF1 of the TFT glass substrate 700 as shown in FIG. 3B. The above-described color filters CR, CG, and CB are formed on the second main surface CSF2 of the CF glass substrate CGB. In other words, the CF glass substrate CGB is stacked on the TFT glass substrate (TGB) 700 across the above-described first to third wiring layers, insulating layers, and liquid crystal layer 707, and the color filters CR, CG, and CB formed on the second main surface CSF2 of the CF glass substrate CGB. Although omitted in FIG. 7, a fourth wiring layer (conductive layer) is formed on the first main surface CSF1 of the CF glass substrate CGB as shown in FIG. 3B, and the detection electrodes RL(0) to RL(p) described in FIGS. 3 to 6 are configured of wirings of the fourth layer. As shown in FIG. 3, the polarizing plate is further arranged on upper surfaces of the detection electrodes RL(0) to RL(p).

As described above, the scanning lines GL, signal lines SL, and drive electrodes TL are arranged on the first main surface TSF1 of the TFT glass substrate TGB. The detection electrodes RL are arranged on the first main surface CSF1 of the CF glass substrate CGB, which is separated from the TFT glass substrate TGB by the liquid crystal layer, etc.

Here, as one example of the above-described first to fourth wiring layers, the first wiring layer 701 is made of, for example, molybdenum (Mo), and the second wiring layer 703 and the fourth wiring layer are made of, for example, aluminum (Al) or copper (Cu). A wiring layer corresponding to the drive electrode among the third wiring layer 705 is made of, for example, indium tin oxide, and a wiring layer corresponding to the auxiliary electrodes SM among them is made of, for example, aluminum or copper.

Since the second wiring layer 703 and the fourth wiring layer are made of aluminum or copper, the resistance values of the signal lines SL(0) to SL(p) and detection electrodes RL(0) to RL(p) are smaller than those of, for example, the scanning lines GL(0) to GL(p) or others. Since the auxiliary electrodes SM are made of aluminum or copper and are connected to the drive electrodes TL(0) to TL(p), the resistance values of the drive electrodes TL(0) to TL(p) are also small.

Unless otherwise specified in the present specification, the drive electrode means the drive electrode electrically connected with the auxiliary electrode SM. That is, each of the drive electrodes TL(0) to TL(p) means a transparent electrode and the auxiliary electrode SM electrically connected to the transparent electrode. In the present specification, an expression ". . . is formed on . . . " is used for simplifying the description. For example, an expression "the insulating layer 702 is formed on the first wiring layer 701" is used. A term "on" used in the present specification means that they may be or not be in contact with each other. In the description using the above-described example, the expression means that "the insulating layer 702" may be or not be in contact with "the first wiring layer 701".

<<Pixel Array>>

Figure 8:
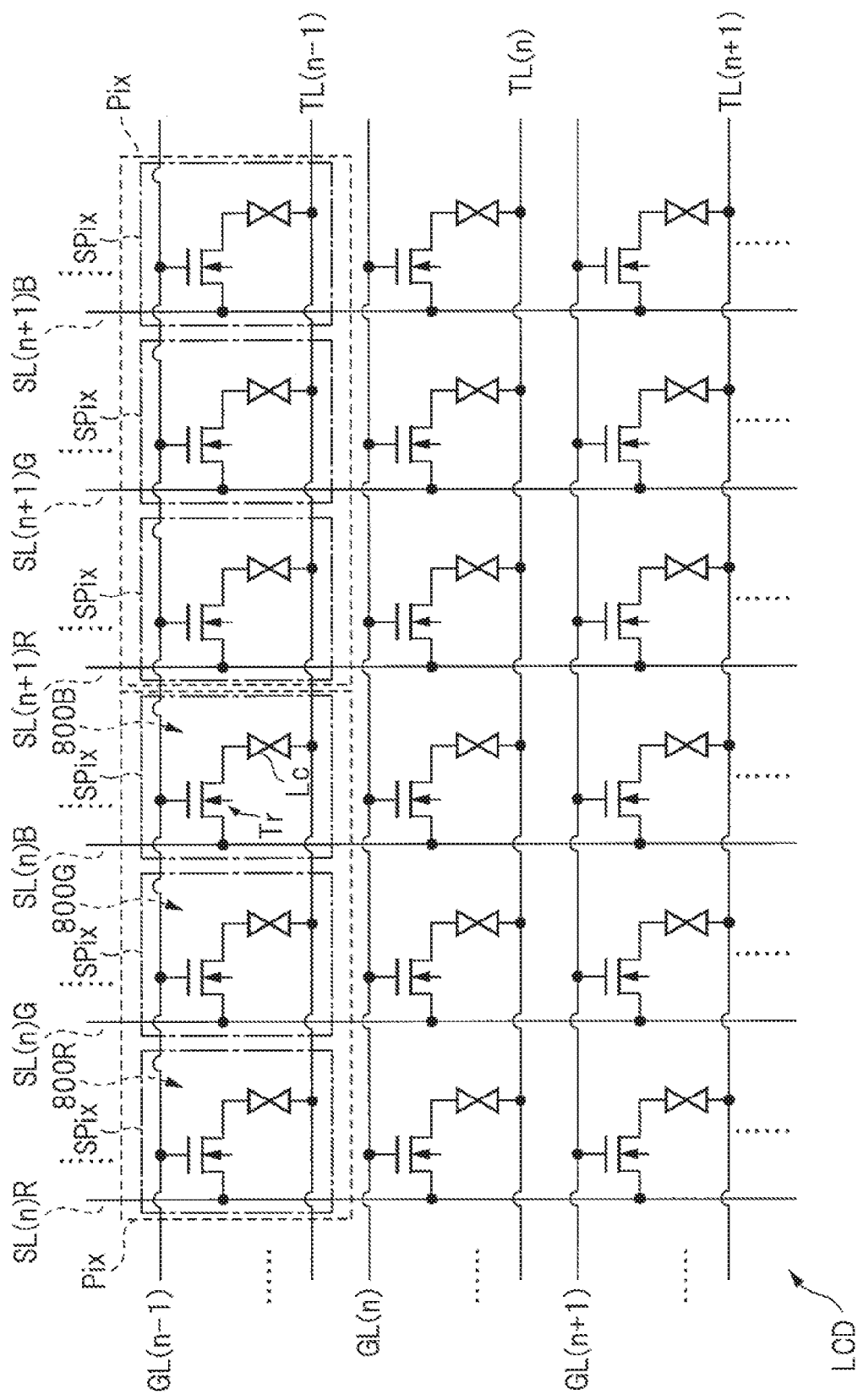
FIG. 8 is a circuit diagram showing a configuration of a display area of the display apparatus according to the first embodiment.

Next, the circuit configuration of the display area 2 will be described. FIG. 8 is a circuit diagram showing a circuit configuration of the display area 2 shown in FIGS. 5 and 6. Also in FIG. 8, a signal line is shown in the same form as in FIG. 7. In this drawing, each of a plurality of SPix indicated by an alternate long and short dash line shows one liquid crystal display element (sub-pixel). The sub-pixel SPix is arranged in a matrix form in the display area 2 to configure a liquid crystal element array (pixel array) LCD. The pixel array LCD includes a plurality of the scanning lines GL(0) to GL(p) arranged in each row and extending in the row direction and signal lines SL(0)R, SL(0)G, SL(0)B to SL(p)R, SL(p)G, SL(p)B arranged in each column and extending in the column direction. The pixel array LCD also includes the drive electrodes TL(0) to TL(p) arranged in each row and extending in the row direction and the detection electrodes RL(0) to RL(p) arranged in each column and extending in the column direction.

FIG. 8 shows pixel array portions related to the scanning lines GL(n−1) to GL(n+1), the signal lines SL(n)R, SL(n)G, SL(n)B to SL(n+1)R, SL(n+1)G, SL(n+1)B, and to the drive electrodes TL(n−1) to TL(n+1). Note that the detection electrodes RL(0) to RL(p) are omitted in FIG. 8.

In order to simply the description, in FIG. 8, the drive electrodes TL(n−1) to TL(n+1) are shown so as to be arranged in the respective rows. However, one drive electrode may be arranged in a plurality of rows. Similarly, regarding the detection electrodes, one detection electrode may be arranged in a plurality of columns.

Each sub-pixel SPix arranged at an intersection of a row and a column of the pixel array LCD includes a thin film transistor Tr formed on the TFT glass substrate 700 and a liquid crystal element LC whose one terminal is connected to the source of the thin film transistor Tr. In the pixel array LCD, gates of the thin film transistors Tr of the plurality of sub-pixels SPix arranged in the same row are connected to the scanning line arranged in the same row, and drains of the thin film transistors Tr of the plurality of sub-pixels SPix arranged in the same column are connected to the signal line arranged in the same column. In other words, the plurality of sub-pixels SPix is arranged in a matrix form, a scanning line is arranged in each row, and the plurality of sub-pixels SPix arranged in the corresponding row is connected to the scanning line. Also, a signal line is arranged in each column, and the pixels SPix arranged in the corresponding column are connected to the signal line. The other ends of the liquid crystal elements LC of the plurality of sub-pixels SPix arranged in the same row are connected to the drive electrode arranged in the row.

In the description of the example shown in FIG. 8, in this drawing, the gate of the thin film transistor Tr of each of the plurality of sub-pixels SPix arranged in the top row is connected to the scanning line GL(n−1) arranged in the top row. In this drawing, the drain of the thin film transistor Tr of each of the plurality of sub-pixels SPix arranged in the leftmost column is connected to the signal line SL(n)R arranged in the leftmost column. Further, in FIG. 8, the other end of the liquid crystal element LC of each of the plurality of sub-pixels SPix arranged in the top row is connected to the drive electrode TL(n−1) arranged in the top row.

As described above, one sub-pixel SPix corresponds to one of the three primary colors. Thus, the three primary colors of R, G, and B are formed of three sub-pixels SPix. In FIG. 8, one color pixel Pix is formed of three sub-pixels SPix arranged consecutively in the same row, and colors are expressed by the pixel Pix. That is, in FIG. 8, the sub-pixel SPix indicated as a reference character 800R becomes a sub-pixel SPix(R) of R(red), the sub-pixel SPix indicated as a reference character 800G becomes a sub-pixel SPix(G) of G(green), and the sub-pixel SPix indicated as a reference character 800B becomes a sub-pixel SPix(B) of B(blue). Thus, the sub-pixel SPix(R) indicated by the reference character 800R is provided with a red color filter CR as a color filter, the sub-pixel SPix(G) indicated by the 800G is provided with a green color filter CG as a color filter, and the sub-pixel SPix(B) indicated by the 800B is provided with a blue color filter CB as a color filter.

An image signal corresponding to R of a signal representing one pixel is supplied to the signal line SL(n)R from the signal line selector 3, an image signal corresponding to G is supplied from the signal line selector 3 to the signal line SL(n)G, and an image signal corresponding to B is supplied from the signal line selector 3 to the signal line SL(n)B.

Although not specifically limited, the thin film transistor Tr in each sub-pixel SPix is, an N-channel MOSFET. To the scanning lines GL(0) to GL(p), for example, pulse-state scanning line signals whose levels are successively set to a higher level in this order of the scanning lines are supplied from the gate driver 5 (FIGS. 5 and 6). That is, in the pixel array LCD, the voltages of scanning lines are successively set to a higher level from the scanning line GL(0) arranged in the top row toward the scanning line GL(p) arranged in the bottom row. Accordingly, in the pixel array LCD, the thin film transistors Tr in the sub-pixels SPix are successively conducted from the sub-pixel SPix arranged in the top row toward the sub-pixel SPix arranged in the bottom row.

By the state in which the thin film transistor Tr is switched ON, the image signal supplied to the signal line at that time is supplied to the liquid crystal element LC via the ON-state thin film transistor. The electric field of the liquid crystal element LC changes depending on a differential voltage between the voltage of a display drive signal supplied to the drive electrodes TL(0) to TL(p) and the voltage of a supplied image signal, so that the ratio of light (transmissivity) passing through the liquid crystal element LC thereof changes. Accordingly, a color image in accordance with an image signal supplied to the signal lines SL(0)R, SL(0)G, SL(n)B to SL(p)R, SL(p)G, SL(p)B in synchronization with scanning line signals supplied to the scanning lines GL(0) to GL(p) is displayed in the display area 2.

Each of the plurality of sub-pixels SPix can be considered to have a selection terminal and a pair of terminals. In this case, the gate of the thin film transistor Tr configuring the sub-pixel SPix is the selection terminal of the sub-pixel SPix, the drain of the thin film transistor Tr is one terminal of the pair of terminals, and the other end of the liquid crystal element LC is the other terminal of the sub-pixel SPix.

Here, the correspondence between the arrangement of the display area 2 shown in FIGS. 5 and 6 and the circuit diagram shown in FIG. 8 will be described as follows.

The pixel array LCD has a pair of sides substantially parallel to the row of the array thereof and has a pair of sides substantially parallel to the column of the array thereof. The paired sides that are parallel to the row of the pixel array LCD are a first side and a second side corresponding to the short sides 2-U, 2-D of the display area 2 shown in FIGS. 5 and 6, and the paired sides that are parallel to the column of the pixel array LCD are a third side and a fourth side corresponding to the long sides 2-L, 2-R of the display area 2.

In the pixel array LCD, as shown in FIG. 6, the signal line selector 3, the switching amplification circuit SC-D&, and the semiconductor device for drive DDIC are arranged along the second side of the pair of sides parallel to the row, that is, the one short side 2-D of the display area 2. In the pixel array LCD, in vicinity of the second side (short side 2-D of the liquid crystal area 2), an image signal from the semiconductor device for drive DDIC is supplied to the signal lines SL(0)R, SL(0)G, SL(0)B to SL(p)R, SL(p)G, SL(p)B via the signal line selector 3.

In the pixel array LCD, the gate driver 5 is arranged along the third side of the pair of sides (third and fourth sides) parallel to the column, that is, the long side 2-L of the display area 2. In the pixel array LCD, a scanning line signal from the gate driver 5 is supplied to the scanning lines GL(0) to GL(p) on the third side. In FIG. 6, the gate driver 5 is arranged along the long side 2-L of the display area 2. However, the gate driver 5 may be divided into two units and be arranged along the long side 2-L (third side of the pixel array LCD) and the long side 2-R (fourth side of the pixel array LCD).

The pixel array LCD caused when a color display is produced in the display area 2 has been concretely described, and the pixel array LCD may be considered to be configured of a plurality of color pixels Pix (pixel), each of which is configured of three sub-pixels SPix. When considered as described above, the plurality of pixels Pix are arranged in a matrix form to configure the pixel array LCD. The corresponding scanning lines GL(0) to GL(p) and the corresponding drive electrodes TL(0) to TL(p) are arranged in the respective rows of the pixel array LCD configured of pixels Pix, and the signal lines SL(0) to SL(p) and the detection electrodes RL(0) to RL(p) are arranged in the respective columns thereof.

In this case, three sub-pixels SPix are considered to be one pixel Pix, and the pixel Pix is considered to have a configuration similar to that of the sub-pixel SPix. The respective selection terminals of pixels Pix arranged in a matrix form in the pixel array LCD are connected to the scanning line GL(0) to GL(p) arranged in the same row as the pixel Pix, one respective terminals of pixels Pix are connected to the signal line SL(0) to SL(p) arranged in the same column, and the other respective terminals of pixels Pix are connected to the drive electrode TL(0) to TL(p) arranged in the same column. Naturally, one drive electrode may correspond to a plurality of rows of the pixel array LCD. In such a case, the other terminal of the pixel Pix arranged in the plurality of rows is connected to the common drive electrode.

Also when the pixel array LCD is considered to be configured of the plurality of pixels Pix as described above, the correspondence between the arrangement of the display area 2 shown in FIGS. 5 and 6 and the circuit diagram shown in FIG. 8 is the same as described above.

A case in which the number of sub-pixels SPix configuring one color pixel Pix is three has been described. However, the present embodiment is not limited to such an example. For example, one color pixel may be formed of sub-pixels of, in addition to R, G, B described above, any one color or a plurality of colors of white (W) and yellow (Y) and also complementary colors of R, G, B (cyan (C), magenta(M), and yellow (Y)).

<<Configurations of Switching Circuit, Switching Drive Circuit, and Detection Control Circuit>>

Figure 9:
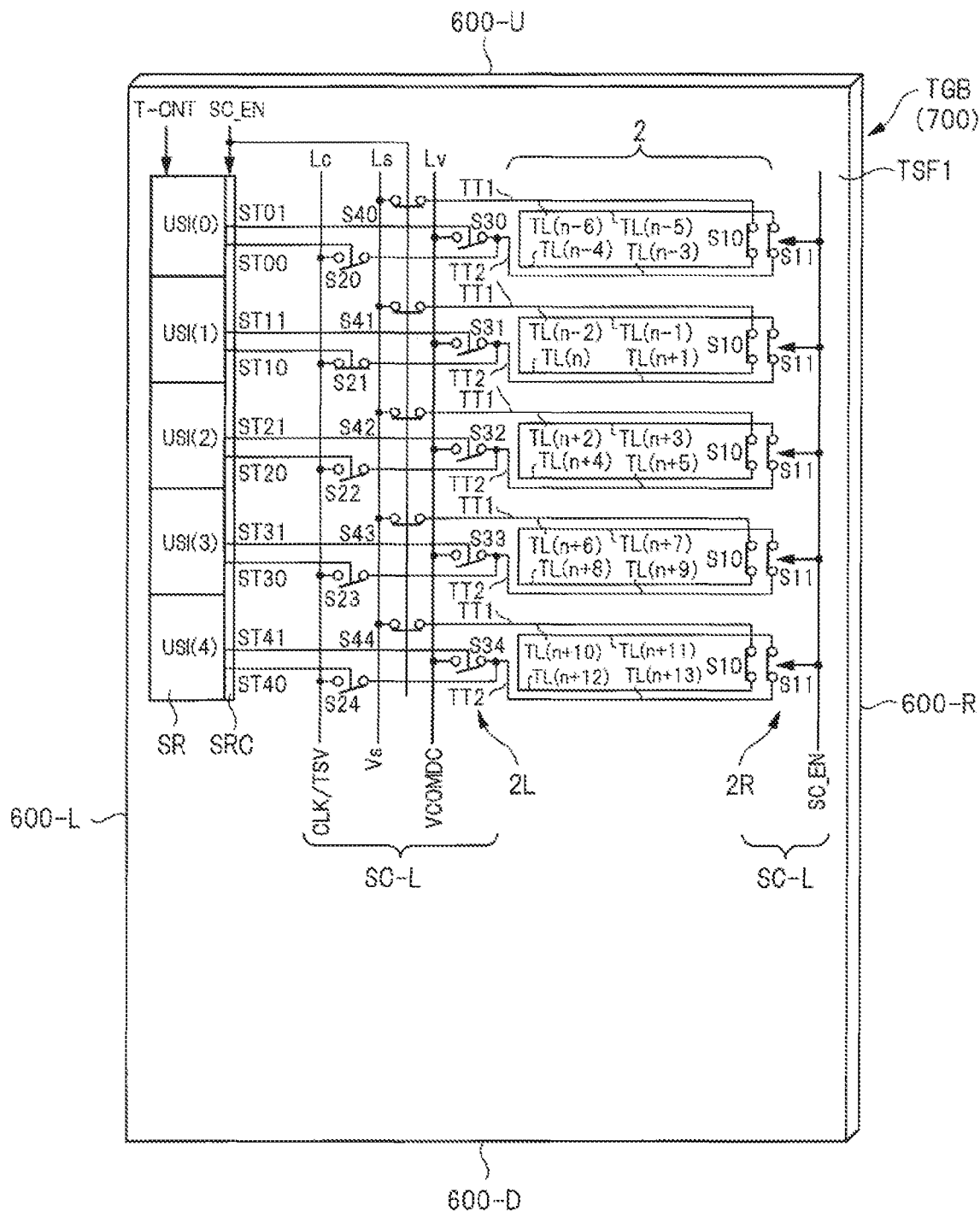
FIG. 9 is a block diagram showing a configuration of the display apparatus according to the first embodiment obtained in magnetic field touch detection.

FIG. 9 is a block diagram of a configuration of the liquid crystal display apparatus 1 according to the first embodiment. FIG. 9 shows drive electrodes TL(n−6) to TL(n+13) out of the drive electrodes TL(0) to TL(p) arranged in the display area 2. Also in the switching circuit SC-R, switching drive circuit SC-L, and detection control circuit SR, only their parts corresponding to the drive electrodes TL(n−6) to TL(n+13) are shown. By exemplifying the drive electrodes TL(n−6) to TL(n+13) of FIG. 9, configurations and operations of the switching circuit SC-R, the switching drive circuit SC-L, and the detection control circuit SR will be described. Note that the drive electrodes TL(0) to TL(p), the switching circuit SC-R, the switching drive circuit SC-L, and the detection control circuit SR are formed of wirings, elements, etc., formed on the first main surface TSF1 of the TFT glass substrate TGB. While FIG. 9 is illustrated so as to be scaled down in order to easily see the drawing, is illustrated so that the units are shown in their practical arrangement.

In FIG. 9, the drive electrodes TL(n−6) to TL(n+13) are parallel with each other and extend in the row direction (horizontal direction in FIG. 9) in the display area 2. The switching circuit SC-R has a plurality of first switches S10 and a plurality of second switches S11, and the first and second switches S10 and S11 are controlled to be switched by the magnetic-field enable signal SC_EN.

According to the first embodiment, in the magnetic field touch detection, four drive electrodes are used to form one double winding coil. That is, four drive electrodes arranged close to and parallel with each other when seen in a plan view are electrically connected in series to form one coil. In the description with reference to FIG. 9, the drive electrodes TL(n−6) to TL(n−3) are electrically connected in series to form one coil. Similarly, one coil is formed of the drive electrodes TL(n−2) to TL(n+1), and one coil is formed of the drive electrodes TL(n+2) to TL(n+5). Further, one coil is formed of the drive electrodes TL(n+6) to TL(n+9), and one coil is formed of the drive electrodes TL(n+10) to TL(n+13).

In order to form the coil, respective one ends of the drive electrodes TL(n−4) and TL(n−5) are electrically connected to each other in vicinity of the side 2-L of the display area 2. The other end of the drive electrode TL(n−4) is connected to a first switch S10 in vicinity of the side 2-R of the display area 2. The one end of the drive electrode TL(n−6) is connected to a node TT1, which is an end of the coil, in vicinity of the side 2-L, while the other end of the drive electrode TL(n−6) is connected to the first switch S10 in vicinity of the side 2-R. The other end of the drive electrode TL(n−5) is connected to a second switch S11 in vicinity of the side 2-R. The one end of the drive electrode TL(n−3) is connected to a node TT2, which is an end of the coil, in vicinity of the side 2-L, while the other end of the drive electrode TL(n−3) is connected to the second switch S11 in vicinity of the side 2-R.

In the magnetic field touch detection, the magnetic-field enable signal SC_EN becomes at high, so that the first and second switches S10 and S11 are switched ON. In this manner, the drive electrodes TL(n−3) to TL(n−6) are connected in series between the node TT1 and the node TT2, which are the ends of the coil, so that one coil is formed.

Also for the drive electrodes TL(n−2) to TL(n+1), in the magnetic field touch detection, the drive electrodes TL(n−2) to TL(n+1) are connected in series between a node TT1 and a node TT2, which are the ends of the coil. That is, respective one ends of the drive electrodes TL(n) and TL(n−1) are electrically connected to each other in vicinity of the side 2-L of the display area 2. The other end of the drive electrode TL(n) is connected to a first switch S10 in vicinity of the side 2-R of the display area 2. The one end of the drive electrode TL(n−2) is connected to a node TT1, which is an end of the coil, in vicinity of the side 2-L, while the other end of the drive electrode TL(n−2) is connected to the first switch S10 in vicinity of the side 2-R. The other end of the drive electrode TL(n−1) is connected to a second switch S11 in vicinity of the side 2-R. The one end of the drive electrode TL(n+1) is connected to a node TT2, which is an end of the coil, in vicinity of the side 2-L, while the other end of the drive electrode TL(n+1) is connected to the second switch S11 in vicinity of the side 2-R.

In the magnetic field touch detection, the magnetic-field enable signal SC_EN becomes at high, so that the first and second switches S10 and S11 are switched ON. In this manner, the drive electrodes TL(n−2) to TL(n+1) are connected in series between the node TT1 and the node TT2, which are the ends of the coil, so that one coil is formed.

Hereinafter, similarly, in the magnetic field touch detection, the first and second switches S10 and S11 are switched ON, so that the drive electrodes TL(n+2) to TL(n+5) are connected in series between the node TT1 and the node TT2, which are the ends of the coil, the drive electrodes TL(n+6) to TL(n+9) are connected in series between the node TT1 and the node TT2, which are the ends of the coil, and the drive electrodes TL(n+10) to TL(n+13) are also connected in series between the node TT1 and the node TT2, which are the ends of the coil.

In the magnetic field touch detection, this manner forms five coils which use the drive electrodes TL(n−6) to TL(n+13) as windings, respectively.

The switching drive circuit SC-L has a plurality of third switches, fourth switches, and fifth switches. The third and fourth switches are switched under control by a selection signal from the detection control circuit SR, while the fifth switches are switched under control by the magnetic-field enable signal SC_EN. In FIG. 9, switches S20 to S24 correspond to the third switches, switches S30 to S34 correspond to the fourth switches, and the switches S40 to S44 correspond to the fifth switches.

In the display area 2, the detection control circuit SR generates and outputs a plurality of selection signals to touch detection areas, respectively. A selection signal output from the detection control circuit SR is used as a selection signal for specifying a touch detection coil in the magnetic field touch detection, and is used as a selection signal for specifying a touch detection drive electrode in the electric field touch detection. In the first embodiment, the detection control circuit SR has a shift register and a control circuit. The shift register has a plurality of stages (register stages) connected in series. Out of the plurality of register stages, the register stages corresponding to the drive electrodes TL(n−6) to TL(n+13) are shown as reference characters USI(0) to USI(4) in FIG. 9.

Here, the register stage USI(0) corresponds to the drive electrodes TL(n−6) to TL(n−3), the register stage USI(1) corresponds to the drive electrodes TL(n−2) to TL(n+1), and the register stage USI(2) corresponds to the drive electrodes TL(n+2) to TL(n+5). The register stage USI(3) corresponds to the drive electrodes TL(n+6) to TL(n+9), and the register stage USI(4) corresponds to the drive electrodes TL(n+10) to TL(n+13).

Before execution of touch detection, a predetermined value is set to a predetermined register stage by the control signal T-CNT. For example, a predetermined value is set to the register stage USI(0). By a shift clock signal not shown, the predetermined value set to the register stage USI(0) is sequentially shifted (moved) from the register stage USI(1) to the register stage USI(4) for each execution of the touch detection. Based on the value stored in each of the register stages USI(0) to USI(4) and on the magnetic-field enable signal SC_EN, the control circuit SRC generates and outputs selection signals ST00, ST01 to ST40 and ST41 corresponding to the register stages USI(0) to UIS(4), respectively.

When the predetermined value is stored in the register stage USI(0), for example, the control circuit SRC sets the selection signal ST00 corresponding to the register stage USI(0) to be a high level, and the selection signals ST10, ST20, ST30, and ST40 corresponding to the register stages USI(1) to UIS(4) to be a low level. At this time, the control circuit SRC changes the levels of the selection signals ST01, ST11, ST21, ST31, and ST41 depending on which one of the magnetic field touch detection and the electric field touch detection the magnetic-field enable signal SC_EN specifies. When the magnetic-field enable signal SC_EN specifies the magnetic field touch detection, the control circuit SRC sets each of the selection signals ST01, ST11, ST21, ST31, and ST41 to be the low level, regardless of the value stored in each of the register stages USI(0) to UIS(4). On the other hand, when the magnetic-field enable signal SC_EN specifies the electric field touch detection, the control circuit SRC sets the selection signal ST01 corresponding to the register stage USI(0) storing the predetermined value to be the low level, and sets the rest of selection signals ST11, ST21, ST31, and ST41 corresponding to the register stages USI(1), USI(2), USI(3), and UIS(4) to be the high level.

When the predetermined value is moved by the shifting from the register stage USI(0) to the register stage USI(1), the control circuit SRC sets the selection signal ST10 corresponding to the register stage USI(1) to be the high level, and sets the rest of selection signals ST00, ST20, ST30, and ST40 to be the low level, depending on a predetermined value stored in the register stage USI(1). When touch detection is executed as the magnetic field touch detection, the control circuit SRC sets the selection signals ST01, ST11, ST21, ST31, and ST41 to be the low level. When the touch detection is executed as the electric field touch detection, the control circuit SRC sets the selection signal ST11 to be the low level, and sets the election signals ST01, ST21, ST31, and ST41 to be the high level.

Hereinafter, similarly, by the movement of the predetermined value among the register stages USI(2) to UST(4), the selection signals ST20 to ST40 are sequentially set to be the high level. At this time, the selection signals ST11 to ST41 are set to the low level in the case of the magnetic field touch detection, and the selection signals ST21 to ST41 are set to be the low level in the case of the electric field touch detection. In this manner, the predetermined value serves as information for specifying an area where touch detection is executed, and therefore, the predetermined value can be regarded as touch detection area specifying information.

In the display period, note that the control circuit SRC sets the selection signals ST00, ST10, ST20, ST30, and ST40 to be the low level and sets the selection signals ST01, ST11, ST21, ST31, and ST41 to be the high level, regardless of the value stored in the shift register. For example, when the synchronizing signal TSHD supplied to the control circuit SRC indicates the display period, the control circuit SRC generates the selection signal with the above-described level.

The third switches S20 to S24 included in the switching drive circuit SC-L are switched under control by the corresponding selection signals ST00 to ST40, the fourth switches S30 to S34 are switched under control by the corresponding selection signals ST01 to ST41, and the fifth switches S40 to S44 are switched under control by the magnetic-field enable signal SC_EN. In the first embodiment, each of the third switches S20 to S24, the fourth switches S30 to S34, and the fifth switches S40 to S44 is switched on when the supplied signal (selection signal and magnetic-field enable signal) is at the high level, and is switched off when the supplied signal is at the low level. For example, the third switch S20 is switched on when the corresponding selection signal ST00 is at the high level, and is switched off when the selection signal ST00 is at the low level. The fourth switch S30 is switched on when the corresponding selection signal ST01 is at the high level, and is switched off when the selection signal ST01 is at the low level. Similarly, the fifth switch S40 is switched on when the magnetic-field enable signal SC_EN is at the high level, and is switched off when the magnetic-field enable signal SC_EN is at the low level. The rest of the third, fourth, and fifth switches are similarly switched.

Each one end of the drive electrodes TL(n−6), TL(n−2), TL(n+2), TL(n+6), and TL(n+10), that is, the node TT1 which is one end of the coil, is connected to a signal wiring Ls via each of the fifth switches S40 to S44. Each one end of the drive electrodes TL(n−3), TL(n+1), TL(n+5), TL(n+9), and TL(n+13), that is, the node TT2 which is one end of the coil, is connected to a signal wiring Lc via each of the third switches S20 to S24. Each one end (note TT2) of the drive electrodes TL(n−3), TL(n+1), TL(n+5), TL(n+9), and TL(n+13) is connected to a signal wiring LV via each of the fourth switches S30 to S34. Here, the ground voltage Vs is supplied to the signal wiring Ls, while a predetermined voltage VCOMDC is supplied to the signal wiring Lv. To the signal wiring Lc, the coil clock signal CLK is supplied in the magnetic field touch detection, and the control signal TSV whose voltage periodically changes is supplied in the electric field touch detection.

<<Operation in Display Period>>

In the display period, the magnetic-field enable signal SC_EN is at the low level. As a result, the first and second switches S10 and S11 in the switching circuit SC-R are switched off. The fifth switches S40 to S44 in the switching drive circuit SC-L are also switched off. In the display period, the selection signals ST00 to ST40 are at the low level, and the selection signals ST01 to ST41 are at the high level. As a result, the third switches S20 to S24 are also switched off, while the fourth switches S30 to S34 are switched on.

The fifth switches S40 to S44 are switched off, so that each one end (node TT1) of the drive electrodes TL(n−6), TL(n−2), TL(n+2), TL(n+6) and TL(n+10) is electrically disconnected from the signal wiring Ls. The third switches S20 to S24 are switched off, so that each one end (node TT2) of the drive electrodes TL(n−3), TL(n+1), TL(n+5), TL(n+9) and TL(n+13) is electrically disconnected from the signal wiring Lc. At this time, the fourth switches S30 to S34 are switched on, so that each one end (node TT2) of the drive electrodes TL(n−3), TL(n+1), TL(n+5), TL(n+9) and TL(n+13) is electrically connected to the signal wiring Lv through the fourth switches.

Thus, in the display period, the predetermined voltage VCOMDC is supplied from the signal wiring Lv to the drive electrodes TL(n−3), TL(n+1), TL(n+5), TL(n+9) and TL(n+13). In the display period, the voltage VCOMDC is thus supplied to these drive electrodes as a display drive signal.

Note that the first and second switches S10 and S11 may be controlled by a signal based on, for example, the synchronizing signal TSHD and the magnetic-field enable signal SC_EN so that the first and second switches S10 and S11 are switched on in the display period. By this manner, the display drive signal VCOMDC can be supplied to drive electrodes other than the drive electrodes TL(n−3), TL(n+1), TL(n+5), TL(n+9) and TL(n+13) in the display period.

<<Operation in Magnetic Field Touch Detection Period>>

In the magnetic field touch detection period, the magnetic-field enable signal SC_EN is at the high level. Among the selection signals ST00, ST10, ST20, ST30, and ST40 output from the detection control circuit SR, a selection signal corresponding to a touch detection area is at the high level. At this time, each of the selection signals ST01, ST11, ST21, ST31, and ST41 output from the detection control circuit SR is at the low level.

FIG. 9 shows a case in which the area of the drive electrodes TL(n−2) to TL(n+1) is specified as a touch detection area in the magnetic field touch detection. That is, FIG. 9 shows a state in which the selection signal ST10 specifying the area of the drive electrodes TL(n−2) to TL(n+1) is at the high level and in which the rest of selection signals ST00, ST20, ST30, and ST40 are at the low level.

The magnetic-field enable signal SC_EN is at the high level, so that the first and second switches S10 and S11 are switched on, the fifth switches S40 to S44 are also switched on. The first and second switches S10 and S11 are switched on, so that the drive electrodes TL(n−6) to TL(n−3) are connected in series between the node TT1 and the node TT2. These drive electrodes are close to and extend in parallel with each other when seen in a plan view, and therefore, a coil whose ends are the node TT1 and the node TT2 is formed by these drive electrodes. Similarly, a coil whose ends are the node TT1 and the node TT2 is formed by the drive electrodes TL(n−2) to TL(n+1), a coil whose ends are the node TT1 and the node TT2 is formed by the drive electrodes TL(n+2) to TL(n+5), a coil whose ends are the node TT1 and the node TT2 is formed by the drive electrodes TL(n+6) to TL(n+9), and a coil whose ends are the node TT1 and the node TT2 is formed by the drive electrodes TL(n+10) to TL(n+13).

The fifth switches S40 to S44 are switched on, and therefore, each node TT1 of the coils (five coils in FIG. 9) formed of the drive electrodes is connected to the signal wiring Ls via each of the fifth switches S40 to S44, and the ground voltage Vs is supplied to each node TT1 of the coils.

The selection signal ST10 is at the high level, and the selection signals ST00, ST20, ST30, and ST40 are at the low level, and therefore, the third switch S21 is switched on, and the third switches S20 and S22 to S24 are switched off. As a result, the end (node TT2) of the coil formed of the drive electrodes TL(n−2) to TL(n+1) is connected to the signal wiring Lc via the third switch S21, while the end (node TT2) of the coil formed of the drive electrodes other than the drive electrodes TL(n−2) to TL(n+1) is disconnected from the signal wiring Lc. At this time, the selection signals ST01 to ST41 are at the low level, and therefore, the fourth switches S30 to S34 are switched off, and the end TT2 of the coil is disconnected from the signal wiring Vs.

In the magnetic field touch detection, the coil clock signal CLK is supplied to the signal wiring Lc. Therefore, the coil clock signal CLK is supplied via the third switch S21 to the end (node TT2) of the coil formed of the drive electrodes TL(n−2) to TL(n+1) specified by the high-level selection signal ST10. At this time, no coil clock signal CLK is supplied to the end TT2 of the coil formed of the rest of drive electrode other than the drive electrode TL(n−2) to TL(n+1). The ground voltage Vs is supplied via the fifth switch S41 to the end TT1 of the coil formed of the drive electrodes TL(n−2) to TL(n+1). Therefore, a voltage that changes periodically and that takes the ground voltage Vs as a reference voltage is supplied to the end (node TT2) of the coil formed of the drive electrodes TL(n−2) to TL(n+1). As a result, the coil formed of the drive electrodes TL(n−2) to TL(n+1) generates a magnetic field in accordance with the coil clock signal CLK. At this time, the coil clock signal CLK is not supplied to the rest of coils, and therefore, the magnetic field is not generated.

The coil clock signal CLK can be regarded as a magnetic field drive signal for generating the magnetic field. In this case, the detection control circuit SR can be regarded as forming and outputting a selection signal for specifying a coil to which the magnetic field drive signal is supplied. When the magnetic field is generated by the coil formed of the drive electrodes TL(n−2) to TL(n+1), the drive electrode TL(n+1) can be regarded as a predetermined drive electrode to which the magnetic field drive signal is supplied.

The case of supplying the magnetic field drive signal to the coil formed of the drive electrodes TL(n−2) to TL(n+1) has been described. The magnetic field drive signal can be supplied to a coil formed of other drive electrodes by the same operation to generate the magnetic field.

<<Operation in Electric Field Touch Detection>>

Figure 10:
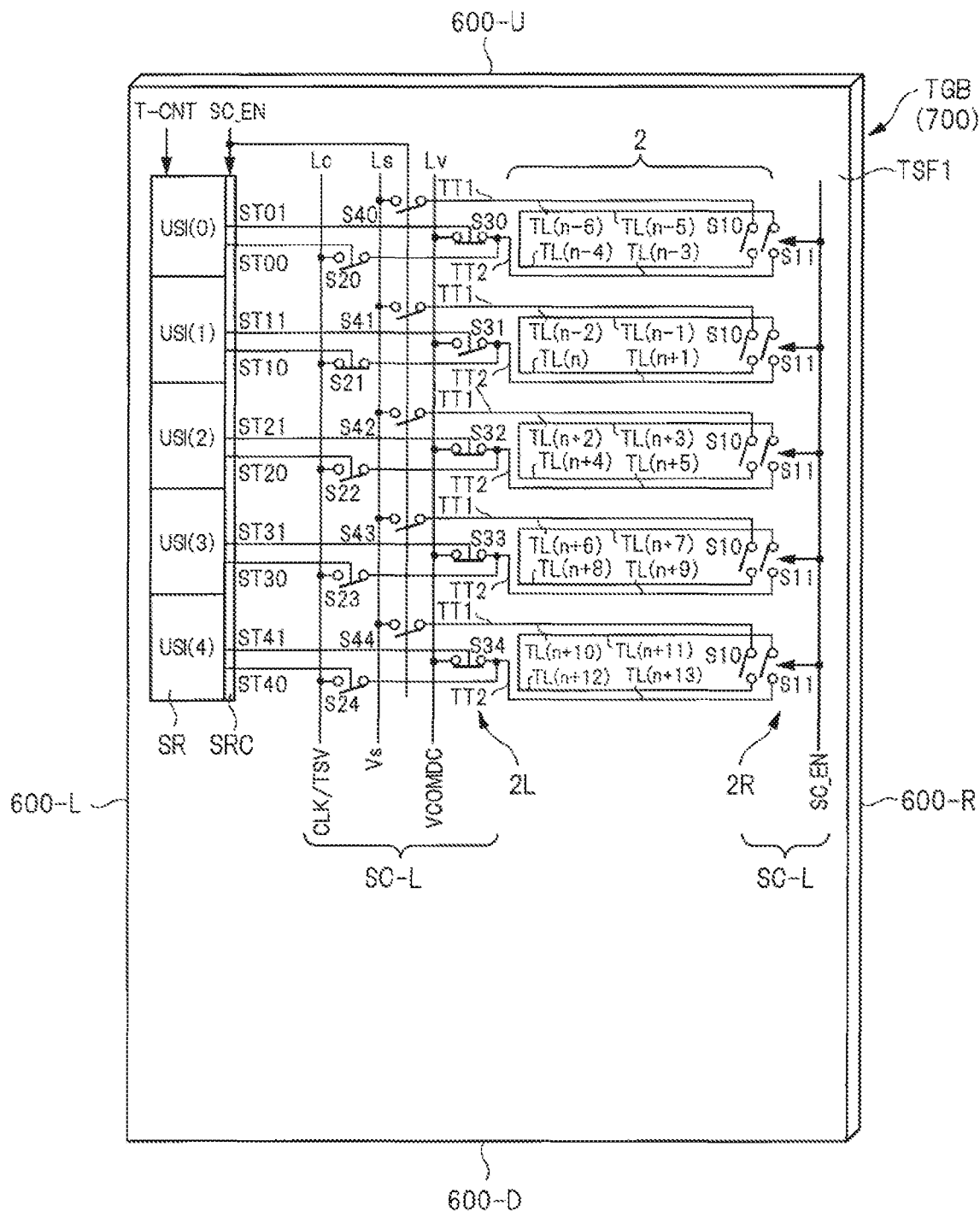
FIG. 10 is a block diagram showing a configuration of the display apparatus according to the first embodiment obtained in electric field touch detection.

FIG. 10 is a block diagram of a configuration of the display apparatus 1 according to the first embodiment. The configuration shown in FIG. 10 is the same as the configuration shown in FIG. 9. FIG. 10 is different from FIG. 9 in that FIG. 10 shows the state of the electric field touch detection while FIG. 9 shows the state of the magnetic field touch detection. That is, each configuration of the drive electrodes TL(n−6) to TL(n+13), switching circuit SC-R, switching drive circuit SC-L, and detection control circuit SR of FIG. 10 is the same as that of FIG. 9 but the states of the first to fifth switches of FIG. 10 are different from the states of FIG. 9. An operation in the electric field touch detection will be described below with reference to FIG. 10.

As described above with reference to FIG. 9, in both cases of the magnetic field touch detection and the electric field touch detection, a selection signal corresponding to a touch detection area among the selection signals ST00, ST10, ST20, ST30, and ST40 output from the detection control circuit SR is set at the high level, and another selection signals are set at the low level. On the other hand, in the electric field touch detection, the levels of the selection signals ST01, ST11, ST21, ST31, and ST41 output from the detection control circuit SR are different from the levels of the selection signals output from the detection control circuit SR in the magnetic field touch detection. That is, as described with reference to FIG. 9, in the electric field touch detection, a selection signal corresponding to a touch detection area among the selection signals ST01, ST11, ST21, ST31, and ST41 is set at the low level, and the rest of the selection signals are set at the high level. In the electric field touch detection, the magnetic-field enable signal SC_EN is at the low level.

As similar to FIG. 9, FIG. 10 shows a state in which the area of the drive electrodes TL(n−2) to TL(n+1) is specified as the touch detection area. Therefore, the selection signal ST10 corresponding to the drive electrodes TL(n−2) to TL(n+1) among the selection signals ST00 to ST40 output from the detection control circuit SR is set at the high level, and the selection signals ST00, ST20, ST30, and ST40 are set at the low level. In addition, the selection signal ST11 corresponding to the drive electrodes TL(n−2) to TL(n+1) among the selection signals ST01 to ST41 is set at the low level, and each of the selection signals ST01, ST21, ST31, and ST41 is set at the high level.

In the electric field touch detection, the magnetic-field enable signal SC_EN is set at the low level, so that the first and second switches S10 and S11 are switched off. The fifth switches S40 to S44 are also switched off. As a result of the switching off of the first and second switches S10 and S11, the other end of the drive electrode TL(n−6) is electrically insulated from the other end of the drive electrode TL(n−4), and the other end of the drive electrode TL(n−5) is also electrically insulated from the other end of the drive electrode TL(n−3).

Similarly, the other end of the drive electrode TL(n−2) is electrically disconnected from the other end of the drive electrode TL(n), the other end of the drive electrode TL(n−1) is electrically disconnected from the other end of the drive electrode TL(n+1), the other end of the drive electrode TL(n+2) is electrically disconnected from the other end of the drive electrode TL(n+4), and the other end of the drive electrode TL(n+3) is electrically disconnected from the other end of the drive electrode TL(n+5). Further, the other end of the drive electrode TL(n+6) is electrically disconnected from the other end of the drive electrode TL(n+8), the other end of the drive electrode TL(n+7) is electrically disconnected from the other end of the drive electrode TL(n+9), the other end of the drive electrode TL(n+10) is electrically disconnected from the other end of the drive electrode TL(n+12), and the other end of the drive electrode TL(n+11) is electrically disconnected from the other end of the drive electrode TL(n+13).

As a result of the switching off the fifth switches S40 to S44, each one end (node TT1) of the drive electrodes TL(n−6), TL(n−2), TL(n+2), TL(n+6), and TL(n+10) is electrically disconnected from the signal wiring Ls.

The third switch S21 is switched on by the high-level selection signal ST10, and the third switches S20 and S22 to S24 are switched off by the low-level selection signals ST00, ST20, ST30, and ST40. The fourth switch S31 is switched off by the low-level selection signal ST11, and the fourth switches S30 and S32 to S34 are switched on by the high-level selection signals ST01, ST21, ST31, and ST41. As a result, the one end of the drive electrode TL(n+1) is connected to the signal wiring Lc via the third switch S21, and the one ends of the drive electrodes TL(n−3), TL(n+5), TL(n+9), and TL(n+13) are connected to the signal wiring Lv via the fourth switches S30, S32, S33, and S34, respectively.

Since the first and second switches S10 and S11 are switched off, the drive electrode TL(n+1) is electrically disconnect from the drive electrode TL(n−1), etc. That is, the other end of the drive electrode TL(n+1) is not connected to the ground voltage Vs via a different drive electrode, and therefore, is in a floating state. In the electric field touch detection, since the control signal TSV whose voltage changes periodically is supplied to the signal wiring Lc, this control signal TSV is supplied to the drive electrode TL(n+1) as an electric field drive signal, and the drive electrode TL(n+1) generates an electric field in accordance with the change of the electric field drive signal. That is, in the drive electrode specified by the selection signal, an electric field in accordance with the electric field drive signal can be generated.

The drive electrode TL(n+1) has been exemplified and described. By the sequential movement of the predetermined value from the register stage USI(0) to the register stage USI(4), the levels of the selection signals ST00, ST10, ST20, ST30, and ST40 are set at the high level in this order. In response to this, the levels of the selection signals ST01, ST11, ST21, ST31, and ST41 are set at the low level in this order. Thus, the drive electrodes TL(n+1), TL(n−3), TL(n+5), TL(n+9), and TL(n+13) are each specified in this order, and the electric field drive signal is supplied to the specified drive electrode. As a result, an electric field is generated in the drive electrodes TL(n+1), TL(n−3), TL(n+5), TL(n+9), and TL(n+13) in this order. Similarly, also regarding drive electrodes not shown in FIG. 10, an electric field is generated in the specified drive electrode. The drive electrode TL(n+1) can be regarded as a predetermined drive electrode to which the electric field drive signal is supplied in the electric field touch detection.

<<Configuration of Switching Amplification Circuit>>

Figure 11:
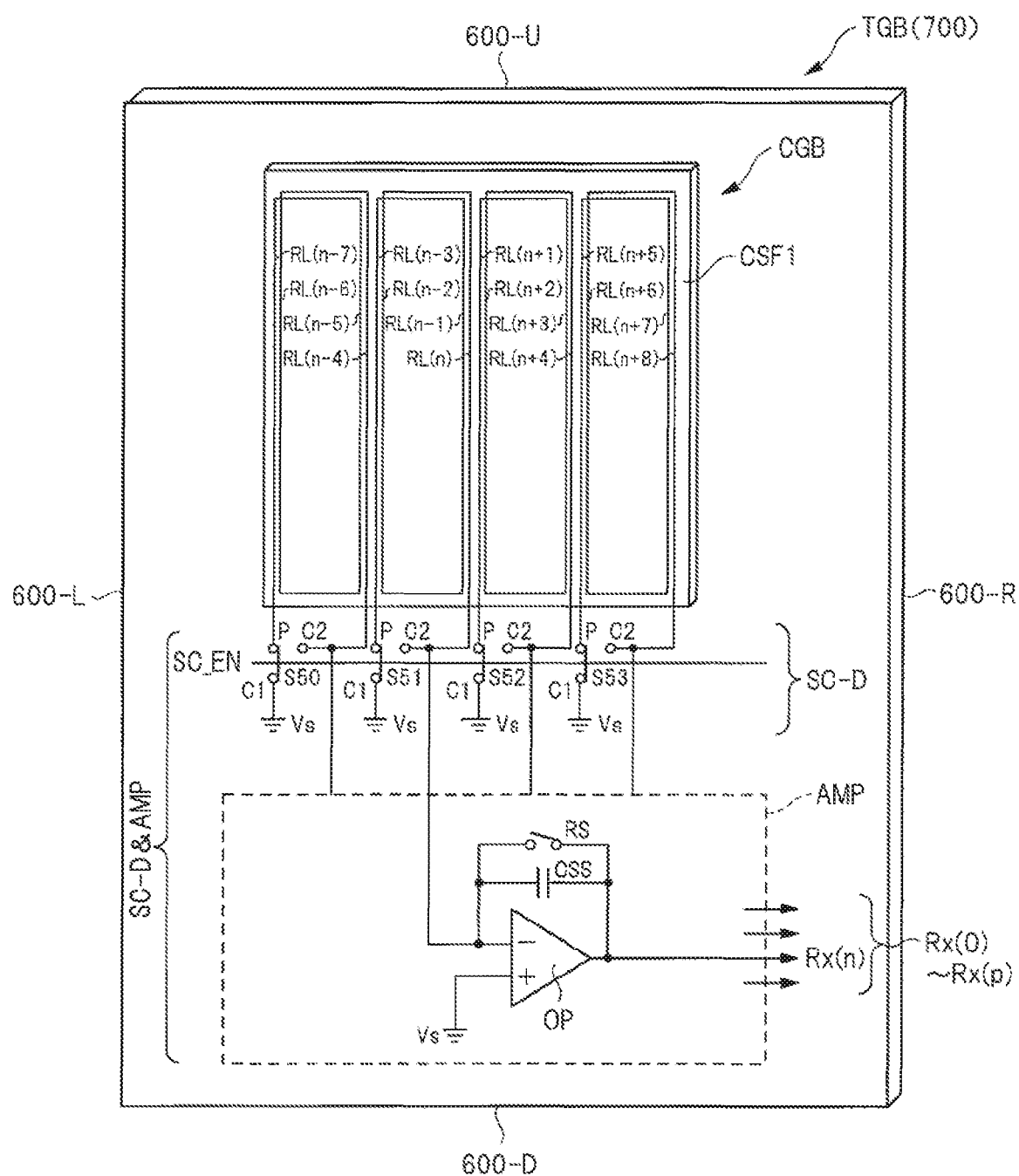
FIG. 11 is a block diagram showing a configuration of the display apparatus according to the first embodiment obtained in magnetic field touch detection.
Figure 12:
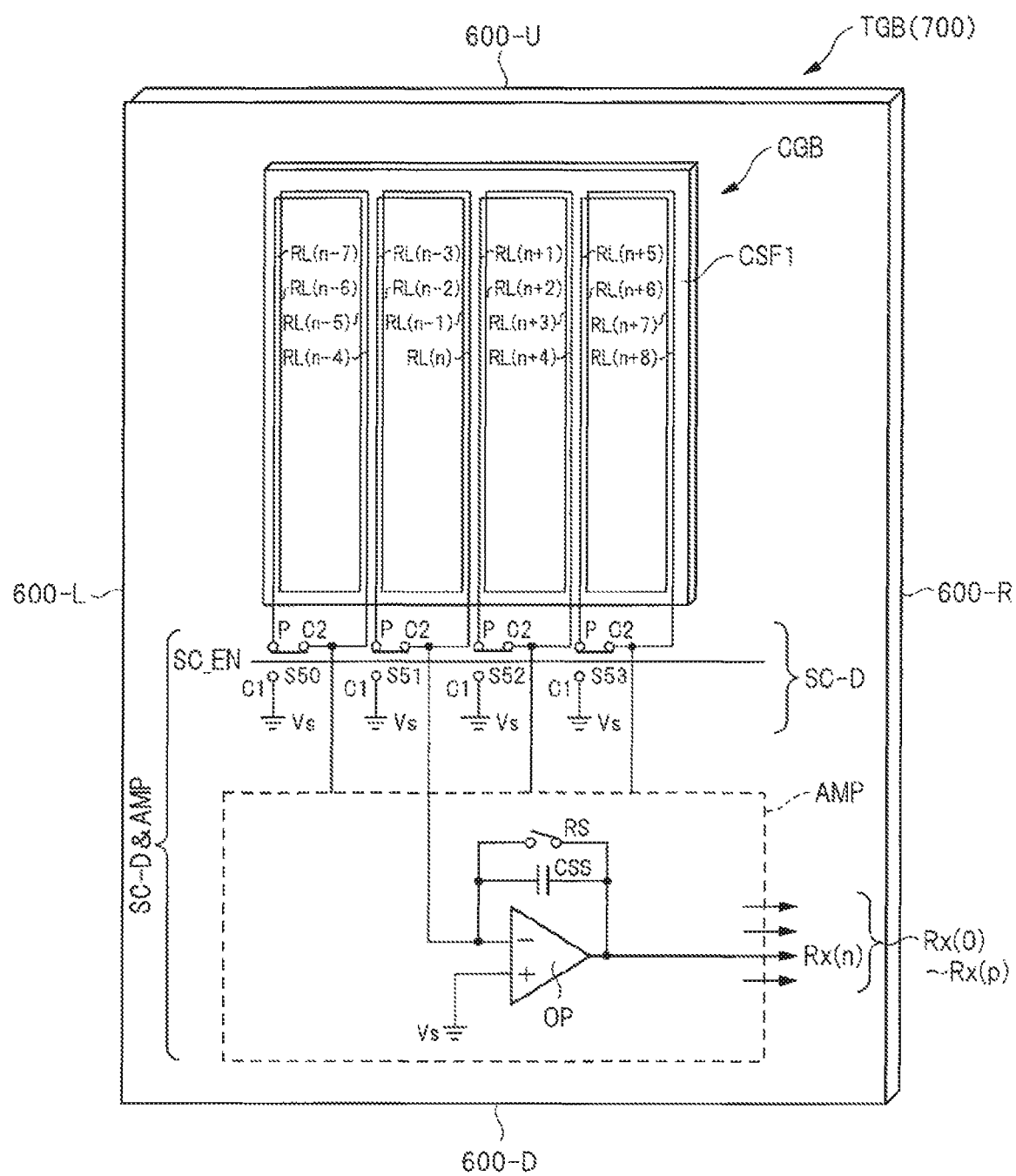
FIG. 12 is a block diagram showing a configuration of the display apparatus according to the first embodiment obtained in electric field touch detection.

FIGS. 11 and 12 are block diagrams each showing a configuration of the liquid crystal display apparatus 1 according to the first embodiment. FIGS. 11 and 12 particularly show the configuration of the switching amplification circuit SC-D& and the detection electrodes RL(n−7) to RL(n+8) among the detection electrodes RL(0) to RL(p). Here, FIG. 11 shows the state of the magnetic field touch detection, while FIG. 12 shows the state of the electric field touch detection. The switching amplification circuit SC-D& and detection electrodes RL(n−7) to RL(n+8) are the same between FIG. 11 and FIG. 12. Therefore, configurations of the switching amplification circuit SC-D& and detection electrodes RL(n−7) to RL(n+8) will be described with reference to FIG. 11, but will not be described in FIG. 12.

The detection electrodes RL(0) to RL(p) are formed on the first main surface CSF1 of the CF glass substrate CGB. As described above with reference to FIGS. 3 and 7, etc., this CF glass substrate CGB is stacked on the first main surface TSF1 of the TFT glass substrate TGB. When seen in a plan view, the detection electrodes RL(0) to RL(p) are arranged so as to extend in the column direction (vertical direction) and are parallel with each other in the row direction (horizontal direction). Therefore, when seen in a plan view, the detection electrodes RL(0) to RL(p) intersect with the drive electrodes TL(0) to TL(p).

FIG. 11 shows the detection electrodes RL(n−7) to RL(n+8) out of the detection electrodes RL(0) to RL(p). The following is the explanation using the exemplified detection electrodes RL(n−7) to RL(n+8). Note that FIG. 11 is scaled down in order to easily see the drawing. However, these units are shown in the practical arrangement.

According to the first embodiment, in the magnetic field touch detection, one (double-winding) coil is formed by four detection electrodes. That is, the one end of the detection electrode RL(n−6) and the one end of the detection electrode RL(n−5) are electrically connected to each other in vicinity of the side 2-D of the display area 2, the other end of the detection electrode RL(n−6) and the other end of the detection electrode RL(n−4) are electrically connected to each other in vicinity of the side 2-U of the display area 2, and the other end of the detection electrode RL(n−5) and the other end of the detection electrode RL(n−7) are electrically connected to each other in vicinity of the side 2-U of the display area 2. The one end of the detection electrode RL(n−4) is connected to the switching amplification circuit SC-D& in vicinity of the side 2-D of the display area 2 as one end of a coil formed of the detection electrodes RL(n−7) to RL(n−4). Similarly, the one end of the detection electrode RL(n−7) is connected to the switching amplification circuit SC-D& in vicinity of the side 2-D of the display area 2 as the other end of the coil formed of the detection electrodes RL(n−7) to RL(n−4).

That is, when seen in a plan view, the coil is formed by connecting the detection electrodes RL(n−7) to RL(n−4) arranged in parallel with each other in series, one end and the other end of the coil are connected to the switching amplification circuit SC-D&.

Similarly, the one end of the detection electrode RL(n−2) and the one end of the detection electrode RL(n−1) are electrically connected to each other in vicinity of the side 2-D of the display area 2, the other end of the detection electrode RL(n−2) and the other end of the detection electrode RL(n) are electrically connected to each other in vicinity of the side 2-U of the display area 2, and the other end of the detection electrode RL(n−1) and the other end of the detection electrode RL(n−3) are electrically connected to each other in vicinity of the side 2-U of the display area 2. The one end of the detection electrode RL(n) is connected to the switching amplification circuit SC-D& in vicinity of the side 2-D of the display area 2 as one end of a coil formed of the detection electrodes RL(n−3) to RL(n), and the one end of the detection electrode RL(n−3) is connected to the switching amplification circuit SC-D& in vicinity of the side 2-D of the display area 2 as the other end of the coil formed of the detection electrodes RL(n−3) to RL(n).

Also, the one end of the detection electrode RL(n+2) and the one end of the detection electrode RL(n+3) are electrically connected to each other, the other end of the detection electrode RL(n+2) and the other end of the detection electrode RL(n+4) are electrically connected to each other, and the other end of the detection electrode RL(n+3) and the other end of the detection electrode RL(n+1) are electrically connected to each other. The one end of the detection electrode RL(n+4) is connected to the switching amplification circuit SC-D& as one end of a coil formed of the detection electrodes RL(n+1) to RL(n+4), and the one end of the detection electrode RL(n+1) is connected to the switching amplification circuit SC-D& as the other end of the coil formed of the detection electrodes RL(n+1) to RL(n+4).

Further, the one end of the detection electrode RL(n+6) and the one end of the detection electrode RL(n+7) are electrically connected to each other, the other end of the detection electrode RL(n+6) and the other end of the detection electrode RL(n+8) are electrically connected to each other, and the other end of the detection electrode RL(n+7) and the other end of the detection electrode RL(n+5) are electrically connected to each other. The one end of the detection electrode RL(n+8) is connected to the switching amplification circuit SC-D& as one end of a coil formed of the detection electrodes RL(n+5) to RL(n+8), and the one end of the detection electrode RL(n+5) is connected to the switching amplification circuit SC-D& as the other end of the coil formed of the detection electrodes RL(n+5) to RL(n+8).

The switching amplification circuit SC-D& includes a switching circuit (second switching circuit) SC-D and an amplifying circuit AMP. The switching circuit SC-D has a plurality of single-pole double-throw switches. FIG. 11 shows four single-pole double-throw switches corresponded to four coils formed of the detection electrodes RL(n−7) to RL(n+8) as sixth switches S50 to S53. Since each of these sixth switches S50 to S53 is a single-pole double-throw switch, each of these sixth switches S50 to S53 has a common terminal P, a first terminal C1, and a second terminal C2.

One end of the coil formed of the detection electrodes RL(n−7) to RL(n−4) is connected to the second terminal C2 of the sixth switch S50, and the other end thereof is connected to the common terminal P of the sixth switch S50. One end of the coil formed of the detection electrodes RL(n−3) to RL(n) is connected to the second terminal C2 of the sixth switch S51, and the other end thereof is connected to the common terminal P of the sixth switch S51. Further, one end of the coil formed of the detection electrodes RL(n+1) to RL(n+4) is connected to the second terminal C2 of the sixth switch S52, and the other end thereof is connected to the common terminal P of the sixth switch S52. Similarly, one end of the coil formed of the detection electrodes RL(n+5) to RL(n+8) is connected to the second terminal C2 of the sixth switch S53, and the other end thereof is connected to the common terminal P of the sixth switch S53.

Each first terminal C1 of the sixth switches S50 to S53 is connected to ground voltage (second voltage) Vs. Each of the sixth switches S50 to S53 is controlled by the magnetic-field enable signal SC_EN. That is, when the magnetic-field enable signal SC_EN is at the high level indicating the magnetic field touch detection, the common terminal P of each of the sixth switches S50 to S53 is connected to the first terminal C1. On the other hand, when the magnetic-field enable signal SC_EN is at the low level indicating the electric field touch detection, the common terminal P of the sixth switches S50 to S53 is connected to the second terminal C2.

In the first embodiment, the amplifying circuit AMP has a plurality of unit amplifying circuits. Although each unit amplifying circuit is not limited, they have the same configuration so as to have a one-to-one relation with the coils formed of the detection electrodes. In the description while exemplifying FIG. 11, the amplifying circuit AMP has four unit amplifying circuits. One end of the coil formed of the detection electrodes RL(n−7) to RL(n−4) is connected to an input terminal of the corresponding unit amplifying circuit, and one end of the coil formed of the detection electrodes RL(n−3) to RL(n) is connected to an input terminal of the corresponding unit amplifying circuit. Similarly, one end of the coil formed of the detection electrodes RL(n+1) to RL(n+4) is connected to an input terminal of the corresponding unit amplifying circuit, and one end of the coil formed of the detection electrodes RL(n+5) to RL(n+8) is connected to an input terminal of the corresponding unit amplifying circuit. Outputs from these unit amplifying circuits are supplied to the detection circuit DET (FIG. 5) as the detection signals Rx(0) to Rx(p).

Since the unit amplifying circuits are identical in configuration with each other, FIG. 11 shows only the unit amplifying circuit connected to one end of the coil formed of the detection electrodes RL(n−3) to RL(n) among the four unit amplifying circuits.

According to the first embodiment, each unit amplifying circuit is formed of an integration circuit although not limited thereto. That is, the unit amplifying circuit includes an operational amplifier OP having an inverting (−) input and a non-inverting (+) input, an integration capacitive element CSS, and a reset switch RS. One end of the corresponding coil is connected to the inverting (−) input of the operational amplifier OP, and the non-inverting (+) input of the operational amplifier OP is connected to a ground voltage Vs. Between the output and the inverting (−) input of the operational amplifier OP, the integration capacitive element CSS and the reset switch RS are connected in parallel.

For example, before execution of touch detection, the reset switch RS is switched on, so that the charge charged in the integration capacitive element CSS is discharged. Subsequently, the reset switch RS is switched off to start touch detection. A signal change in accordance with touching/non-touching or the distance from the externally-approaching object occurs on one end of the coil formed of the detection electrodes. Such signal changes occur periodically. The integration circuit making up the unit amplifying circuit integrates signal changes in a predetermined period, and outputs an integration result as a detection signal Rx(n).

The amplifying circuit AMP detects a signal change by amplifying the signal change, and therefore, can be regarded as a detection circuit. If the amplifying circuit AMP is regarded as a detection circuit, the unit amplifying circuit can be regarded as unit detection circuit.

<<Operation in Magnetic Field Touch Detection>>

In the magnetic field touch detection, the magnetic-field enable signal SC_EN is set at the high level. In this manner, the common terminal P is connected to the first terminal C1 at each of the sixth switches S50 to S53 as shown in FIG. 11. As a result, the ground voltage Vs is supplied via the sixth switch S50 to the other end of the coil formed of the detection electrodes RL(n−7) to RL(n−4). Similarly, the ground voltage Vs is supplied via the sixth switch S51 to the other end of the coil formed of the detection electrodes RL(n−3) to RL(n), and the ground voltage Vs is supplied via the sixth switch S52 to the other end of the coil formed of the detection electrodes RL(n+1) to RL(n+4). And, the ground voltage Vs is supplied via the sixth switch S53 to the other end of the coil formed of the detection electrodes RL(n+5) to RL(n+8).

As described above with reference to FIG. 9, in the magnetic field touch detection, a magnetic field is generated by a coil formed of a plurality of drive electrodes (e.g., TL(n−2) to TL(n+1)). If a pen is in close to the coil, the capacitive element C is charged by the pen internal coil L1 as shown in FIG. 2A. Next, as shown in FIG. 2B, the pen internal coil L1 then generates a magnetic field. According to the first embodiment, the magnetic field generated by the pen internal coil L1 is detected by the coil formed of the plurality of detection electrodes (e.g., RL(n−3) to RL(n)), which is shown in FIG. 11.

That is, by the magnetic field generated by the pen internal coil L1, an inductive voltage is generated in the coil formed of the detection electrodes. By this inductive voltage, a signal in one end (the second terminal C1 of the sixth switch) of the coil is changed on the basis of the ground voltage Vs supplied to the other end (the common terminal P of the sixth switch) of the coil. The signal supplied to the one end of the coil attenuates while oscillating vertically at the center of the ground voltage Vs which is the reference. The integration circuit making up the unit amplifying circuit integrates signal changes in the one end of the coil for a predetermined period, so that a detection signal (e.g., detection signal Rx(n)) is formed.

<<Operation in Electric Field Touch Detection>>

Next, an operation of the switching amplification circuit SC-D& in electric field touch detection will be described with reference to FIG. 12.

FIG. 12 shows a state of the switching amplification circuit SC-D& in electric field touch detection. The difference from FIG. 11 is that the magnetic-field enable signal SC_EN is at the low level so as to indicate the electric field touch detection. Since the magnetic-field enable signal SC_EN is at the low level, the common terminal P of each of the sixth switches S50 to S53 is connected to the second terminal C2 as shown in FIG. 12.

As a result, one end of the coil formed of the detection electrodes RL(n−7) to RL(n−4) is electrically connected to the other end of the coil via the sixth switch S50. In other words, the other end of the coil is disconnected from the ground voltage Vs. Similarly, one end of the coil formed of the detection electrodes RL(n−3) to RL(n) is electrically connected to the other end of the coil via the sixth switch S51, and one end of the coil formed of the detection electrodes RL(n+1) to RL(n+4) is electrically connected to the other end of the coil via the sixth switch S52. And, one end of the coil formed of the detection electrodes RL(n+5) to RL(n+8) is electrically connected to the other end of the coil via the sixth switch S53.

Since the other end of each of the coils formed of the detection electrodes is electrically disconnected from the ground voltage Vs, each coil is in a floating state. In the electric field touch detection, as described above with reference to FIG. 10, an electric field drive signal whose voltage changes periodically is supplied to a selected drive electrode (e.g., drive electrode TL(n+1)). As a result, an electric field is generated between the selected drive electrode and the coil in the floating state which is formed of the detection electrodes. As described above with reference to FIG. 4, in the touch by a finger, the electric charge changes, the signal changes occur at one end of the coil formed of the detection electrodes. Such signal changes are integrated for a predetermined time by the integration circuit making up the unit amplifying circuit, and the integration result is supplied to the detection circuit DET (FIG. 5) as a detection signal (e.g., detection signal Rx(n)).

<<Operations in Magnetic Field Touch Detection and Electric Field Touch Detection>>

In the magnetic field touch detection, the detection control circuit SR sequentially specifies each of the coils, for example, from the coil formed of the drive electrodes arranged close to the side 2-U of the display area 2 to the coil formed of the drive electrodes arranged close to the side 2-D of the display area 2. At this time, signal changes at the plurality of coils formed of the detection electrodes arranged between the side 2-R and the side 2-L of the display area 2 are amplified by the amplifying circuit AMP (FIG. 11), and the amplified signal changes are supplied to the detection circuit DET as the detection signals Rx(0) to Rx(p). In this manner, it can be detected whether the pen touches or not, or the distance from the pen can be found, in a range from the side 2-U to the side 2-D in the display area 2, so that the display apparatus 1 can output the coordinates of the location touched by the pen and/or the handwriting pressure, or others.

In the electric field touch detection, the detection control circuit SR sequentially specifies each of the coils, for example, from the drive electrodes arranged close to the side 2-U of the display area 2 to the drive electrodes arranged close to the side 2-D of the display area 2. At this time, signal changes at the plurality of coils (the coils in the floating state) formed of the detection electrodes arranged between the side 2-R and the side 2-L of the display area 2 are amplified by the amplifying circuit AMP (FIG. 11), and the amplified signal changes are supplied to the detection circuit DET as the detection signals Rx(0) to Rx(p). In this manner, it can be detected whether the pen touches or not in a range from the side 2-U to the side 2-D in the display area 2, so that the display apparatus 1 can output the coordinates of the location touched by the pen or others.

<<Structure of Drive Electrode>>

Figure 13:
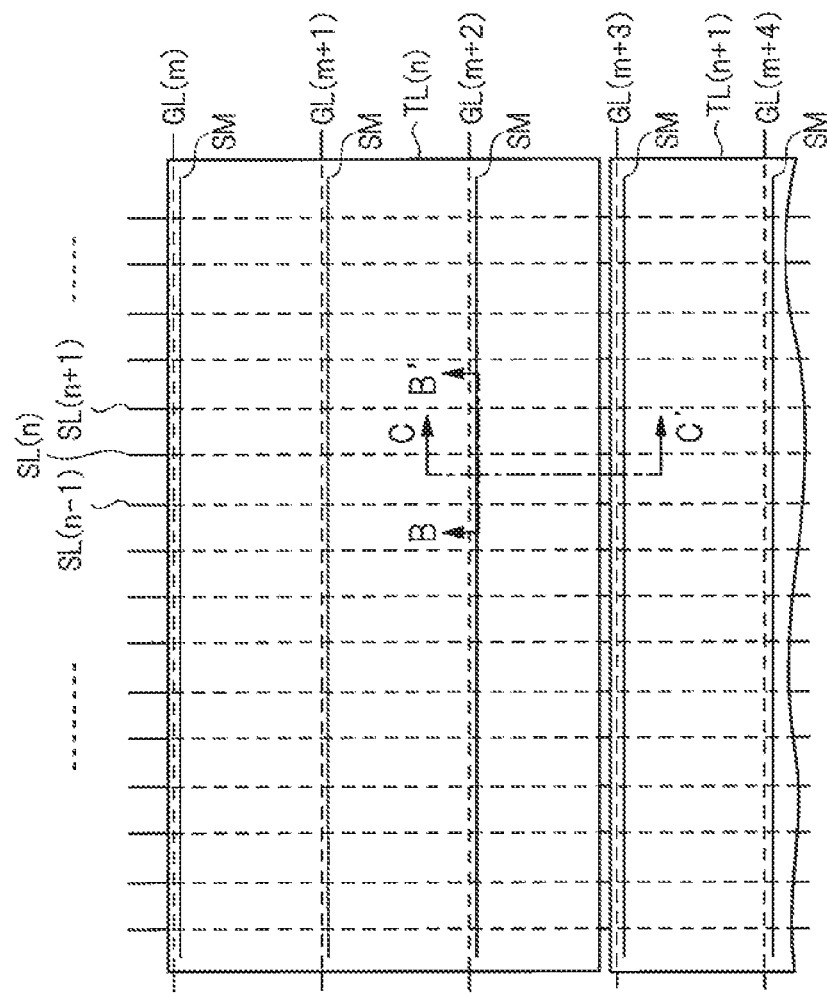
FIG. 13 is a plan view showing a configuration of the display apparatus according to the first embodiment.
Figure 14B:
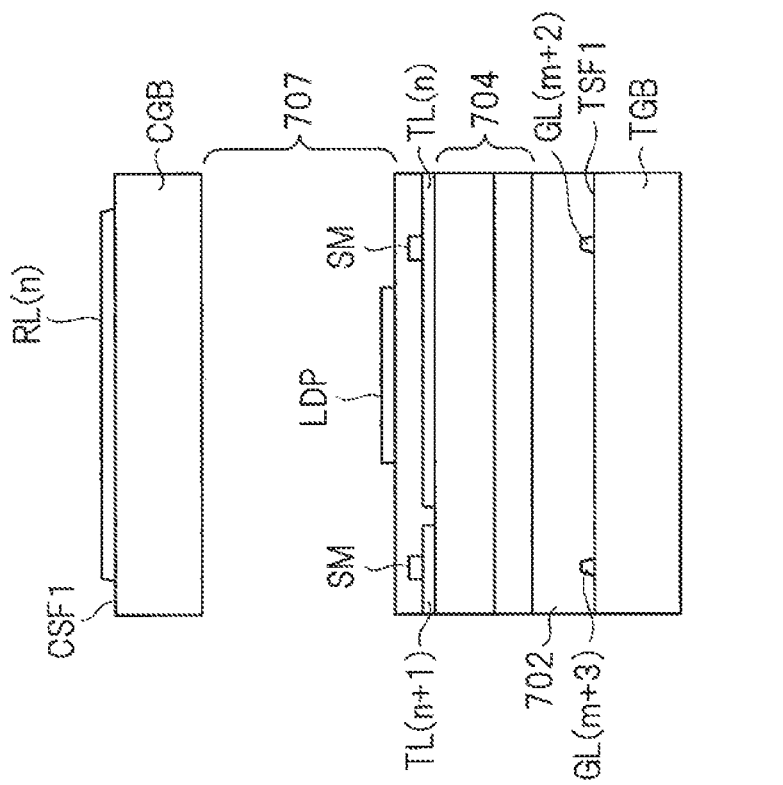
FIGS. 14A and 14B are cross-sectional views in a B-B' cross section and a C-C' cross section in the plan view shown in FIG. 13.
Figure 14A:
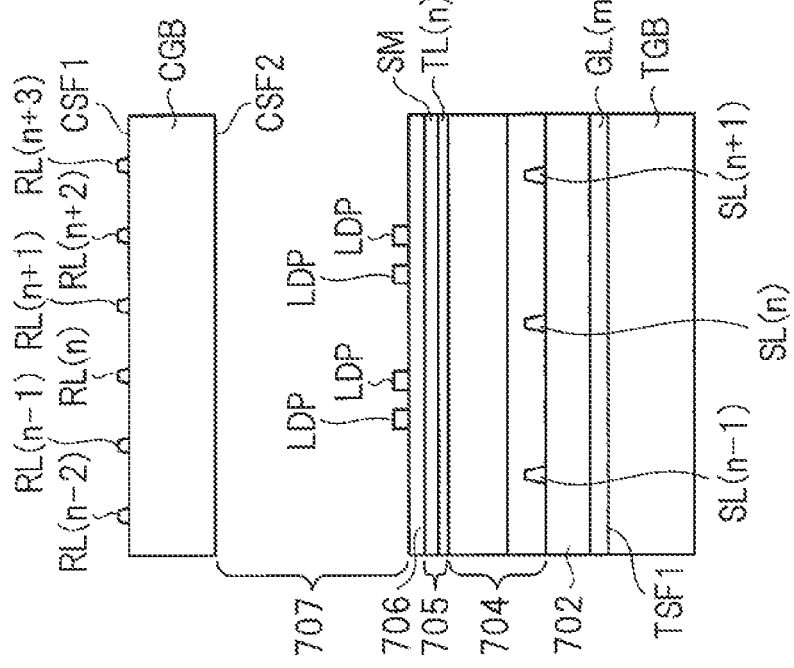

FIG. 13 is a plan view of the display apparatus 1 according to the first embodiment. FIG. 14 is a cross-sectional view of the display apparatus 1 according to the first embodiment. FIG. 13 partially shows an area including the drive electrode TL(n) in the display area 2. A cross section of an area indicated by a single-dot chain line B-B' in FIG. 13 is shown in FIG. 14A, and a cross section of an area indicated by a single-dot chain line C-C' in FIG. 13 is shown in FIG. 14B. With reference to FIGS. 13 and 14, an example of the structures of the drive electrodes, signal lines, scanning lines, and detection electrodes will be described.

FIG. 13 shows the drive electrode TL(n) and a part of the drive electrode TL(n+1) arranged close to the drive electrode TL(n). When seen in a plan view, the drive electrode TL(n) and the drive electrode TL(n+1) extend in the row direction (horizontal direction), and are arranged in parallel with each other in the column direction (vertical direction).

When seen in a plan view, a plurality of auxiliary electrodes SM extend in parallel with the drive electrode TL(n) and drive electrode TL(n+1). In this drawing, three auxiliary electrodes SM extend in parallel with the drive electrode TL(n) and are electrically connected the drive electrode TL(n). And, two auxiliary electrodes SM extend in parallel with the drive electrode TL(n+1) and are electrically connected thereto. Similarly, when seen in a plan view, the scanning lines GL(m) to GL(m+4) also extend in parallel with the electrode TL(n) and drive electrode TL(n+1). When seen in a plan view, a plurality of signal lines extend in the column direction and are in parallel with each other in the row direction so as to intersect with the drive electrode TL(n) and drive electrode TL(n+1). In FIG. 13, for three signal lines out of the plurality of signal lines, reference characters SL(n−1) to SL(n+1) are denoted as examples.

A cross section of the area indicated by the single-dot chain line B-B' in FIG. 13 is shown in FIG. 14A, and the cross section of the area indicated by the single-dot chain line C-C' in FIG. 13 is shown in FIG. 14B. In FIG. 14A, the first conductive layer 701 is formed on the first main surface TSF1 of the TFT glass substrate TGB, and the scanning line GL (m+2) is formed of this first conductive layer 701 (FIG. 7). The insulating layer 702 made of, for example, silicon nitride is formed on the scanning line GL (m+2), and the second conductive layer 703 is formed on the insulating layer 702. The signal lines SL(n−1) to SL(n+1) are formed of this second conductive layer 703. In FIG. 14A, the second conductive layer 703 is shown as the signal lines SL(n−1) to SL(n+1) made of the second insulating layer 703.

On the signal lines SL(n−1) to SL(n+1), the insulating layer 704 formed of an insulating layer made of, for example, silicon nitride and an inter-layer resin is formed. On the insulating layer 704, the third conductive layer 705 is formed. By the third conductive layer 705, the drive electrode TL(n) and the auxiliary electrodes SM are formed. Here, the drive electrode TL(n) is formed of a transparent electrode with high transmittance made of, for example, indium tin oxide (ITO), and the auxiliary electrode SM is made of a low-resistance conductive layer such as aluminum (Al) layer. In the present specification, as described above, note that the drive electrode formed of the transparent electrode and the auxiliary electrode SM (second electrode) whose resistance is lower than that of the drive electrode are collectively called drive electrode unless otherwise specified.

On the drive electrode TL(n), the insulating layer 706 made of silicon nitride or others is formed. On the insulating layer 706, a pixel electrode LDP is formed. The pixel electrode LDP is also formed of a transparent electrode. Between the pixel electrode LDP and the second main surface CSF2 of the CF glass substrate CGB, the liquid crystal layer 707 is sandwiched. On the first main surface CSF1 of the CF glass substrate CGB, the detection electrode is formed.

The detection electrode is omitted in FIG. 13. However, according to the first embodiment, the plurality of detection electrodes extend in the column direction and are in parallel with each other in the row direction so that the detection electrodes are in parallel with the signal lines SL(n−1) to SL(n+1) when seen in a plan view. In FIG. 14A, the detection electrodes RL(n−2) to RL(n+3) are shown as examples.

FIG. 14B shows the cross section of the area indicated by the single-dot chain line C-C' intersecting with the single-dot chain line B-B' in FIG. 13, and therefore, the scanning lines GL(m+3) and GL(m+2) formed of the first conductive layer 701 (FIG. 7) are shown in FIG. 14B. FIG. 14B also shows the drive electrodes TL(n+1) and TL(n) and auxiliary electrodes SM that are formed of the third conductive layer 705, and the pixel electrode LDP. FIG. 14B further shows the detection electrode RL(n) formed on the first main surface CSF1 of the CF glass substrate CGB which is opposite to the TFT glass substrate TGB across the liquid crystal layer 707.

When seen in a plan view, the scanning lines and drive electrodes overlap the signal lines so as to intersect with the signal lines as shown in FIG. 13. As shown in FIG. 14, they overlap each other via the insulating layers, and are electrically isolated from each other. Although the detection electrodes omitted in FIG. 13 also overlap the drive electrodes and scanning lines when seen in a plan view, they overlap via the insulating layer as shown in FIG. 14, and are electrically isolated from each other.

Figure 15B:
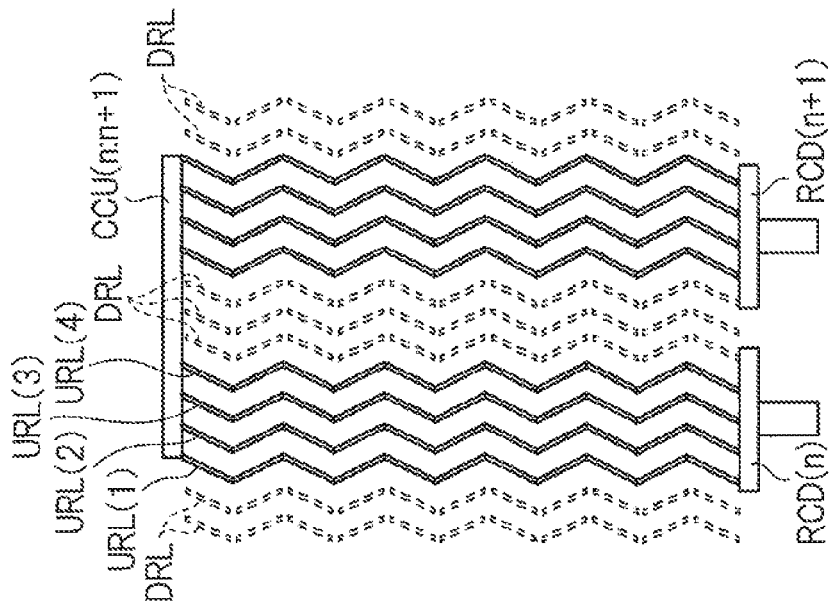
FIGS. 15A and 15B are plan views each showing a configuration of a detection electrode in the display apparatus according to the first embodiment.
Figure 15A:
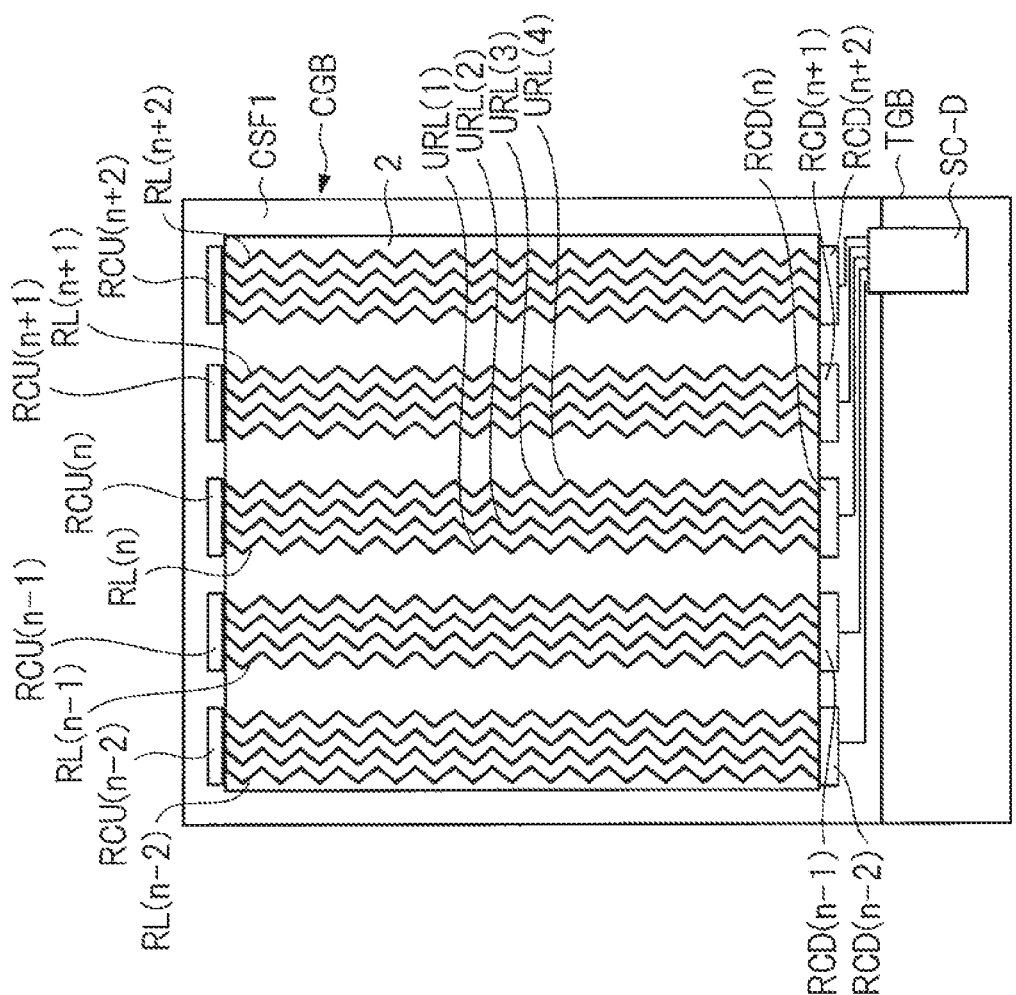

FIG. 15 are diagrams schematically showing examples of detection electrodes. FIG. 15A is a plan view schematically showing the plurality of detection electrodes arranged on the first main surface CSF1 of the CF glass substrate CGB. In FIG. 15A, the detection electrodes RL(n−2) to RL(n+2) of the plurality of detection electrodes are shown as representative. The detection electrodes RL(n−2) to RL(n+2) are arranged on the first main surface CSF1 of the CF glass substrate CGB so that they are in parallel with each other in the display area 2. That is, in the display area 2, the detection electrodes are arranged so that they extend in the column direction (vertical direction) and are in parallel with each other in the row direction (horizontal direction). In the description with reference to FIG. 6, the detection electrodes RL(n−2) to RL(n+2) are arranged so as to be sandwiched between the side 2-R and the side 2-L of the display area 2 when seen in a plan view, and intersect with each of the drive electrodes TL(0) to TL(p).

According to the first embodiment, each detection electrode is formed of four unit detection electrodes URL(1) to URL(4) although not limited. In the description with reference to FIG. 15A, each of the detection electrodes RL(n−2) to RL(n+2) is formed of four unit detection electrodes. In FIG. 15A, in order to avoid complicated illustration, only the four unit detection electrodes making up the detection electrode RL(n) are denoted with the reference characters URL(1) to URL(4). However, each of the rest of detection electrodes is also formed of the four unit detection electrodes URL(1) to URL(4).

Although not particularly limited, the four unit detection electrodes URL(1) to URL(4) extend in the column direction while bending. The four unit detection electrodes URL(1) to URL(4) making up the respective detection electrodes RL(n−2) to RL(n+2) are connected to connection electrodes RCU(n−2) to RCU(n+2) in vicinity of the side 2-U of the display area 2 (FIG. 6). Further, the four unit detection electrodes URL(1) to URL(4) are connected also to connection electrodes RCD(n−2) to RCD(n+2) in vicinity of the side 2-D of the display area 2 (FIG. 6). That is, the unit detection electrodes URL(1) to URL(4) are electrically connected to each other by the connection electrodes RCU(n−2) to RCU(n+2) and connection electrodes RCD(n−2) to RCD(n+2), respectively. For example, in the description while exemplifying the detection electrode RL(n), each one end of the four unit detection electrodes URL(1) to URL(4) making up the detection electrode RL(n) is electrically connected to the connection electrode RCU(n), and the other end thereof is connected to the connection electrode RCD (n). In this manner, the resistance of the detection electrode RL(n) is set to low. The same goes for other detection electrodes.

Each of the connection electrodes RCU(n−2) to RCU(n+2) is arranged along the side 2-U of the display area 2 on the first main surface CSF1 of the CF glass substrate CGB, while each of the connection electrodes RCD(n−2) to RCD(n+2) is arranged along the side 2-D of the display area 2 on the first main surface CSF1 of the CF glass substrate CGB.

According to the first embodiment, the plurality of coils are formed of the plurality of detection electrodes RL(0) to RL(p). Therefore, the connection electrodes RCU corresponding to two detection electrodes are electrically connected to each other. When each formed coil is a coil having the number of the winding of two or more, the connection electrodes RCD corresponding to two detection electrodes are electrically connected to each other. FIGS. 11 and 12 show a case in which the coil formed of detection electrodes is the double-winding coil as an example. However, here, a case in which the coil formed of detection electrodes is a single-winding coil will be described for simplification.

In order to form the single-winding coil from the detection electrodes, the detection electrodes RL(n−2) to RL(n+2) are paired. Since the connection electrodes RCU(n−2) to RCU(n+2) correspond to the detection electrodes RL(n−2) to RL(n+2), the connection electrodes RCU(n−2) to RCU (n+2) are also paired, and a pair of two connection electrodes RCU are electrically connected to each other. On the other hand, the connection electrodes RCD(n−2) to RCD (n+2) corresponding to the detection electrodes RL(n−2) to RL(n+2) are connected to the switching circuit SC-D arranged on the TFT glass substrate TGB, via signal lines arranged on the CF glass substrate CGB.

FIG. 15B is a plan view of a pair of the detection electrode RL(n) and the detection electrode RL(n+1). In FIG. 15B, CCU(n:n+1) indicates a common connection electrode electrically connecting the connection electrode RCU(n) to the connection electrode RCU(n+1). Also in FIG. 15A, for only the four unit detection electrodes making up the detection electrode RL(n), reference characters URL(1) to URL(4) are denoted. In FIG. 15B, a broken line DRL indicates a dummy electrode arranged between the detection electrodes. The dummy electrode DRL is arranged in parallel with the unit detection electrode, and is arranged so as to be sandwiched between the detection electrodes. If the dummy electrode DRL is not arranged, an area where the detection electrode is arranged and an area where no detection electrode is arranged are different from each other in reflection. By the arrangement of the dummy electrode DRL between the detection electrodes, the reflection can be uniformed.

The connection electrode RCD(n+1) corresponding to the detection electrode RL(n+1) serves as one end of a coil formed of detection electrodes, and is connected to, for example, the second terminal of the sixth switch S51 shown in FIGS. 11 and 12. In this case, the connection electrode RCD(n) corresponding to the detection electrode RL(n) serves as the other end of the coil formed of the detection electrodes, and is connected to, for example, the common terminal P of the sixth switch S51 shown in FIGS. 11 and 12. Connection electrodes RCU corresponding to other detection electrodes are paired, and are connected to the common connection electrode CCU. The connection electrodes RCD corresponding to the detection electrodes are connected to the second terminal C2 and the common terminal P of the sixth switch as one end and the other end of the coil.

In this manner, a single-winding coil is formed of two detection electrodes arranged close to and in parallel with each other.

When a multiple-winding coil (e.g., double-winding coil) is formed of the detection electrodes as shown in FIGS. 11 and 12, for example, the detection electrodes RL(0) to RL(p) are specified as first detection electrodes, and second detection electrodes electrically isolated from the first detection electrodes are formed on the first main surface CSF1 of the CF glass substrate CGB. Two second detection electrodes are electrically connected to each other in vicinity of the side 2-U of the display area 2. A connection electrode corresponding to one of the electrically-connected second detection electrodes is connected to, for example, the connection electrode RCD(n+1) shown in FIG. 15B, while a connection electrode corresponding to the other of the second detection electrodes is connected to the second terminal C2 of the sixth switch as an end of a coil. In this manner, a multiple-winding coil (double-winding coil) can be formed of four detection electrodes. In this case, an insulating layer is formed between the first detection electrode and the second detection electrode to separate the first detection electrode from the second detection electrode.

<<Modification>>

The explanation has been made about the example of executing the magnetic field touch detection and the electric field touch detection using the drive electrodes formed on the TFT glass substrate TGB and the detection electrodes formed on the CF glass substrate CGB. However, in a modification, the magnetic field touch detection and the electric field touch detection are executed by the drive electrodes formed on the TFT glass substrate TGB.

Figures 16A, 16B:
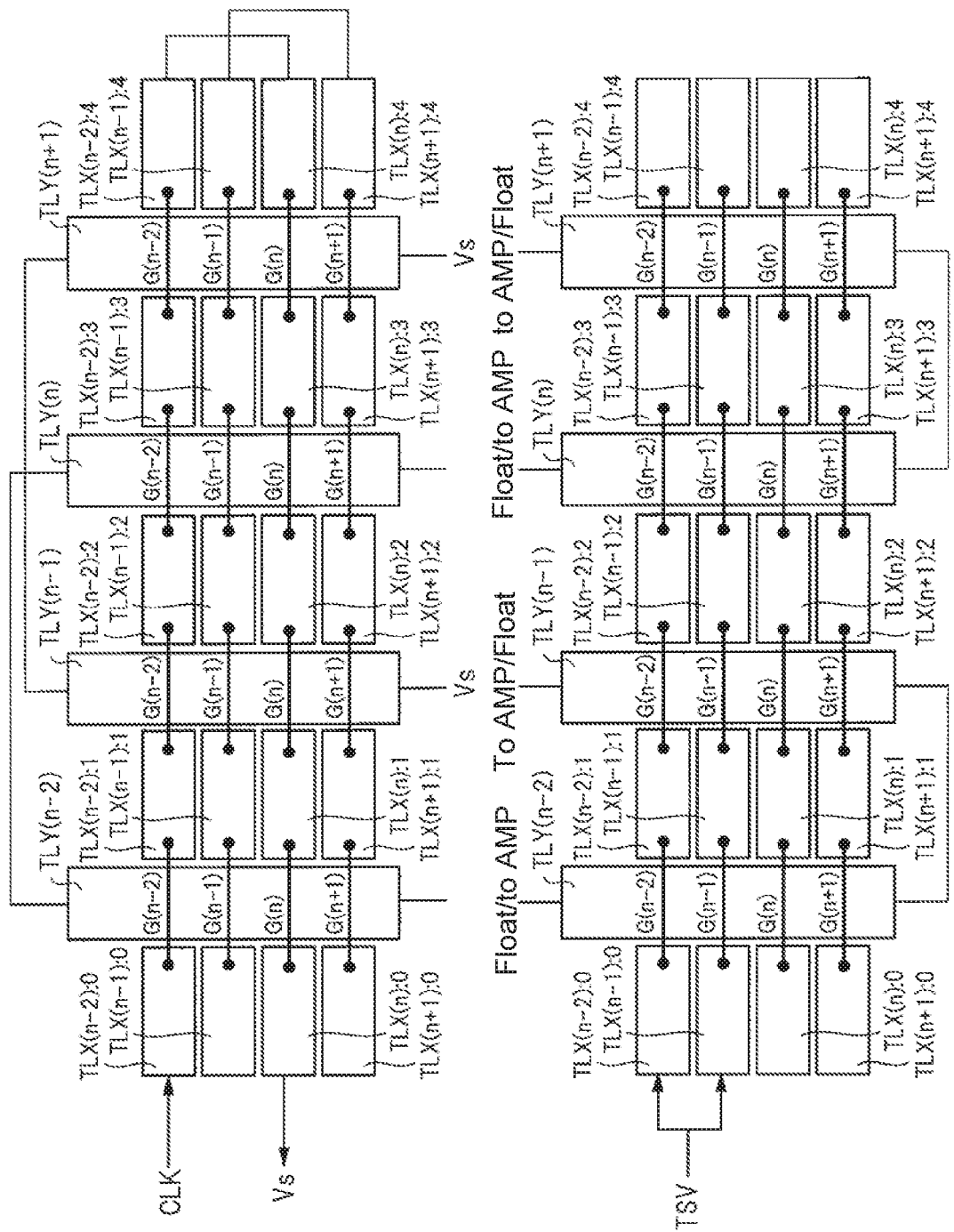
FIGS. 16A and 16B are plan views each showing a configuration of a display apparatus according to a modification example of the first embodiment.

FIG. 16 shows plan views conceptually showing configurations of the liquid crystal display apparatus 1 according to the modification. FIG. 16A shows a state in the magnetic field touch detection, and FIG. 16B shows a state in electric field touch detection.

In the modification, a plurality of first drive electrodes TLX(0) to TLX(p) and a plurality of second drive electrodes TLY(0) to TLY(p) are formed by the third conductive layer 705 described above with reference to FIG. 7, etc. Here, the plurality of second drive electrodes TLY(0) to TLY(p) extend in the column direction (vertical direction) and are in parallel with each other in the row direction (horizontal direction). The plurality of first drive electrodes TLX(0) to TLX(p) extend in the row direction and are in parallel with each other in the column direction. FIGS. 16A and 16B show only the second drive electrodes TLY(n−2) to TLY(n+1) out of the above-described second drive electrodes and the first drive electrodes TLX(n−2) to TLX(n+1) out of the above-described first drive electrodes.

Each of the first drive electrodes TLX(n−2) to TLX(n+1) has a plurality of unit first drive electrodes. That is, the first drive electrode TLX(n−2) has unit first drive electrodes TLX(n−2):0 to TLX(n−2):4, and the first drive electrode TLX(n−1) has unit first drive electrodes TLX(n−1):0 to TLX(n−1):4. In the same manner, the first drive electrode TLX(n) has unit first drive electrodes TLX(n):0 to TLX(n): 4, and the first drive electrode TLX(n+1) has unit first drive electrodes TLX(n+1):0 to TLX(n+1):4.

The unit first drive electrodes TLX(n−2):0 to TLX(n−2):4 included in the first drive electrode TLX(n−2) are physically separated from each other. Similarly, the unit first drive electrodes TLX(n−1):0 to TLX(n−1):4 are separated from each other, the unit first drive electrodes TLX(n):0 to TLX (n):4 are separated from each other, and the unit first drive electrodes TLX(n+1):0 to TLX(n+1):4 are separated from each other.

The second drive electrodes TLY(n−2) to TLY(n+1) are arranged so that the second drive electrodes TLY(n−2) to TLY(n+1) extend in an area that separates the unit first drive electrodes from each other. In an example of the unit first drive electrodes TLX(n−2):0 to TLX(n−2):4, arrangement of the second drive electrodes TLY(n−2) to TLY(n+1) will be described as follows.

The second drive electrode TLY(n−2) extends through an area that separates the unit first drive electrode TLX(n−2):0 from the unit first drive electrode TLX(n−2):1, and the second drive electrode TLY(n−1) extends through an area that separates the unit first drive electrode TLX(n−2):1 from the unit first drive electrode TLX(n−2):2. Similarly, the second drive electrode TLY(n) extends through an area that separates the unit first drive electrode TLX(n−2):2 from the unit first drive electrode TLX(n−2):3, and the second drive electrode TLY(n+1) extends through an area that separates the unit first drive electrode TLX(n−2):3 from the unit first drive electrode TLX(n−2):4. Also regarding other unit first drive electrodes, the second drive electrode similarly extend through the area that separates the unit first drive electrodes from each other.

A plurality of unit first drive electrodes making up the same first drive electrode are electrically connected to each other by a signal wiring formed of a conductive layer different from the third conductive layer 705, that is, formed of, for example, the first conductive layer 701 (FIG. 7). In the description while exemplifying the first drive electrode TLX(n−2), the unit first drive electrodes TLX(n−2):0 to TLX(n−2):4 making up the first drive electrode TLX(n−2) are electrically connected to each other by a signal wiring G(n−2) formed of the first conductive layer 701. Similarly, the unit first drive electrodes making up each of the rest of first drive electrodes TLX(n−1) to TLX(n+1) are electrically connected to each other by each of signal lines G(n−1) to G(n+1) formed of the first conductive layer 701.

In this manner, even if the first drive electrodes TLX(n−2) to TLX(n+1) and the second drive electrodes TLY(n−2) to TLY(n+1) are formed of the same third conductive layer 705, the first drive electrodes and the second drive electrodes intersect with each other when seen in a plan view while the first drive electrodes and the second drive electrodes are electrically isolated from each other.

<<Operation in Magnetic Field Touch Detection>>

In the magnetic field touch detection, as shown in FIG. 16A, the ground voltage Vs is supplied to each one end of the second drive electrode TLY(n−1) and the second drive electrode TLY(n+1). Each one end of the second drive electrode TLY(n−2) and the second drive electrode TLY(n) is connected to the amplifying circuit AMP shown in FIG. 11, and is connected to the input of the integration circuit in the amplifying circuit AMP. At this time, the other ends of the second drive electrode TLY(n−2) and the second drive electrode TLY(n) are electrically connected to each other, and the other ends of the second drive electrode TLY(n−1) and the second drive electrode TLY(n+1) are also electrically connected to each other. In this manner, a single-winding coil having the second drive electrode TLY(n−2) and second drive electrode TLY(n) as its winding is formed, and a single-winding coil having the second drive electrode TLY(n−1) and second drive electrode TLY(n+1) as its winding is also formed. The integration circuit is connected to one end of the formed coil, and the ground voltage Vs is supplied to the other end.

In the magnetic field touch detection, the coli clock signal CLK is supplied to the one end of the first drive electrode TLX(n−2) as a magnetic field drive signal, and the ground voltage Vs is supplied to the one end of the first drive electrode TLX(n). At this time, respective other ends of the first drive electrode TLX(n−2) and first drive electrode TLX(n) are electrically connected to each other, and respective other ends of the first drive electrode TLX(n−1) and first drive electrode TLX(n+1) are also electrically connected to each other. In this manner, a single-winding coil having the first drive electrode TLX(n−2) and first drive electrode TLX(n) as its winding is formed, and a single-winding coil having the second drive electrode TLX(n−1) and first drive electrode TLX(n+1) as its winding is formed.

The magnetic field drive signal (coil clock signal CLK) is supplied to one end of the coil formed of the first drive electrode TLX(n−2) and first drive electrode TLX(n), while the ground voltage Vs is supplied to the other end thereof. As a result, in the coil formed of the first drive electrodes TLX(n−2) and TLX(n), a magnetic field is generated in accordance with the change in the magnetic field drive signal. When the capacitive element in the pen is charged by the generated magnetic field, the pen internal coil generates a magnetic field in accordance with the charge charged in the capacitive element. In accordance with the magnetic field generated in the pen internal coil, a signal changes at the coil formed of the second drive electrodes. This signal change at the coil is amplified by the amplifying circuit AMP, and the presence/absence of the pen or the handwriting pressure is detected by the detection circuit DET.

The magnetic field drive signal (coil clock signal CLK) is supplied to the first drive electrode TLX(n−2), and then, to the first drive electrode TLX(n−1). At this time, the ground voltage Vs is supplied not to the first drive electrode TLX(n) but to the first drive electrode TLX(n+1). In this manner, a coil that generates a magnetic field is sequentially switched.

According to this modification, a plurality of coils formed of the second drive electrodes partially overlap each other when seen in a plan view. Similarly, a plurality of coils formed of the first drive electrodes also partially overlap each other. That is, when one coil is paid attention, between the second drive electrodes (one first drive electrodes) which are the winding of the attention-getting coil, the second drive electrode (first drive electrode) which is the winding of an adjacent other coil is arranged. A magnetic field generated by the coil becomes stronger in an area between the windings of the coil, that is, inside the coil. The magnetic field detection sensitivity is also high in the area between the windings of the coil (inside the coil). Therefore, by the partial overlap of the coils, an area where a magnetic field weakens or an area where the magnetic field detection sensitivity is low can be reduced.

<<Operation in Electric Field Touch Detection>>

Next, an operation in the electric field touch detection will be described with reference to FIG. 16B. The configurations of the second drive electrodes TLY(n−2) to TLY(n+1) and first drive electrodes TLX(n−2) to TLX(n+1) shown FIG. 16B are the same with those shown in FIG. 16A, and therefore, will be omitted in further description.

According to the modification, each other end of the second drive electrodes TLY(n−2) to TLY(n+1) is put in a floating state. Also, respective one ends of the second drive electrode TLY(n−2) and second drive electrode TLY(n−1) are electrically connected to each other, and respective one ends of the second drive electrode TLY(n) and second drive electrode TLY(n+1) are also electrically connected to each other. Each one end of the second drive electrode TLY(n−2) and second drive electrode TLY(n−1) that are electrically connected to each other is connected to the amplifying circuit AMP of FIG. 12, and each one end of the second drive electrode TLY(n) and second drive electrode TLY(n+1) that are electrically connected to each other is also connected to the amplifying circuit AMP.

Each other end of the first drive electrodes TLX(n−2) to TLX(n+1) is put in a floating state. According to the modification, the control signal TSV which is an electric field drive signal is supplied to each one end of the first drive electrode TLX(n−2) and first drive electrode TLX(n−1).

The charge amount at the second drive electrodes TLY(n−2) to TLY(n+1) changes depending on whether the finger touch is performed or not, and a signal change at the second drive electrodes in accordance with this change in the charge amount. A signal change at the second drive electrodes is amplified by the amplifying circuit AMP and is detected by the detection circuit DET. As a result, the touching/non-touching by the finger, etc., can be detected. Note that the electric field drive signal is supplied to the first drive electrode TLX(n−2) and second drive electrode TLX(n−1), and then, the electric field drive signal is supplied to, for example, the first drive electrode TLX(n) and first drive electrode TLX(n+1) to detect the touch related to the first drive electrode TLX(n) and first drive electrode TLX(n+1).

<<Display Operation>>

In the display, a display drive signal is supplied to each of the second drive electrodes TLY(n−2) to TLY(n+1) and the first drive electrodes TLX(n−2) to TLX(n+1). In this manner, the display based on voltages at signal lines and the display drive signal is performed.

<<First Drive Electrode and Second Drive Electrode>>

Figure 17:
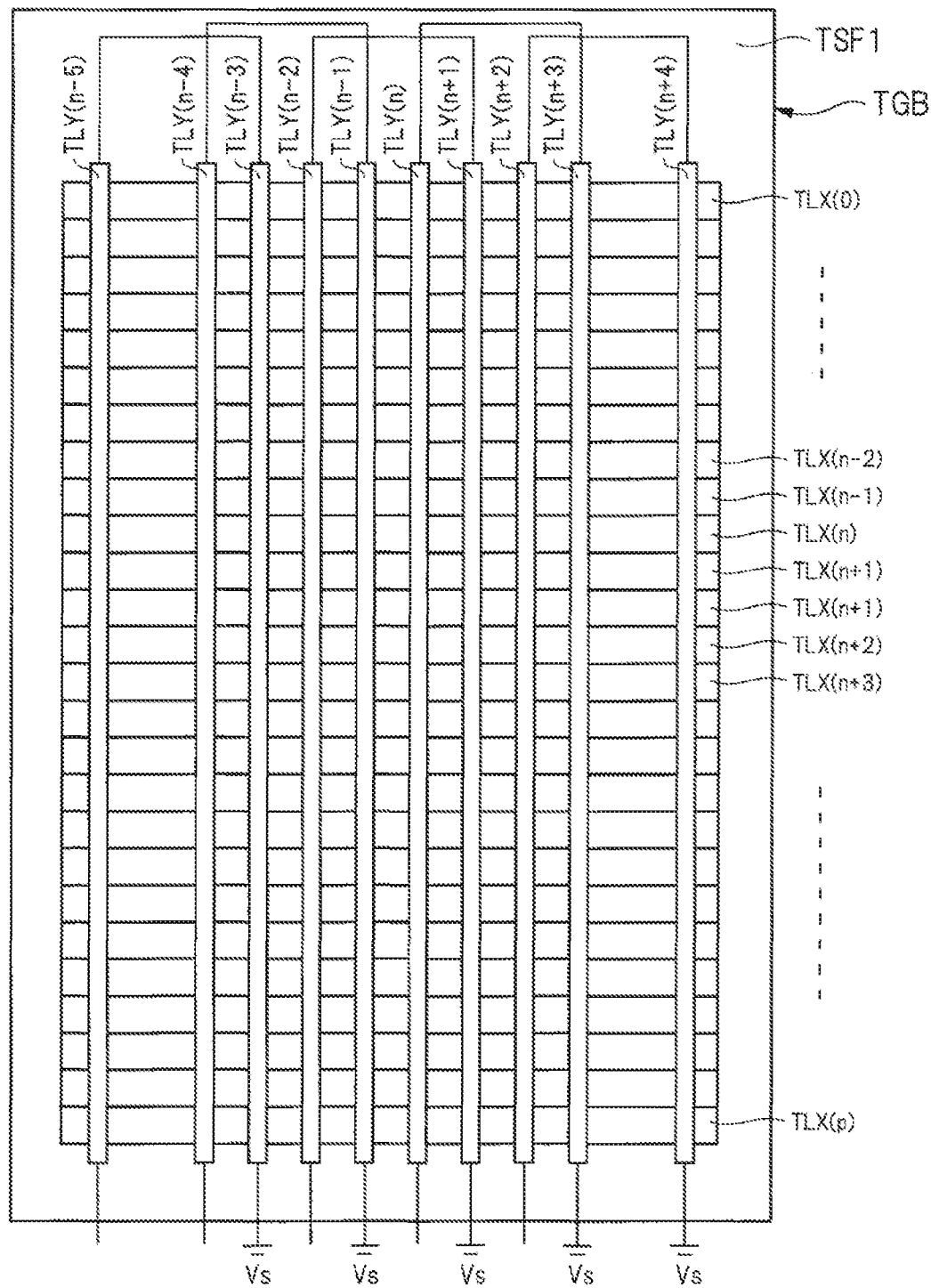
FIG. 17 is a plan view of the display apparatus according to the modification example of the first embodiment.

FIG. 17 is a plan view of a configuration of the display apparatus according to the modification. In FIG. 17, TLY(n−5) to TLY(n+4) indicate second drive electrodes, and TLX(0) to TLX(p) indicate first drive electrodes. As described above with reference to FIG. 16, the second drive electrodes and first drive electrodes are formed of the third conductive layer 705 formed on the first main surface TSF1 of the TFT glass substrate TGB. In FIG. 16, the explanation has been made about the case in which one winding of the adjacent coil is arranged inside the coil formed of the second drive electrodes so that the coils partially overlap each other. In FIG. 17, the explanation will be made about a case in which the windings of two coils adjacent to one coil are arranged inside the one coil when seen in a plan view. In this manner, as described with reference to FIG. 16, the area where the magnetic field detection sensitivity is low can be reduced. Note that each of the first drive electrodes TLX(0) to TLX(p) has a plurality of unit first drive electrodes as described above with reference to FIG. 16, and the plurality of unit first drive electrodes are electrically connected to each other by the signal wiring.

FIG. 18 show a plan view and a cross-sectional view of a part at which the second drive electrode TLY(n) intersects with the first drive electrodes TLX(n−2) to TLX(n+2) in FIG. 17. FIG. 18A is a plan view of the part at which the second drive electrode TLY(n) intersects with the first drive electrodes TLX(n−2) to TLX(n+2), and FIG. 18B is a cross-sectional view of a part shown along a single-dot chain line D-D' of FIG. 18A.

In FIG. 18A, the second drive electrode TLY(n) is indicated by a broken line. TLX(n−2):0 and TLX(n−2):1 indicate unit first drive electrodes making up the first drive electrode TLX(n−2), TLX(n−1):0 and TLX(n−1):1 indicate unit first drive electrodes making up the first drive electrode TLX(n−1), and TLX(n):0 and TLX(n):1 indicate unit first drive electrodes making up the first drive electrode TLX(n). Further, TLX(n+1):0 and TLX(n+1):1 indicate unit first drive electrodes making up the first drive electrode TLX(n+1), and TLX(n+2):0 and TLX(n+2):1 indicate unit first drive electrodes making up the first drive electrode TLX(n+2).

As described above with reference to FIG. 16, unit first drive electrodes making up the same first drive electrode are physically separated from each other and are electrically connected to each other by a wiring layer different from the third wiring layer 705 forming the drive electrodes. In FIGS. 17 and 18, when seen in a plan view, each of the second drive electrodes TLY(0) to TLY(p) extends in parallel with the signal lines SL(0) to SL(p), while the first drive electrodes TLX(0) to TLX(p) extend in parallel with the scanning lines GL(0) to GL(p). FIG. 18A shows signal lines SL(n−3) to SL(n+4) out of the signal lines SL(0) to SL(p). And, as the scanning lines, only scanning lines GL(m−3) to GL(m+6) out of the scanning lines GL(0) to GL(p) are shown.

The unit first drive electrodes making up the same first drive electrode are electrically connected to each other by each of the signal lines G(n−2) to G(n+2) formed of the first conductive layer 701 (FIG. 7) formed on the TFT glass substrate TGB. The scanning lines GL(m−3) to GL(m+6) are also formed of the first conductive layer 701, and therefore, the signal lines G(n−2) to G(n+2) connecting the unit first drive electrodes to each other and the scanning lines GL(m−3) to GL(m+6) are formed of the first conductive layer 701. In this manner, even if a new conductive layer is not provided, the unit first drive electrodes can be electrically connected to each other. Also, the unit first drive electrodes are connected to each other by two signal wirings. For example, two signal wirings G(n−2) are arranged in parallel with each other between the unit first drive electrode TLX(n−2):0 and the unit first drive electrode TLX(n−2):1 so as to electrically connect them. In this manner, even if the resistance values of the signal wirings G(n−2) are relatively high, the combined resistance can be reduced.

When seen in a plan view, switches not shown are connected in vicinity of the side 2-U of the display area 2 (see, e.g., FIG. 6) between each of the signal lines SL(n−1) to SL(n+1) which overlap the second drive electrode TLY(n) and the second drive electrode TLY(n). Similarly, switches not shown are also connected in vicinity of the side 2-D of the display area 2 (see, e.g., FIG. 6) between each of the signal lines SL(n−1) to SL(n+1) and the second drive electrode TLY(n). These switches connected between each of the signal lines SL(n−1) to SL(n+1) and the second drive electrode TLY(n) are switched on in touch detection (magnetic field touch detection and electric field touch detection). Therefore, in the magnetic field touch detection and electric field touch detection, the signal lines SL(n−1) to SL(n+1) and the second drive electrode TLY(n) are connected in parallel, so that the combined resistance of the second drive electrode TLY(n) can be reduced. The second drive electrode TLY(n) has been described as the example. However, also for others second drive electrodes, their combined resistance are reduced by the signal lines in touch detection.

In FIG. 18B, a reference character "LDP" indicates a pixel electrode, and reference characters "SL(n−3)" to "SL(n+3)" indicate signal lines formed of the second conductive layer 703 (FIG. 7). A reference character TLY(n) indicates the second drive electrode formed of the third conductive layer 705. Each reference character TLX (n−1):0 and TLX (n−1):1 indicates a unit first drive electrode making up the first drive electrode TLX(n−1). The unit first drive electrodes TLX (n−1):0 and TLX (n−1):1 are also formed of the third conductive layer 705 but are physically separated from each other. A reference character G(n−1) indicates a signal wiring formed of the first conductive layer 701. The unit first drive electrodes TLX (n−1):0 and TLX (n−1):1, which are physically separated from each other, are electrically connected to the signal wiring G(n−1) via openings formed on the insulating layer 704, etc. In this manner, the unit first drive electrodes TLX (n−1):0 and TLX (n−1):1 which are physically separated from each other are electrically connected to each other, and can transmit a magnetic field drive signal, an electric field drive signal, and a display drive signal as describe above with reference to FIG. 16.

The explanation has been made about the example of the configuration in which, in magnetic filed touch detection, a coil (hereinafter "magnetic field generating coil" or "first coil") that generates a magnetic field is formed of the first drive electrodes TLX and a coil (hereinafter "magnetic field detection coil" or "second coil") that detects a magnetic field is formed of the second drive electrodes TLY. However, the coil formation is not limited to this example. For example, a magnetic field generating coil may be formed of the second drive electrodes TLY, and a magnetic field detection coil may be formed of the first drive electrodes TLX.

According to the first embodiment, in the magnetic field touch detection, the magnetic field generating coil that generates a magnetic field and the magnetic field detection coil that detects a magnetic field generated from the pen are different coils from each other. For example, as shown in FIGS. 9 and 11, the magnetic field generating coil is formed of the drive electrodes, while the magnetic field detection coil is formed of the detection electrodes. In the modification, the magnetic field generating coil is formed of first drive electrodes, while the magnetic field detection coil is formed of second drive electrodes.

As described above with reference to FIG. 2, if the same coil (L2) generates its magnetic field and detects a magnetic field from the pen, there is a risk of the delay of the detection or the decrease in the detection accuracy. That is, the parasitic capacitance, etc., are brought to the coil. Therefore, even when supply of a magnetic field drive signal to the coil is stopped, a voltage and others at the coil keep changing, and therefore, the convergence takes time. When the magnetic field from the pen is detected by the same coil, if the detection is not performed at the timing at which the change at the coil converges into a predetermined value, the detection becomes the erroneous detection. For this reason, the possibility of the detection delay may occur. Also in a period of the wait for the convergence of the change at the coil, the pen keeps generating a magnetic field because of electric charges charged on the capacitive element. Therefore, also in the period of the wait for the convergence of the change at the coil, the electric charges charged on the capacitive element are lost. Therefore, when the detection of the magnetic field is delayed, the magnetic field from the pen is weakened, and the detection accuracy is decreased.

According to the first embodiment, the magnetic field detection coil that detects the magnetic field generated by the pen is a different coil from the magnetic field generating coil. Therefore, even when the voltage and others change at the magnetic field generating coil after the supply of the magnetic field drive signal is stopped, the magnetic field detection can be started in a short time because the voltage and others do not change at the magnetic field detection coil. In this manner, the detection delay can be prevented. And, since the detection can be started without waiting for the convergence of the change at the magnetic field generating coil, the detection can be started when a strong magnetic field is generated from the pen, so that the decrease in detection accuracy can be prevented.

According to the first embodiment, the drive electrodes are used while being switched by the switching circuits SC-R and SC-L as drive electrodes that form magnetic field generating coils or as drive electrodes that generate an electric field. That is, magnetic field generating coils are formed of drive electrodes in the magnetic field touch detection, and the magnetic field drive signal and the predetermined voltage (ground voltage Vs) are supplied to a selected magnetic field generating coil. On the other hand, in electric field touch detection, a selected drive electrode is put in a floating state, and the electric field drive signal is supplied to the selected drive electrode. In this manner, in electric field touch detection, an electric field in accordance with the electric field drive signal can be generated from the selected drive electrode.

By the switching circuit SC-D, the detection electrodes are used while being switched as detection electrodes that form magnetic field detection coils or as detection electrodes that detect an electric field. That is, in the magnetic field touch detection, the predetermined voltage (ground voltage Vs) is supplied to a magnetic field detection coil to detect a signal change at the magnetic field detection coil with reference to the predetermined voltage. On the other hand, in electric field touch detection, a detection electrode is put in a floating state, and a change in electric charges caused by a touch is detected as a signal change at the detection electrode.

In this manner, the same electrodes (drive electrodes or detection electrodes) can be used for magnetic field touch detection and electric field touch detection, and therefore, it is not required to provide a new electrode or signal wiring for magnetic field touch detection and/or electric field touch detection, and therefore, rise in the price of the display apparatus can be suppressed.

According to the modification, both the magnetic field generating coil and the magnetic field detection coil are formed of drive electrodes in the magnetic field touch detection. In electric field touch detection, the electric field is generated and detected by the drive electrodes. Therefore, even if, for example, the detection electrode is not provided, the magnetic field touch detection and the electric field touch detection can be executed, so that the rise in the price of the display apparatus can be suppressed.

The formation of the magnetic field generating coils and/or magnetic field detection coils is considered, the formation using only a transparent electrode as the drive electrode without using the auxiliary electrode SM (second electrode) having the resistance lower than that of the transparent electrode. For example, when the magnetic field generating coil is formed of the drive electrode (not including the auxiliary electrode SM), the strength of magnetic fields has the variation in the display area 2 since the resistance of the drive electrode is high. In the description while exemplifying FIG. 6, the magnetic field drive signal is supplied from the side 2-D of the display area 2 to the drive electrodes. In this case, a magnetic field generated on the side 2-U becomes weaker than a magnetic field generated on the side 2-D. Therefore, the strength if the magnetic field has the variation in in the display area 2, and the strength of the magnetic field is distributed.

When the magnetic field detection coils are formed of the drive electrodes (not including the auxiliary electrodes SM), the resistance of the drive electrodes is high, and therefore, an input signal change at the amplifying circuit AMP that is caused by a magnetic field change in an area distant from the amplifying circuit AMP in the display area 2 is adversely different from an input signal change at the amplifying circuit AMP that is caused by a magnetic field change in an area close to the amplifying circuit AMP. Therefore, also when the magnetic field detection coils are formed of the drive electrodes, detection sensitivity may vary at the detection position (area) in the display area 2.

Further, when both of the magnetic field generating coils and the magnetic field detection coils are formed of drive electrodes formed of transparent electrodes, both of the variation in magnetic field generation and the variation in electric field detection occur as described above. As a result, the change in the signal supplied to the amplifying circuit AMP has the variation at the detection position in the display area 2. As an action considered in order to deal with this problem, for example, the characteristics such as an amplification factor, of the amplifying circuit AMP (detection circuit) are changed in accordance with the detection position. However, this change becomes the large load, and there is a risk of the rise in the price of the display apparatus.

According to the first embodiment, in the magnetic field touch detection, the magnetic field generating coil is formed of the drive electrode having the transparent electrode and the auxiliary electrode. The transparent electrode has relatively large resistance while the auxiliary electrode has resistance smaller than that of the transparent electrode.

Therefore, the drive electrode having the transparent electrode and the auxiliary electrode (second electrode) connected in parallel with the transparent electrode has a small combined resistance. In this manner, in the generation of the magnetic field, a strong magnetic field can be generated, so that the electric charges charged in the capacitive element in the pen can be increased.

The magnetic field detection coil that detects a magnetic field from the pen is formed of detection electrodes formed on the first main surface CSF1 of the CF glass substrate CGB. The detection electrode is made of, for example, aluminum, and therefore has small resistance. The conductive layers formed on the first main surface CSF1 of the CF glass substrate CGB are fewer than the conductive layers formed on the first main surface TSF1 of the TFT glass substrate TGB. For example, in the description while exemplifying FIG. 14, a plurality of conductive layers making up scanning lines, signal lines, drive electrodes, etc., are formed on the first main surface TSF1 of the TFT glass substrate TGB, while only the conductive layer making up detection electrodes are formed on the first main surface CSF1 of the CF glass substrate CGB. Therefore, the parasitic capacitance created by the detection electrodes is small. In the magnetic field touch detection, the magnetic field detection coil is formed of the detection electrodes having small resistance and creating small parasitic capacitance, and therefore, a variation in detection sensitivity can be reduced in the display area 2.

According to the first embodiment, when a magnetic field is generated, the magnetic field generating coil using the drive electrode having the transparent electrode and auxiliary electrode is used to generate a strong magnetic field. When a magnetic field from the pen is detected, the magnetic field detection coil using the detection electrode having small resistance and creating small parasitic capacitance is used to detect the magnetic field. Since a strong magnetic field can be generated even if the generated magnetic field has the variation in the display area 2, the effect of the magnetic field variation can be reduced by increasing the electric charges charged in the capacitive element in the pen. On the other hand, when the magnetic field from the pen is detected, the variation in detection sensitivity in the display area 2 can be reduced by using the detection electrodes. Therefore, variations in the signal change at the amplifying circuit AMP in accordance with the detection position in the display area 2 can be reduced. In this manner, it is not required to change the characteristics of the amplifying circuit AMP (detection circuit) in accordance with the detection position. Alternatively, a degree of the change can be reduced.

According to the first embodiment, note that the amplifying circuit AMP is in common between the magnetic field touch detection and the electric field touch detection. The value of a signal change occurring at the detection electrode making up the coil in the magnetic field touch detection is different from the value of a signal change occurring at the detection electrode in electric field touch detection. Therefore, it is desirable to change or switch the characteristics of the amplifying circuit AMP between the magnetic field touch detection and the electric field touch detection. For example, it is desirable to switch the value of the integration capacitance CGS (FIGS. 11 and 12) between the magnetic field touch detection and the electric field touch detection.

According to the modification, in the magnetic field touch detection, the magnetic field generating coil and the magnetic field detection coil are formed of the drive electrodes. Also in electric field touch detection, the electric field is generated and detected by using the drive electrodes. The drive electrode making up the magnetic field generating coil is constructed by electrically connecting the physically-separated unit drive electrodes (unit first drive electrodes) to each other by the signal wiring. Since the physically-separated unit drive electrodes are connected to each other by the signal wiring, there is a risk in which the drive electrode making up the magnetic field generating coil has a large resistance and a large parasitic capacitance. However, for example, even if the detection electrode is not provided, that magnetic field touch detection and electric field touch detection can be executed, and the rise in the price of the display apparatus can be suppressed.

(Second Embodiment)

Figure 19:
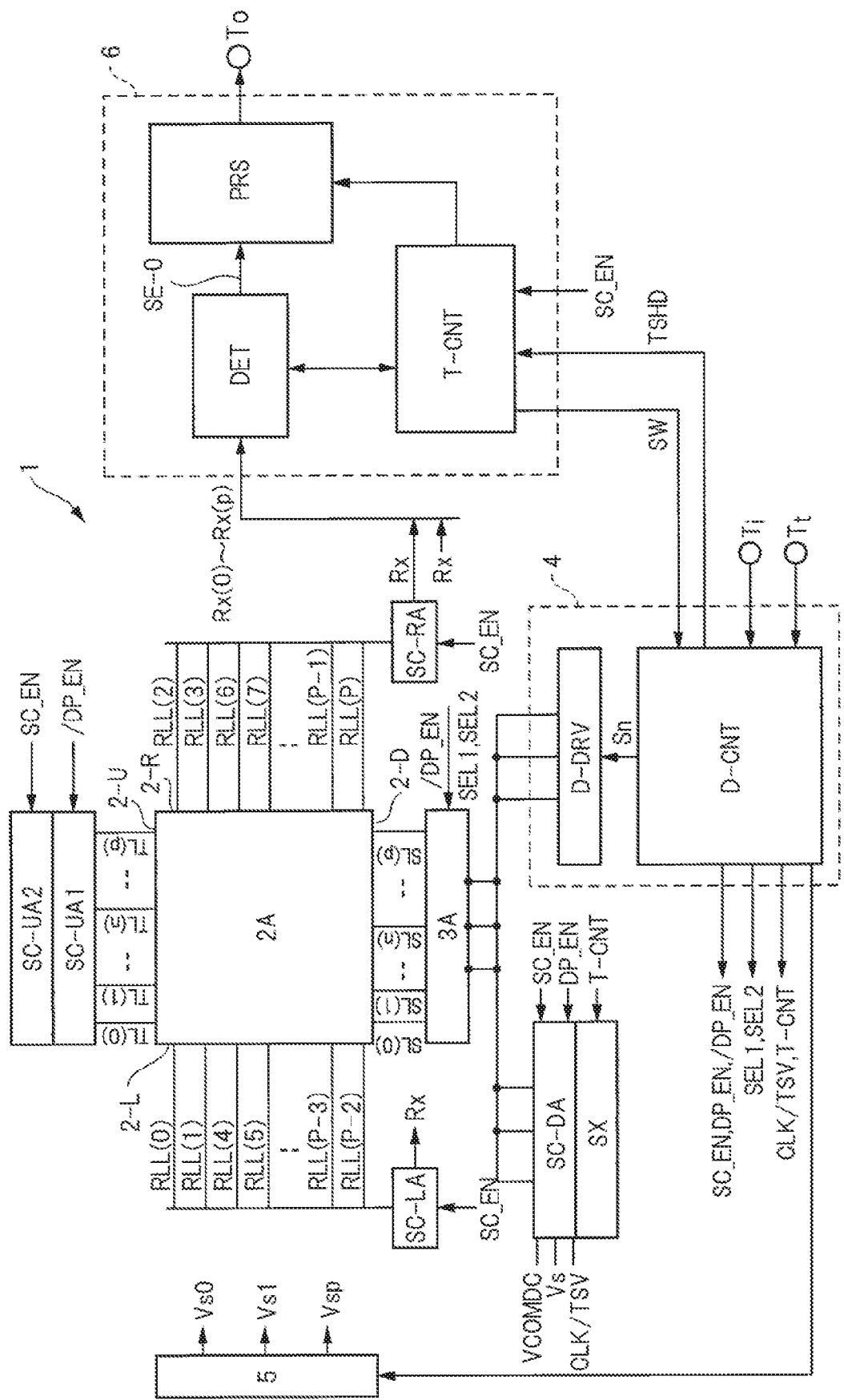
FIG. 19 is a block diagram showing a configuration of a display apparatus according to a second embodiment.

FIG. 19 is a block diagram of a configuration of the display apparatus 1 according to a second embodiment. Since FIG. 19 is similar to FIG. 5, differences will mainly be described. The gate driver 5, touch controller 6, and signal line driver D-DRV shown in FIG. 19 are the same as the gate driver 5, touch controller 6, and signal line driver D-DRV of FIG. 5, and therefore will be omitted in further description. While the control circuit D-CNT of FIG. 19 is similar to the circuit D-CNT of FIG. 5, the control circuit D-CNT of FIG. 19 in addition to the control circuit D-CNT of FIG. 5 generates a display control signal DP_EN indicating a display period and an inverted display control signal /DP_EN created by inverting a phase of the display control signal DP_EN. These display control signal DP_EN and inverted display control signal /DP_EN are generated based on, for example, the synchronizing signal TSHD. According to the second embodiment, the display control signal DP_EN is set at the high level in the display period, and is set at the low level in the magnetic field touch detection and electric field touch detection. Therefore, the inverted display control signal /DP_EN is set at the low level in the display period and is set at the high level in the magnetic field touch detection or electric field touch detection.

According to the first embodiment, the drive electrodes TL(0) to TL(p) are arranged so as to extend in the row direction (horizontal direction) and are parallel with each other in the column direction (vertical direction), and intersect with the drive electrodes TL(0) to TL(p) and the signal lines SL(0) to SL(p). The detection electrodes RL(0) to RL(p) are arranged so as to extend in the column direction and are parallel with each other in the row direction.

On the other hand, according to the second embodiment, the drive electrodes TL(0) to TL(p) are arranged so as to extend in the column direction and are parallel with each other in the row direction. As similar to the first embodiment, the signal lines SL(0) to SL(p) are arranged so as to extend in the column direction and are parallel with each other in the row direction. As a result, when the display area 2A is viewed from above in a top view according to the second embodiment, the drive electrodes TL(0) to TL(p) and the signal lines SL(0) to SL(p) are parallel with each other. According to the second embodiment, the detection electrodes RL(0) to RL(p) are arranged so as to extend in the row direction and are parallel with each other in the column direction. As a result, as similar to the first embodiment, the detection electrodes (second wirings) RL(0) to RL(p) intersect with the drive electrodes (first wirings) TL(0) to TL(p) and also with the signal lines SL(0) to SL(p) in the display area 2A.

In FIG. 19, a reference character "3A" indicates a signal line selector. The signal line selector 3A operates as similar to the signal selector 3 of FIG. 5 does in the display period. That is, to the signal line selector 3A, an image signal is supplied from the signal line driver D-DRV in a time-division manner. In the display period, the supplied image signal is transmitted to proper signal lines in accordance with the selection signals SEL1 and SEL2.

On the other hand, in the magnetic field touch detection and electric field touch detection, i.e., in the touch detection period, the signal line selector 3A electrically connects signal lines to drive electrodes. A switching circuit SC-UA1 is arranged along the side 2-U of the display area 2A. This switching circuit SC-UA1 also electrically connects signal lines to drive electrodes in touch detection period. Thus, in the touch detection period, signal lines are electrically connected to drive electrodes in portions close to the side 2-U and close to the side 2-D in the display area 2A. In this manner, in the touch detection period, the combined resistance of the drive electrodes is reduced. In FIG. 19, in order to avoid complicated illustration, the drive electrode arranged between the signal line selector 3A and the display area 2A is omitted, and only the signal lines SL(0) to SL(p) are shown. Similarly, the signal line arranged between the display area 2A and the switching circuit SC-UA1 is omitted, and only the drive electrodes TL(0) to TL(p) are shown.

In the touch detection period, a selection signal is supplied from a detection control circuit SX to a switching drive circuit (drive circuit or first switching circuit) SC-DA. To the switching drive circuit SC-DA, the predetermined voltage VCOMDC and the ground voltage Vs are supplied. To the switching drive circuit SC-DA, the coil clock signal CLK is supplied in the magnetic field touch detection, and the control signal TSV (denoted as CLK/TSV) whose voltage changes periodically is supplied in electric field touch detection.

A switching circuit SC-UA2 is arranged in vicinity of the side 2-U of the display area 2A. The switching circuit SC-UA2 is connected to the drive electrodes TL(0) to TL(p) in a portion close to the side 2-U, and electrically connects the predetermined drive electrodes in the magnetic field touch detection.

Also in the switching drive circuit SC-DA, the predetermined drive electrodes are electrically connected to each other. In the magnetic field touch detection, the predetermined drive electrodes are electrically connected to each other by the switching circuit SC-UA2, so that a plurality of magnetic field generating coils taking the drive electrodes as their windings are formed. In accordance with the selection signal from the detection control circuit SX, the switching drive circuit SC-DA selects a magnetic field generating coil that generates a magnetic field out of the plurality of magnetic field generating coils, and supplies the ground voltage Vs and coil clock signal CLK to the selected magnetic field generating coil. To the selected magnetic field generating coil, the coil clock signal CLK is supplied as a magnetic field drive signal on the basis of the ground voltage Vs as a reference voltage, so that a magnetic field in accordance with the magnetic field drive signal is generated. In the touch detection period, the signal line is electrically connected to the drive electrode by the signal line selector 3A and switching circuit SC-UA1, and therefore, the combined resistance of the drive electrodes can be reduced, and the selected magnetic field generating coil generates a strong magnetic field.

In electric filed touch detection, the switching circuit SC-UA2 electrically disconnects the drive electrodes from each other. The switching drive circuit SC-DA puts a drive electrode selected by a selection signal from the detection control circuit SX in a floating state, and supplies the control signal TSV to the selected drive electrode as an electric filed drive signal. In this manner, the selected drive electrode generates an electric field in accordance with the electric field drive signal.

The detection electrodes RL(0) to RL(p) arranged in the display area 2A are connected to switching amplification circuits (second switching circuits or detection circuits) SC-LA and SC-RA via signal wirings RLL(0) to RLL(p). According to the second embodiment, two detection electrodes adjacent to each other are paired, ends of the paired two detection electrodes are electrically connected to each other, and other ends of the two detection electrodes are connected to the signal wirings RLL. For example, the detection electrode RL(0) and the detection electrode RL(1) adjacent and parallel to the detection electrode RL(0) are paired. The paired detection electrodes RL(0) and RL(1) are electrically connected to each other in a location closer to the side 2-L, and are connected to the signal wirings RLL(0) and RLL(1) and to the switching amplification circuit SC-LA in a location closer to the side 2-R. Similarly, the paired detection electrodes RL(2) and RL(3) are electrically connected to each other in a location closer to the side 2-R, and are connected to the signal wirings RLL(2) and RLL(3) and to the switching amplification circuit SC-RA in a location closer to the side 2-L.

In the magnetic field touch detection, the switching amplification circuits SC-RA and SC-LA supply the ground voltage Vs to first signal wirings (e.g., signal wirings RLL(1), RLL(3), etc., which are also called switching signal wirings) out of the signal wirings RLL(0) to RLL(p), amplify a signal change at each of second signal wirings (e.g., signal wirings RLL(0), RLL(2), etc., which are also called detection signal wirings), and supply the amplified signal change to the detection circuit DET as a detection signal Rx. According to the second embodiment, a single-winding magnetic field detection coil is formed by the detection electrodes arranged close to and parallel with each other. By supplying the ground voltage Vs to this magnetic field detection coil via the switching signal wirings, the switching amplification circuits SC-RA and SC-LA receives and amplifies a signal change at the magnetic field detection coil via the detection signal wirings on the basis of the ground voltage Vs as a reference voltage. As a result, a detection signal in accordance with a magnetic field from the pen can be supplied to the detection circuit DET, so that the presence/absence of the pen and/or the handwriting pressure can be detected.

In electric field touch detection, the switching amplification circuits SC-RA and SC-LA put the switching signal wiring out of the signal wirings RLL(0) to RLL(p) in a floating state, amplify a signal change at the detection signal wiring, and supply the amplified signal change to the detection circuit DET as the detection signal Rx. The electric field is changed depending on whether the finger touches or not. In accordance with this change, a signal at the detection signal wiring is changed. Hence, by determining the detection signal Rx by the detection circuit DET, the presence/absence of the finger can be detected.

According to the second embodiment, note that the magnetic field from the pen is detected by the plurality of magnetic field detection coils, and the detection results are supplied to the detection circuit DET as the detection signals Rx(0) to Rx(p). Also in electric field touch detection, the change in the electric field generated by the electric field drive signal is detected by the plurality of detection electrodes, and detection results are supplied to the detection circuit DET as the detection signals Rx(0) to Rx(p).

In the display period, the predetermined voltage VCOMDC is supplied from the switching drive circuit SC-DA to drive electrodes as a display drive voltage. The display operation is the same as that of the first embodiment, and therefore, will be omitted in further description. In the display period, note that the signal selector 3A and the switching circuit SC-UA1 electrically disconnect the signal lines from the drive electrodes.

<<Signal Line Selector 3A and Switching Circuit SC-UA1>>

Figure 20:
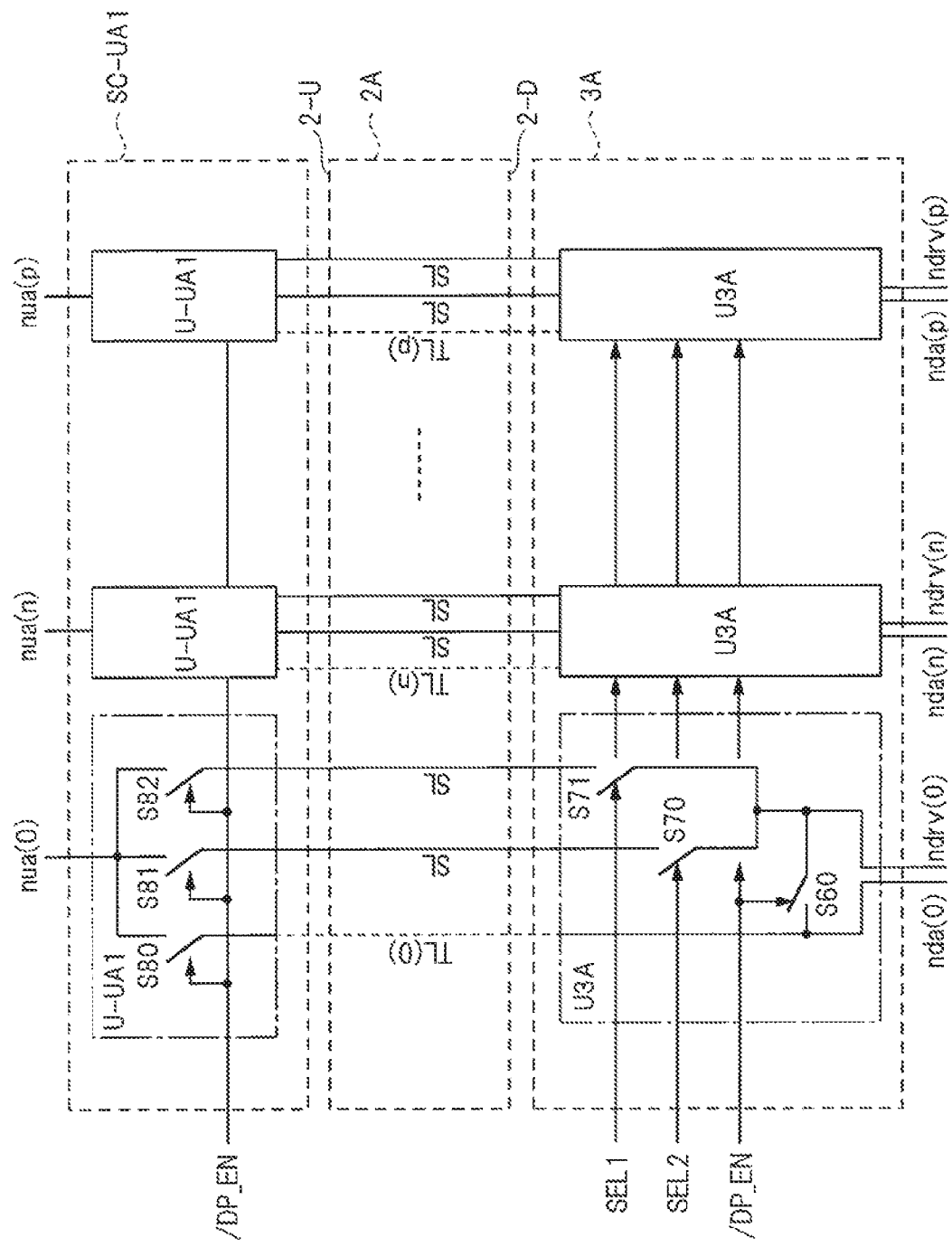
FIG. 20 is a circuit diagram showing a configuration of a signal line selector and a switching circuit in the display apparatus according to the second embodiment.

Next, an example of the signal line selector 3A and the switching circuit SC-UA1 will be described. FIG. 20 is a circuit diagram showing a configuration of the signal line selector 3A and switching circuit SC-UA1 in the display apparatus according to the second embodiment. In FIG. 20, reference characters TL(0) to TL(p) indicate the drive electrodes arranged in the display area 2A, and a reference character SL indicates the signal line arranged in the display area 2A. When seen in a plan view, the drive electrodes TL(0) to TL(p) and the plurality of signal lines SL are arranged so as to extend in parallel with each other as shown in FIG. 20.

The signal line selector 3A has a plurality of unit selectors U3A. The unit selectors U3A have the same configuration with each other, and therefore, one unit selector U3A is shown in detail in FIG. 20. The unit selector U3A has a seventh switch S60 and eighth switches S70 and S71. The seventh switch S60 is connected between an output node ndrv(0) of the signal line driver D-DRV and a node nda(0) of the switching drive circuit SC-DA, and is controlled to be switched by the inverted display control signal /DP_EN. The eighth switches S70 and S71 are connected between the output node ndrv(0) of the signal line driver D-DRV and signal lines SL. The eighth switch S70 is controlled to be switched by the selection signal SEL1, while the eighth switch S71 is controlled to be switched by the selection signal SEL2.

In the display period, the inverted display control signal /DP_EN is set at the low level, and therefore, the seventh switch S60 is switched off. In this manner, the drive electrode TL(0) is disconnected from the signal lines SL. On the other hand, in the display period, the selection signals SEL1 and SEL2 are at the high level complementarily, and the eighth switches S70 and S71 are switched on complementarily. In this manner, an image signal output from the output node ndrv(0) of the signal line driver D-DRV is supplied to a plurality of signal lines SL (two signal lines in the drawing) in time division.

In touch detection, the inverted display control signal /DP_EN is set at the high level, and both selection signals SEL1 and SEL2 are also at the high level. In this manner, in touch detection, the seventh switch S60 and the eighth switches S70 and S71 are switched on. As a result, in touch detection, the plurality of signal lines SL are electrically connected to the drive electrode TL(0).

The switching circuit SC-UA1 has a plurality of unit switching circuits U-UA1 having the same configuration with each other. FIG. 20 shows the detailed configuration of only the unit switching circuit U-UA1 corresponding to the unit signal line selector U3A. The unit switching circuit U-UA1 has ninth switches S80 to S82. The ninth switch S80 is connected between the drive electrode TL(0) and a node nua(0), while each of the ninth switches S81 and S82 is connected between the signal line SL and the node nua(0). The ninth switches S80 to S82 are controlled to be switched by the inverted display control signal /DP_EN.

In the display period, the inverted display control signal /DP_EN is set at the low level, and therefore, the ninth switches S80 to S82 are switched off. On the other hand, in touch detection, the inverted display control signal /DP_EN is set at the high level, and therefore, the ninth switches S80 to S82 are switched on. As a result, in the display period, the signal lines SL are electrically disconnected from the drive electrode TL(0). On the other hand, in touch detection, the signal lines SL are electrically connected to the drive electrode TL(0) via the ninth switches S80 to S82.

The signal line selector 3A is arranged along the side 2-D of the display area 2A, and the switching circuit SC-UA1 is arranged along the side 2-U of the display area 2A. Therefore, in touch detection, the signal lines SL are connected to the drive electrode TL(0) in an area closer to the side 2-D, and the signal lines SL are connected to the drive electrode TL(0) also in an area closer to the side 2-U. That is, the plurality of signal lines SL are connected in parallel to the drive electrode TL(0). As a result, in touch detection, the combined resistance of the drive electrode TL(0) can be reduced. On the other hand, in the display period, the drive electrode TL(0) is electrically disconnected from the signal lines SL, and therefore, a display drive signal is supplied to the drive electrode TL(0), so that the display drive signal and an image signal are supplied to a pixel for displaying an image.

The unit signal line selector U3A and unit switching circuit U-UA1 corresponding to the drive electrode TL(0) have been described as an example. T configurations and operations of the unit signal line selectors U3A and unit switching circuits U-UA1 corresponding to other drive electrodes TL(1) to TL(p) are the same as described above.

For simpler explanation, note that FIG. 20 shows the case of the connection of two signal lines to one drive electrode in touch detection. However, the connection is not limited to this case. For example, in touch detection, three or more signal lines may be connected in parallel to one drive electrode.

<<Magnetic Field Generating Coil>>

Figure 21:
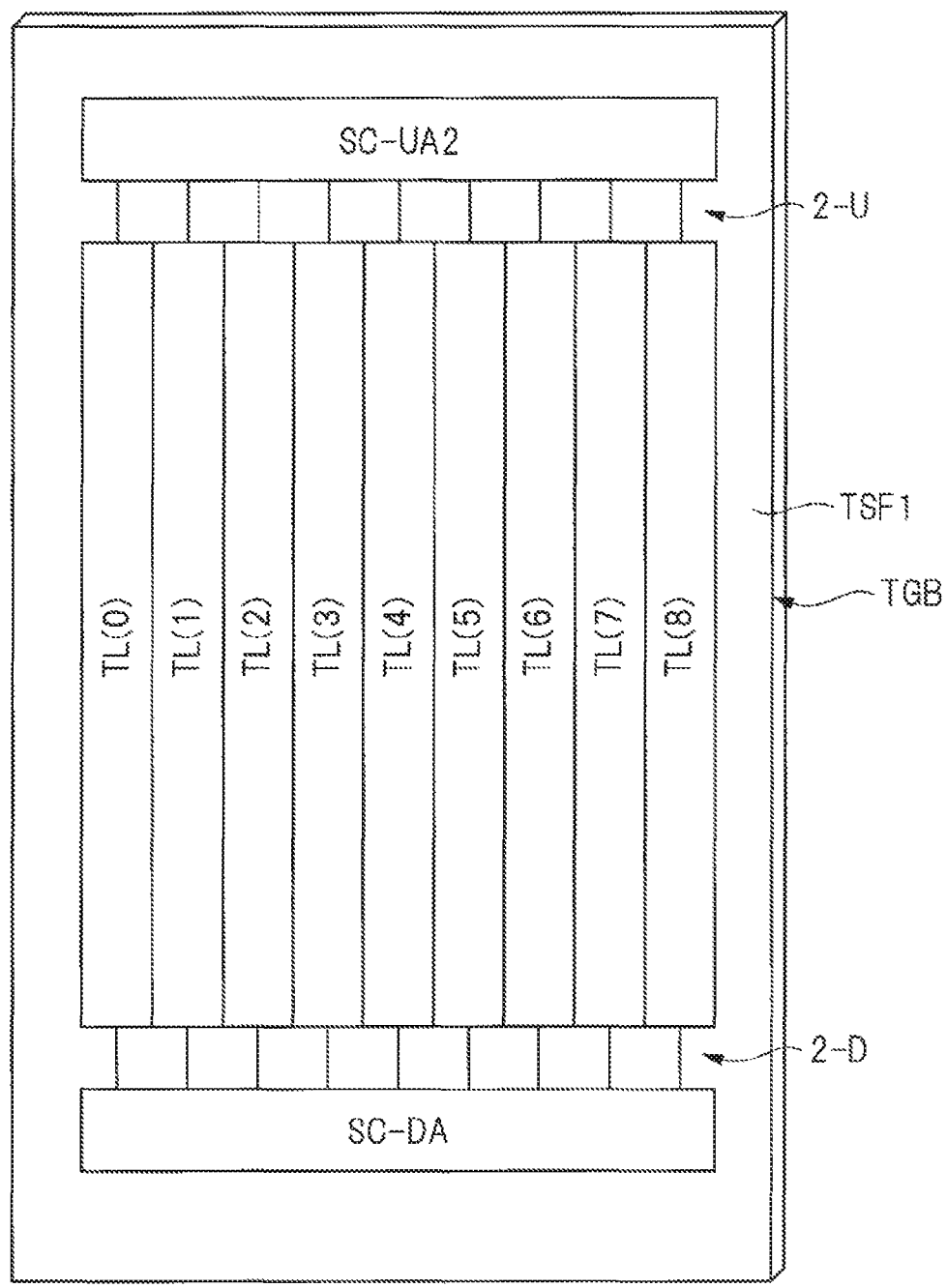
FIG. 21 is a plan view showing a configuration of the display apparatus according to the second embodiment.

FIG. 21 is a plan view schematically showing a configuration of the liquid crystal display apparatus according to the second embodiment. According to the second embodiment, in the magnetic field touch detection, magnetic field generating coils are formed by using the drive electrodes TL(0) to TL(p) arranged in the display area 2A. According to the second embodiment, in the magnetic field touch detection, the predetermined drive electrodes are electrically connected to each other by the switching circuit SC-UA2 and the switching drive circuit SC-DA, so that a magnetic field generating coil is formed. An operation of the formation of the magnetic field generating coil by using the drive electrodes switching circuit SC-UA2 and the switching drive circuit SC-DA while taking the drive electrode as a winding will be described with reference to FIG. 21. In FIG. 21, note that the switching circuit SC-UA1 and signal line selector 3A shown in FIG. 20 are omitted. However, in touch detection, the plurality of signal lines are connected in parallel to the respective drive electrodes by the switching circuit SC-UA1 and signal line selector 3A.

FIG. 21 shows a case in which a double-winding magnetic field generating coil is formed by using the drive electrode. For simpler explanation, FIG. 21 shows only the drive electrodes TL(0) to TL(8) out of the drive electrodes TL(0) to TL(p) formed on the first main surface TSF1 of the TFT glass substrate TGB.

The switching circuit SC-UA2 is arranged along the side 2-U of the display area 2A and is connected to the nodes nua(0) to nua(8) of the switching circuit SC-UA1 (see FIG. 20). As understood from FIG. 20, in the magnetic field touch detection, the nodes nua(0) to nua(8) are connected to the drive electrodes TL(0) to TL(8) corresponding thereto. The switching drive circuit SC-DA is arranged along the side 2-D of the display area 2A, and has the nodes nda(0) to nda(8) (see FIG. 20). As understood from FIG. 20, in the magnetic field touch detection, the nodes nda(0) to nda(8) are connected to the drive electrodes TL(0) to TL(8) corresponding thereto. As described above with reference to FIG. 20, note that a plurality of signal lines are connected in parallel to the respective drive electrodes TL(0) to TL(8) in the magnetic field touch detection.

In the magnetic field touch detection, the switching circuit SC-UA2 electrically connects the node nua(0) corresponding to the drive electrode TL(0) with the node nua(3) corresponding to the drive electrode TL(3), and also electrically connects the node nua(1) corresponding to the drive electrode TL(1) with the node nua(4) corresponding to the drive electrode TL(4). On the other hand, the switching drive circuit SC-DA has a signal wiring that connects the node nda(1) corresponding to the drive electrode TL(1) with the node nda(3) corresponding to the drive electrode TL(3). In this manner, in the magnetic field touch detection, the drive electrodes TL(0), TL(1), TL(3), and TL(4), which are arranged in parallel with each other, are connected in series by the switching circuit SC-UA2 and switching drive circuit SC-DA, so that a magnetic field generating coil taking the drive electrodes TL(0), TL(1), TL(3), and TL(4) as its winding is formed.

In the magnetic field touch detection, from a portion closer to the side 2-D, the switching drive circuit SC-DA supplies the ground voltage Vs to the node nda(0) corresponding to the drive electrode TL(0) and supplies the clock signal CLK to the node nda(4) corresponding to the drive electrode TL(4). As a result, a magnetic field generating coil which puts the drive electrode TL(2) at its center and which is sandwiched between the derive electrodes TL(0) and TL(1) and the derive electrodes TL(3) and TL(4) is formed, so that a magnetic field that changing in accordance with the coil clock signal CLK is formed. In this case, the generated magnetic field becomes the strongest at the drive electrode TL(2) which is the center of the coil.

Similarly, in the magnetic field touch detection, by the switching circuit SC-UA2 and the switching drive circuit SC-DA, a magnetic field generating coil taking other drive electrode as its winding is formed. For example, a magnetic field generating coil taking the drive electrodes TL(5), TL(6), TL(8), and TL(9) as its winding is formed. In this case, the drive electrode TL(7) is at the center of the magnetic field generating coil. When the ground voltage Vs and the coil clock signal CLK are supplied to this magnetic field generating coil, a stronger magnetic field is generated in the area of the drive electrode TL(7).

In this manner, in the magnetic field touch detection, a plurality of magnetic field generating coils taking drive electrodes as their windings are formed. By the detection control circuit SX (FIG. 19), it is determined to which magnetic field generating coil among the plurality of formed magnetic field generating coils the coil clock signal CLK is to be supplied.

<<Configuration of Switching Circuit SC-UA2>>

Figure 22:
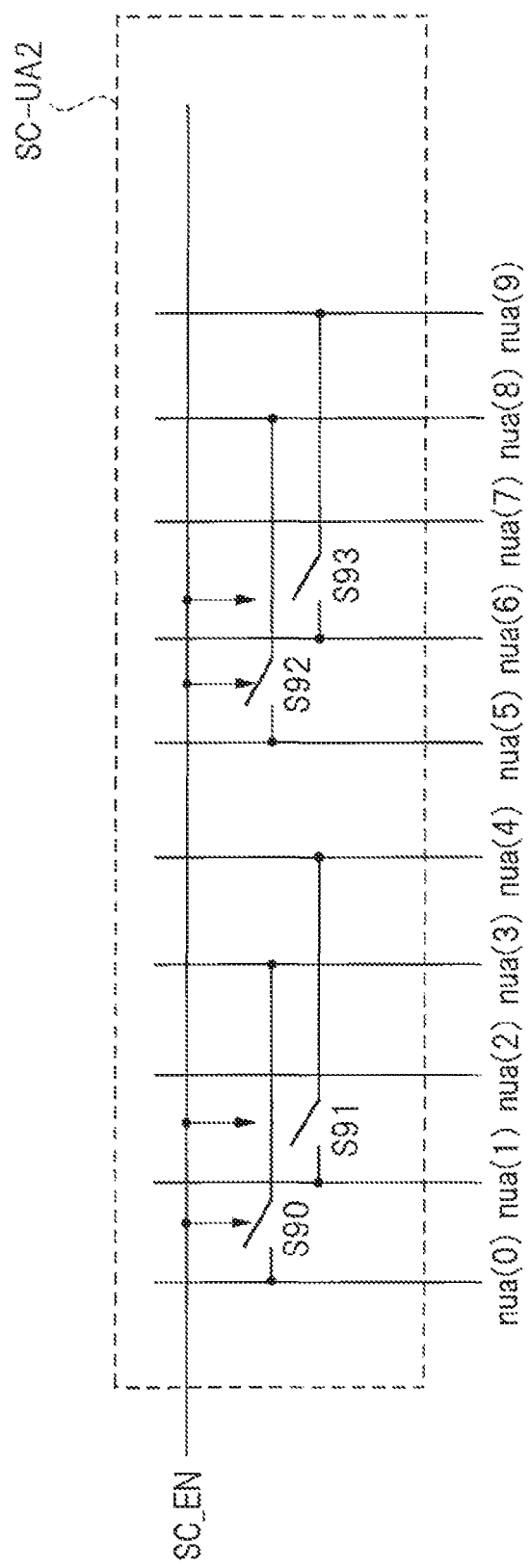
FIG. 22 is a circuit diagram showing a configuration of the switching circuit in the display apparatus according to the second embodiment.

FIG. 22 is a circuit diagram of a configuration of the switching circuit SC-UA2 according to the second embodiment. FIG. 22 shows a circuit of parts that corresponds to the drive electrodes TL(0) to TL(8) of FIG. 21 and the drive electrode TL(9) arranged close to the drive electrode TL(8).

The switching circuit SC-UA2 has tenth switches S90 to S93. Each of the tenth switches S90 to S93 is controlled to be switched by the magnetic-field enable signal SC_EN. That is, the tenth switches S90 to S93 are switched on, when the magnetic-field enable signal SC_EN is at the high level, while the tenth switches S90 to S93 are switched off when the magnetic-field enable signal SC_EN is at the low level. In other words, the tenth switches S90 to S93 are switched on in the magnetic field touch detection, and the tenth switches S90 to S93 are switched off in electric field touch detection.

The tenth switch S90 is connected between the node nua(0) corresponding to the drive electrode TL(0) and the node nua(3) corresponding to the drive electrode TL(3), and the tenth switch S91 is arranged between the node nua(1) corresponding to the drive electrode TL(1) and the node nua(4) corresponding to the drive electrode TL(4). Similarly, the tenth switch S92 is arranged between the node nua(5) corresponding to the drive electrode TL(5) and the node nua(8) corresponding to the drive electrode TL(8), and the tenth switch S93 is arranged between the node nua(6) corresponding to the drive electrode TL(6) and the node nua(9) corresponding to the drive electrode TL(9).

As a result, in an area closer to the side 2-U of the display area 2A in the magnetic field touch detection, the drive electrode TL(0) and the drive electrode TL(3) are connected to each other, and the drive electrode TL(1) and the drive electrode TL(4) are connected to each other. At this time, the drive electrode TL(5) and the drive electrode TL(8) are connected to each other, and the drive electrode TL(6) and the drive electrode TL(9) are also connected to each other. On the other hand, in electric field touch detection, the drive electrodes TL(0) to TL(9) are electrically disconnected from each other.

Also in the drive electrodes TL(10) to TL(p), predetermined drive electrodes are similarly electrically connected to each other by the tenth switch in the magnetic field touch detection, and the drive electrodes are electrically disconnected from each other in electric field touch detection.

<<Configuration of Switching Drive Circuit SC-DA>>

Figure 23:
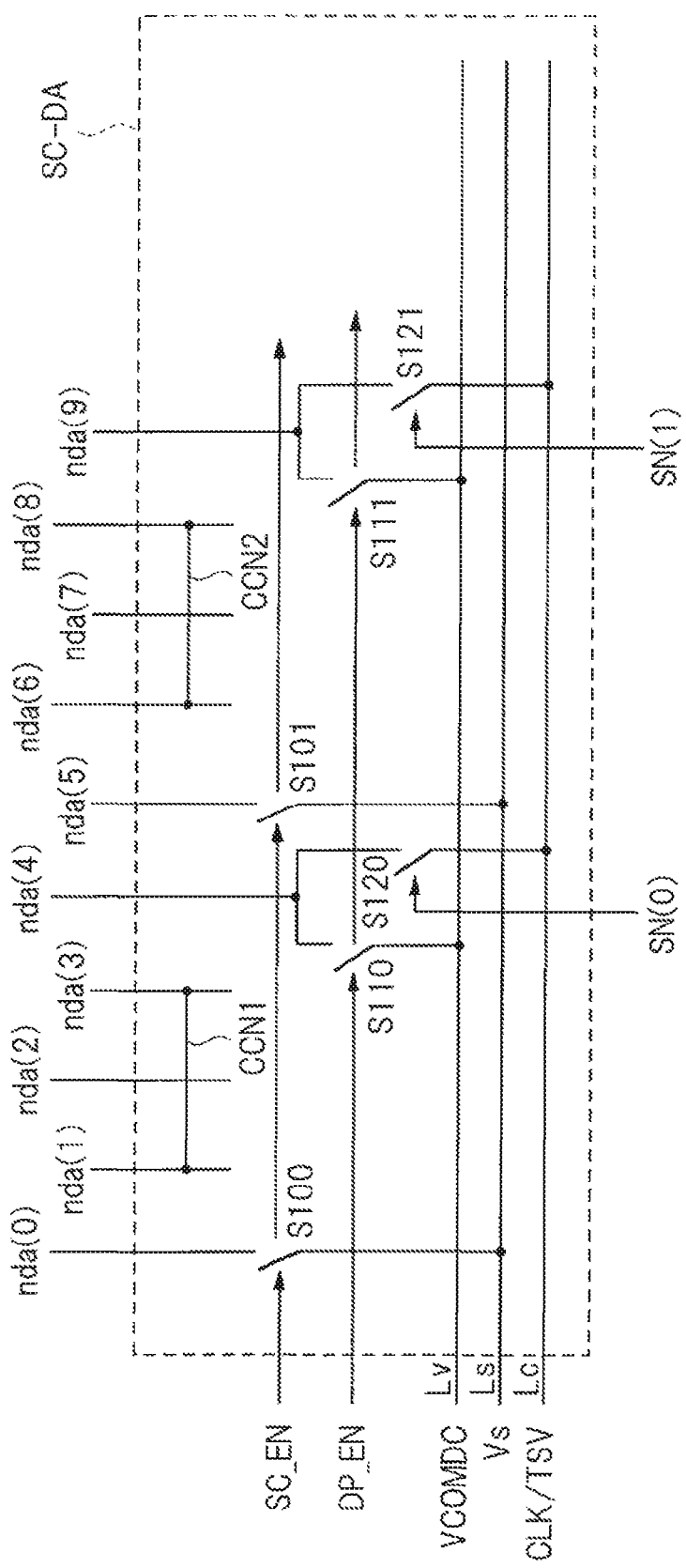
FIG. 23 is a circuit diagram showing a configuration of a switching drive circuit in the display apparatus according to the second embodiment.

FIG. 23 is a circuit diagram of a configuration of the switching drive circuit SC-DA according to the second embodiment. FIG. 23 shows only a circuit of a part that corresponds to the drive electrodes TL(0) to TL(9) described in FIG. 22.

The switching drive circuit SC-DA has eleventh switches S100 and S101, twelfth switches S110 and S111, thirteenth switches S120 and S121, and signal wirings CCN1 and CCN2. The eleventh switches S100 and S101 are controlled to be switched by the magnetic-field enable signal SC_EN, the twelfth switches S110 and S111 are controlled to be switched by the display control signal DP_EN, and the thirteenth switches S120 and S121 are controlled to be switched by the corresponding selection signals SN(0) and SN(1) from the detection control circuit SX.

The eleventh switch S100 is connected between the node nda(0) corresponding to the drive electrode TL(0) and the signal wiring Ls, and the eleventh switch S101 is connected between the node nda(5) corresponding to the drive electrode TL(5) and the signal wiring Ls. In the magnetic field touch detection, the magnetic-field enable signal SC_EN is set at the high level, thus the eleventh switches S100 and S101 are switched on in the magnetic field touch detection while the eleventh switches S100 and S101 are switched off in electric field touch detection. Because the eleventh switches S100 and S101 are switched on in the magnetic field touch detection, the drive electrode TL(0) corresponding thereto via the node nda(0) is connected to the signal wiring Ls, and the drive electrode TL(5) corresponding thereto via the node nda(5) is also connected to the signal wiring Ls. To this signal wiring Ls, the ground voltage Vs is supplied. Therefore, in magnetic field touch detection, the ground voltage Vs is supplied in an area closer to the side 2-D to the drive electrodes TL(0) and TL(5).

The twelfth switch S110 is connected between the node nda(4) corresponding to the drive electrode TL(4) and the signal wiring Lv, and the twelfth switch S111 is connected between the node nda(9) corresponding to the drive electrode TL(9) and the signal wiring Lv. In the display period, the display control signal DP_EN is set at the high level, thus the twelfth switches S110 and S111 are switched on in the display period, while the twelfth switches S110 and S111 are switched off in touch detection. Because the twelfth switches S110 and S111 are switched on in the display period, the drive electrode TL(4) corresponding thereto via the node nda(4) is connected to the signal wiring Lv, and the drive electrode TL(9) corresponding thereto via the node nda(9) is also connected to the signal wiring Lv. To this signal wiring Lv, the predetermined voltage VCOMDC is supplied.

Because the twelfth switches are switched on in the display period, the predetermined voltage VCOMDC is supplied in an area closer to the side 2-D to the drive electrodes TL(4) and TL(9). This predetermined voltage VCOMDC becomes a display drive signal. In FIG. 23, the drive electrodes TL(4) and TL(9) are provided with respective twelfth switches. However, the drive electrodes TL(0) and TL(p) may be provided with twelfth switches.

The thirteenth switch S120 is connected between the node nda(4) corresponding to the drive electrode TL(4) and the signal wiring Lc, and the thirteenth switch S121 is connected between the node nda(9) corresponding to the drive electrode TL(9) and the signal wiring Lc. According to the second embodiment, the detection control circuit SX outputs selection signals corresponding to the respective thirteenth switch. FIG. 23 shows only the selection signal SN(0) corresponding to the thirteenth switch S120 and the selection signal SN(1) corresponding to the thirteenth switch S121.

In touch detection, i.e., in magnetic field touch detection or electric field touch detection, the detection control circuit SX sets a selection signal, corresponding to an area where the detection is executed, to the high level, and sets a selection signal, corresponding to an area where the detection is not executed, to the low level although described later with reference to FIG. 24. In touch detection, for example, a selection signal SN(0) is set at the high level, thus the thirteenth switch S120 is switched on. At this time, a selection signal SN(1) is at the low level, the thirteenth switch S121 is switched off. When the thirteenth switch S120 is switched on, the corresponding drive electrode TL(4) via the node nda(4) and thirteenth switch S120 is connected to the signal wiring Lc. At this time, the thirteenth switch S121 is switched off, and therefore, the corresponding drive electrode TL(9) is not connected to the signal wiring Lc, and the drive electrode TL(9) is electrically disconnected from the signal wiring Lc.

When touch detection is executed as magnetic field touch detection, the coil clock signal CLK is supplied to the signal wiring Lc, and therefore, the coil clock signal CLK is supplied to the drive electrode TL(4). On the other hand, when the touch detection is executed as electric field touch detection, the control signal TSV whose voltage changes periodically is supplied to the signal wiring Lc. Consequently, in electric field touch detection, the control signal TSV is supplied to the drive electrode TL(4).

When the selection signal SN(1) is at the high level while the selection signal SN(0) is at the low level, the thirteenth switch S121 is switched on while the thirteenth switch S120 is switched off similarly. As a result, in the magnetic field touch detection, the coil clock signal CLK is supplied to the drive electrode TL(9) via the thirteenth switch S121. In electric field touch detection, the control signal TSV is supplied to the drive electrode TL(9) via the thirteenth switch S121.

In the switching drive circuit SC-DA, the node nda(1) corresponding to the drive electrode TL(1) is connected to the node nda(3) corresponding to the drive electrode TL(3) via the signal wiring CCN1. In the switching drive circuit SC-DA, the node nda(6) corresponding to the drive electrode TL(6) is connected to the node nda(8) corresponding to the drive electrode TL(8) via the signal wiring CCN2.

<<Configuration of Detection Control Circuit>>

Figure 24:
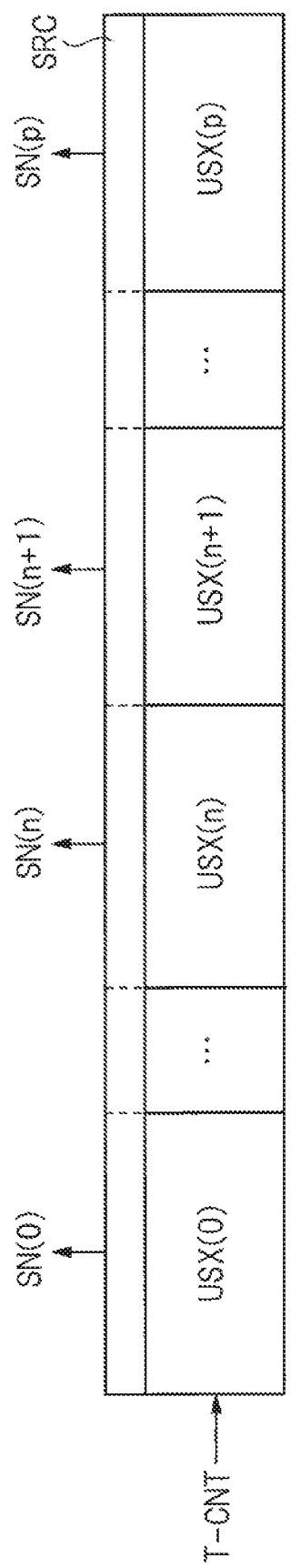
FIG. 24 is a circuit diagram showing a configuration of a detection control circuit in the display apparatus according to the second embodiment.

FIG. 24 is a block diagram of a configuration of the detection control circuit SX according to the second embodiment. As similar to the detection control circuit SR described above with reference to FIG. 9, the detection control circuit SX has a shift register and a control circuit SRC. FIG. 24 shows register stages USX(0) to USX(p) making up the shift register. Before execution of touch detection, touch detection area specifying information is set to a desired register stage by a control signal T-CNT. For example, the touch detection area specifying information is set to the register stage USX(0). The set touch detection area specifying information sequentially moves from a shift register stage to a shift register stage by changes in a shift clock signal not shown. For example, the touch detection area specifying information set to the register stage USX(0) moves (shifts) from the register stage USX(0) to the register stage USX(p) in synchronization with changes in a shift clock signal. The touch detection area specifying information stored in the register stages USX(0) to USX(p) is output as the selection signals SN(0) to SN(p) via the control circuit SRC.

The control circuit SRC determines which one of the display period and the touch detection period is to be executed based on the display control signal DP_EN. When the touch detection period is to be executed, the control circuit SRC outputs the touch detection area specifying information stored in the register stages USX(0) to USX(p). For example, in touch detection, the touch detection area specifying information moves from the register stage USX(0) to the register stage USX(p), so that the selection signals are sequentially set to the high level from the selection signal SN(0) to the selection signal SN(p).

<<Operations of Switching Circuit SC-UA2, Switching Drive Circuit SC-DA, and Detection Control Circuit SX>>

Next, an operation in the magnetic field touch detection will be described with reference to FIGS. 22 to 24. Here, the explanation will be made about a case in which a magnetic field generating coil is formed of the drive electrodes TL(0), TL(1), TL(3), and TL(4), and in which this magnetic field generating coil is selected. In this case, touch detection area specifying information is stored in the register stage USX(0). By this touch detection area specifying information, the selection signal SN(0) corresponding to the register stage USX(0) to is set at the high level, and the rest of selection signals SN(1) to SN(p) are set at the low level.

In the magnetic field touch detection, the magnetic-field enable signal SC_EN is set at the high level, and therefore, the tenth switches S90 to S93 of FIG. 22 are switched on. As a result, the drive electrode TL(0) is connected to the drive electrode TL(3) via the tenth switch S90 in an area closer to the side 2-U, the drive electrode TL(3) is connected to the drive electrode TL(1) via the signal wiring CCN1 in an area closer to the side 2-D, and the drive electrode TL(1) is connected to the drive electrode TL(4) via the tenth switch S91 in an area closer to the side 2-U. In this manner, the drive electrodes TL(0), TL(1), TL(3), and TL(4) are connected in series to form a magnetic field generating coil. At this time, other drive electrodes, e.g., drive electrodes TL(5), TL(6), TL(8), and TL(9) are also connected in series to form another magnetic field generating coil.

Since the magnetic-field enable signal SC_EN is at the high level, the eleventh switches S100 and S101 are also switched on. As a result, the ground voltage Vs is supplied via the eleventh switch to respective one ends (nodes nda(0) and nda(5)) of the magnetic field generating coils formed of the drive electrodes. Since this period is not the display period, the display control signal DP_EN is at the low level. Therefore, the twelfth switches S110 and S111 of FIG. 23 are switched off.

Since the selection signal SN(0) is at the high level, the thirteenth switch S120 is switched on. At this time, the selection signal SN(1) is at the low level, and therefore, the thirteenth switch S121 is switched off. In the magnetic field touch detection, the coil clock signal CLK is supplied to the signal wiring Lc. The coil clock signal CLK is supplied to the node nda(4) via the thirteenth switch S120 switched on by the selection signal SN(0). That is, the coil clock signal CLK is supplied to the other end (node nda(4)) of the magnetic field generating coil. At this time, no coil clock signal CLK is supplied to the other end (node nda(9)) of another magnetic field generating coil formed of the drive electrodes TL(5), TL(6), TL(8), and TL(9).

The ground voltage Vs is supplied to one end of the magnetic field generating coil formed of the drive electrodes TL(0), TL(1), TL(3), and TL(4), and the coil clock signal CLK is supplied to the other end thereof. The voltage of the coil clock signal CLK changes periodically, and therefore, a voltage that changes periodically on the basis of the ground voltage Vs as the reference voltage is applied to this magnetic field generating coil, so that a magnetic field is generated.

On the other hand, the ground voltage Vs is supplied to one end (node nda(5)) of another magnetic field generating coil, e.g., a magnetic field generating coil formed of the drive electrodes TL(5), TL(6), TL(8), and TL(9). However, no coil clock signal CLK is supplied to the other end (node nda(9)) thereof. As a result, a magnetic field is not generated.

In this manner, in the magnetic field touch detection, a selection signal output from the detection control circuit SX serves as a signal for selecting a magnetic field generating coil that generates a magnetic field out of a plurality of magnetic field generating coils formed of the drive electrodes arranged in the display area 2A. Since the pen is detected in an area where the drive electrodes making up the magnetic field generating coil generating a magnetic field are arranged, the selection signal can be regarded as a signal for selecting a detection area.

Next, an operation in electric field touch detection will be described. Also here, the selection signal SN(0) corresponding to the register stage USX(0) to is set at the high level, and the rest of selection signals SN(1) to SN(p) are set at the low level.

In the electric field touch detection, the magnetic-field enable signal SC_EN is set at the low level. Therefore, the tenth switches S90 to S93 are switched off. Also, the eleventh switches S100 and S101 are also switched off. Since this period is not the display period, the display control signal DP_EN is at the low level, and the twelfth switches S110 and S111 are switched off.

Since the selection signal SN(0) is at the high level, the thirteenth switch S120 is switched on. At this time, the selection signal SN(1) is at the low level, and therefore, the thirteenth switch S121 is switched off. Since the thirteenth switch S120 is switched on, the drive electrode TL(4) is connected to the signal wiring Lc. The control signal TSV is supplied to the signal wiring Lc because of the electric field touch detection. Therefore, the control signal TSV is supplied to the drive electrode TL(4) in an area closer to the side 2-D. When the control signal TSV is supplied thereto, the drive electrode TL(4) is electrically disconnected from other drive electrodes, and is put in a floating state, so that the control signal TSV is supplied to the drive electrode TL(4) since the tenth switches S90 and S91, eleventh switch S100, and twelfth switch S110 are switched off. As a result, the drive electrode TL(4) generates an electric field in accordance with changes in the voltage of the control signal TSV. In other words, the control signal TSV is supplied to the drive electrode TL(4) as an electric field drive signal, and generates an electric field in accordance with changes in this electric field drive signal.

When the electric field drive signal is supplied to the drive electrode TL(4), no electric field drive signal is supplied to other drive electrodes (such as drive electrodes TL(0) to TL(3) and TL(5) to TL(9)). Therefore, no electric field is generated in other drive electrodes. Therefore, in electric field touch detection, a selection signal output from the detection control circuit SX becomes a signal for selecting a drive electrode that generates an electric field out of the plurality of drive electrodes arranged in the display area 2A. In touch detection, it is detected whether, for example, the finger is touching a portion in vicinity of a drive electrode generating an electric field or not. Therefore, also in electric field touch detection, the selection signal can be regarded as a signal for selecting a touch detection area.

<<Magnetic Field Detection Coil>>

According to the second embodiment, the detection electrodes arranged on the first main surface CSF1 of the CF glass substrate CGB are used in touch detection as similar to the first embodiment. That is, the detection electrodes are used as electrodes that form magnetic field detection coils in the magnetic field touch detection, and are used as electrodes that detect changes in an electric field in electric field touch detection.

Figure 25:
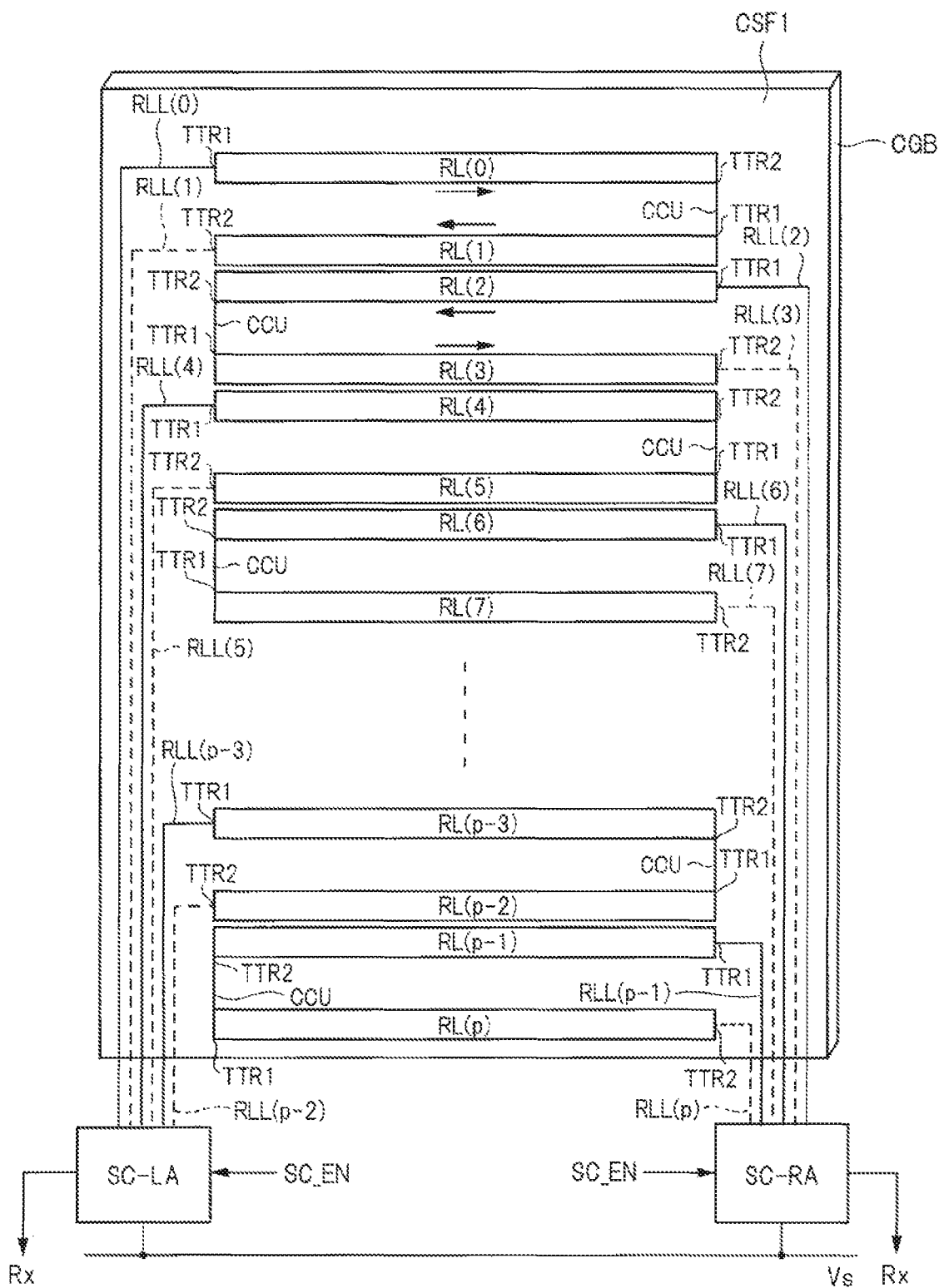
FIG. 25 is a plan view showing a configuration of the display apparatus according to the second embodiment.

FIG. 25 is a plan view schematically showing a configuration of detection electrodes according to the second embodiment. In FIG. 25, the units are schematically shown in accordance with the actual arrangement. The detection electrodes RL(0) to RL(p) are arranged on the first main surface CSF1 of the CF glass substrate CGB. According to the second embodiment, the detection electrodes RL(0) to RL(p) are arranged so as to extend in the row direction and are parallel with each other in the column direction. And, according to the second embodiment, two detection electrodes are paired so that a single-winding coil is formed of the pair of detection electrodes. In the magnetic field touch detection, a coil formed of a pair of detection electrodes is used as a magnetic field detection coil. In electric field touch detection, at least one of the paired detection electrodes making up the coil is used as an electrode that detects an electric field. Note that the detection electrodes RL(0) to RL(p) have, for example, such a structure as described above with reference to FIG. 15.

According to the second embodiment, when seen in a plan view, two detection electrodes close to each other become a pair of detection electrodes making up the coil. In the description while exemplifying FIG. 25, the detection electrodes RL(0) and RL(1) are paired, the detection electrodes RL(2) and RL(3) are paired, the detection electrodes RL(4) and RL(5) are paired, and the detection electrodes RL(6) and RL(7) are paired. Hereinafter, the detection electrodes RL(p−1) and RL(p) are similarly paired.

Each of the detection electrodes RL(0) to RL(p) has one end TTR1 and the other end TTR2. The other end TTR2 of the detection electrode RL(0) and one end TTR1 of the detection electrode RL(1), the detection electrodes RL(0) and RL(1) being paired, are connected to the connection electrode CCU (FIG. 15) in an area closer to the side 2-R of the display area 2A (FIG. 19). And, the other end TTR2 of the detection electrode RL(2) and one end TTR1 of the detection electrode RL(3), the detection electrodes RL(2) and RL(3) being paired, are connected to the connection electrode CCU (FIG. 15) in an area closer to the side 2-L of the display area 2A (FIG. 19). Further, the other end TTR2 of the detection electrode RL(4) and one end TTR1 of the detection electrode RL(5), the detection electrodes RL(4) and RL(5) being paired, are connected to the connection electrode CCU in an area closer to the side 2-R of the display area 2A, and the other end TTR2 of the detection electrode RL(6) and one end TTR1 of the detection electrode RL(7), the detection electrodes RL(6) and RL(7) being paired, are connected to the connection electrode CCU in an area closer to the side 2-L of the display area 2A. Hereinafter, the paired detection electrodes are connected to each other alternately by the connection electrode CCU arranged closer to the side 2-R and by the connection electrode CCU arranged closer to the side 2-L.

The end not connected to the connection electrode CCU among the ends of the paired detection electrodes is connected to each of the signal wirings RLL(0) to RLL(p) arranged along the side 2-R or side 2-L, and is connected to the switching amplification circuit SC-RA or SC-LA via each of the signal wirings RLL(0) to RLL(p). That is, one end TTR1 of the detection electrode RL(0) is connected to the switching amplification circuits SC-LA via the signal wiring RLL(0) arranged along the side 2-L, and the other end TTR2 of the detection electrode RL(1) is connected to the switching amplification circuits SC-LA via the signal wiring RLL(1) arranged along the side 2-L. The one end TTR1 of the detection electrode RL(2) is connected to the switching amplification circuits SC-RA via the signal wiring RLL(2) arranged along the side 2-R, and the other end TTR2 of the detection electrode RL(3) is connected to the switching amplification circuits SC-RA via the signal wiring RLL(3) arranged along the side 2-R.

Hereinafter, similarly, one end TTR1 of the detection electrode RL(4) and the other end TTR2 of the detection electrode RL(5) are connected to the switching amplification circuits SC-LA via the signal wiring RLL(4) and the signal wiring RLL(5), respectively, and the one end TTR1 of the detection electrode RL(p−3) and the other end TTR2 of the detection electrode RL(p−2) are connected to the switching amplification circuits SC-LA via the signal wiring RLL(p−3) and the signal wiring RLL(p−2), respectively. The one end TTR1 of the detection electrode RL(6) and the other end TTR2 of the detection electrode RL(7) are connected to the switching amplification circuits SC-RA via the signal wiring RLL(6) and the signal wiring RLL(7), respectively, and the one end TTR1 of the detection electrode RL(p−1) and the other end TTR2 of the detection electrode RL(p) are connected to the switching amplification circuits SC-RA via the signal wiring RLL(p−1) and the signal wiring RLL(p), respectively.

In this manner, by arranging the signal wirings connecting the detection electrodes to the switching amplification circuits so as to be distributed in the portions close to the side 2-R and the side 2-L, increase in a frame size of the display area 2A can be prevented. According to the second embodiment, in the magnetic field touch detection, the switching amplification circuits SC-LA and SC-RA supply the ground voltage Vs to signal wirings (corresponding to switching signal wirings) indicated by broken lines, i.e., to signal wirings RLL(1), RLL(5), and RLL(p−2) and to signal wirings RLL(3), RLL(8), and RLL(p), respectively. In this manner, when the magnetic field is detected, a current generated by the magnetic field flows from the one end TTR1 to the other end TTR2 of each detection electrode as indicated by arrows in FIG. 25. As a result, at two coils close to each other, currents flowing through the detection electrodes (e.g., detection electrodes RL(1) and RL(2)) arranged close to each other are the same as each other. As a result, directions of currents flowing through detection electrodes arranged close to each other are opposite to each other, so that the magnetic field can be prevented from being weakened.

According to the second embodiment, between the case of magnetic field touch detection and the case of electric field touch detection, the switching amplification circuits SC-LA and SC-RA switch a destination of the connection of the signal wirings indicated by the broken lines. In the magnetic field touch detection and electric field touch detection, the switching amplification circuits SC-LA and SC-RA amplify a signal change at each of signal wirings (corresponding to detection signal wirings) indicated by continuous lines, and output the amplified signal change as the detection signal Rx.

<<Configuration of Switching Amplification Circuit>>

Figure 26:
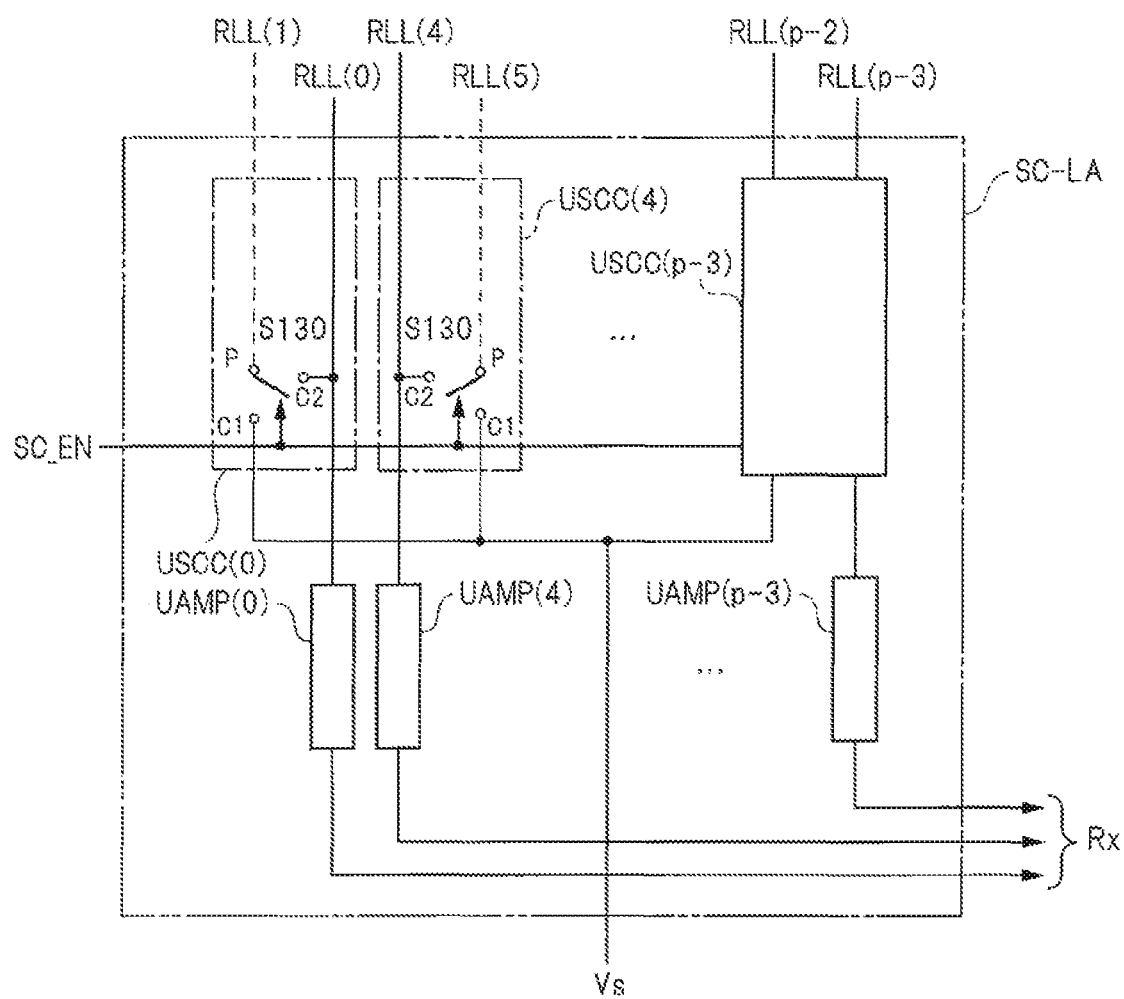
FIG. 26 is a circuit diagram showing a configuration of a switching amplification circuit in the display apparatus according to the second embodiment.

FIG. 26 is a circuit diagram of a configuration of the switching amplification circuit according to the second embodiment. The switching amplification circuits SC-LA and SC-RA shown in FIG. 25 have the same configuration as each other. Therefore, the configuration of the switching amplification circuit SC-LA is shown in FIG. 26.

The switching amplification circuit SC-LA has a plurality of unit switching circuits USCC and a plurality of unit amplifying circuits UAMP. The unit switching circuit USCC has one-to-one relation with the paired detection electrode, and the unit amplifying circuit UAMP also has one-to-one relation with the paired detection electrode. In the description while exemplifying FIG. 26, the switching amplification circuit SC-LA has a unit switching circuit USCC(0) corresponding to the paired detection electrodes RL(0) and RL(1), a unit switching circuit USCC(4) corresponding to the paired detection electrodes RL(4) and RL(5), and a unit switching circuit USCC(p−3) corresponding to the paired detection electrodes RL(p−2) and RL(p−3). Also, the switching amplification circuit SC-LA has a unit amplification circuit UAMP(0) corresponding to the paired detection electrodes RL(0) and RL(1), a unit amplification circuit UAMP(4) corresponding to the paired detection electrodes RL(4) and RL(5), and a unit amplification circuit UAMP(p−3) corresponding to the paired detection electrodes RL(p−2) and RL(p−3).

The unit switching circuits USCC(0), USCC(4), and USCC(p−3) have the same configuration with each other, and therefore, FIG. 26 shows configurations of the unit switching circuits USCC(0) and USCC(4) as an example.

Also, the unit amplifying circuits UAMP(0), UAMP(4), and UAMP(p−3) have the same configuration with each other. Each of the unit amplifying circuits UAMP(0), UAMP(4), and UAMP(p−3) is formed of, for example, the integration circuit (having the reset switch RB, the integration capacitor CSS, and the operational amplifier OP) shown in FIG. 11.

Each of the unit switching circuits USCC(0) and USCC(4) includes a single-pole double-throw switch (which may hereinafter be called "fourteenth switch") S130 having a common terminal P, a first terminal C1, and a second terminal C2. The fourteenth switch S130 connects the common terminal P to the first terminal C1 or to the second terminal C2 in accordance with the level of the magnetic-field enable signal SC_EN. That is, when the magnetic-field enable signal SC_EN is at the high level, the common terminal is connected to the first terminal C1 at the fourteenth switch S130. When the magnetic-field enable signal SC_EN is at the low level, the common terminal P is connected to the second terminal C2.

The unit switching circuit USCC(0) is connected to the corresponding detection electrodes RL(0) and RL(1) via the signal wirings RLL(0) and RLL(1). In the unit switching circuit USCC(0), the detection electrode RL(1) is connected to the common terminal P of the fourteenth switch via the signal wiring RLL(1), while the detection electrode RL(0) is connected to the second terminal C2 of the fourteenth switch S130 via the signal wiring RLL(0).

The unit switching circuit USCC(4) is connected to the corresponding detection electrodes RL(4) and RL(5) via the signal wirings RLL(4) and RLL(5). In the unit switching circuit USCC(4), the detection electrode RL(5) is connected to the common terminal P of the fourteenth switch via the signal wiring RLL(5), while the detection electrode RL(4) is connected to the second terminal C2 of the fourteenth switch S130 via the signal wiring RLL(4).

Hereinafter, similarly, the corresponding paired detection electrodes (e.g., detection electrodes RL(p−2) and RL(p−3)) are connected to the common terminal P and the second terminal C2 of the fourteenth switch S130 in the unit switching circuit (e.g., USCC(p−3)). The ground voltage Vs is supplied to the first terminal C1 of the fourteenth switch S130 in each of the unit switching circuits USCC(0), USCC(4), and USCC(p−3).

The signal wirings RLL(0), RLL(4), and RLL(p−3) connected to the detection electrodes RL(0), RL(4), and RL(p−3) are connected to respective input terminals of the unit amplifying circuits UAMP(0), UAMP(4), and UAMP(p−3) corresponding to the signal wirings RLL(0), RLL(4), and RLL(p−3). In other words, the one ends TTR1 of the detection electrodes RL(0), RL(4), and RL(p−3) are connected to the input terminals of the corresponding unit amplifying circuits, respectively.

AS similar to the switching amplification circuit SC-LA, the switching amplification circuit SC-RA also has a plurality of unit switching circuits and a plurality of unit amplifying circuits, and is connected to the corresponding detection electrodes via signal wirings.

<<Operation of Switching Amplification Circuit>>

Next, the operation of the switching amplification circuit will be described with reference to FIGS. 25 and 26. The operation in the magnetic field touch detection will be described first.

In the magnetic field touch detection, the magnetic-field enable signal SC_EN is set at the high level. In this manner, in the fourteenth switches S130 of FIG. 26, the common terminal P is connected to the first terminal C1. As a result, the ground voltage Vs is supplied to the signal wirings RLL(1), RLL(5), and RLL(p−2) and RLL(3), RLL(7), and RLL(p) indicate by the broken lines, i.e., switching signal wirings, via the fourteenth switches S130.

The detection electrodes arranged in parallel with each other are connected to each other by the connection electrode CCU, and therefore, a coil is formed by the detection electrodes arranged in parallel with each other. The ground voltage Vs is supplied to the one end (connected to the switching signal wiring) of the formed coil via the fourteenth switch S130. Therefore, when the magnetic field is applied from the pen, a signal change is caused at the other end (connected to the detection signal wiring) of the coil in accordance with the magnetic field on the basis of the ground voltage Vs which is a reference voltage. The signal change caused at the other end of the coil is transmitted to each of the unit amplifying circuits UAMP(0), UAMP(4), and UAMP(p−3) via each of the signal wirings RLL(0), RLL(4), and RLL(p−3), which are the detection wirings, is amplified, and is supplied to the detection circuit DEX as the detection signal Rx (FIG. 19). In this manner, the presence/absence of the pen and/or the handwriting pressure can be detected. That is, the coil formed of the detection electrodes operates as a magnetic field detection coil that detects the magnetic field from the pen, so that the pen is detected.

In electric field touch detection, the magnetic-field enable signal SC_EN is set at the low level. In this manner, in the fourteenth switches S130 of FIG. 26, the common terminal P is connected to the second terminal C2. As a result, the paired detection electrodes are electrically connected to each other in the switching amplification circuit SC-LA or switching amplification circuit SC-RA, and are put in a floating state. As described above with reference to FIGS. 22 to 24, in electric field touch detection, the electric field drive signal is supplied to a selected drive electrode. An electric field between the selected drive electrode and the detection electrodes in the floating state is changed by the presence of the finger. This change in the electric field is transmitted to each of the unit amplifying circuits UAMP(0), UAMP(4), and UAMP(p−3) via each of the signal wirings RLL(0), RLL(4), and RLL(p−3), which are the detection signal wirings, is amplified, and is supplied to the detection circuit DEX as the detection signal Rx (FIG. 19). In this manner, the touch by the finger is detected. According to the second embodiment, the coil formed of the detection electrodes can be regarded as functioning as the detection electrode coil in electric field touch detection.

<<Structure of Drive Electrode>>

Figure 27:
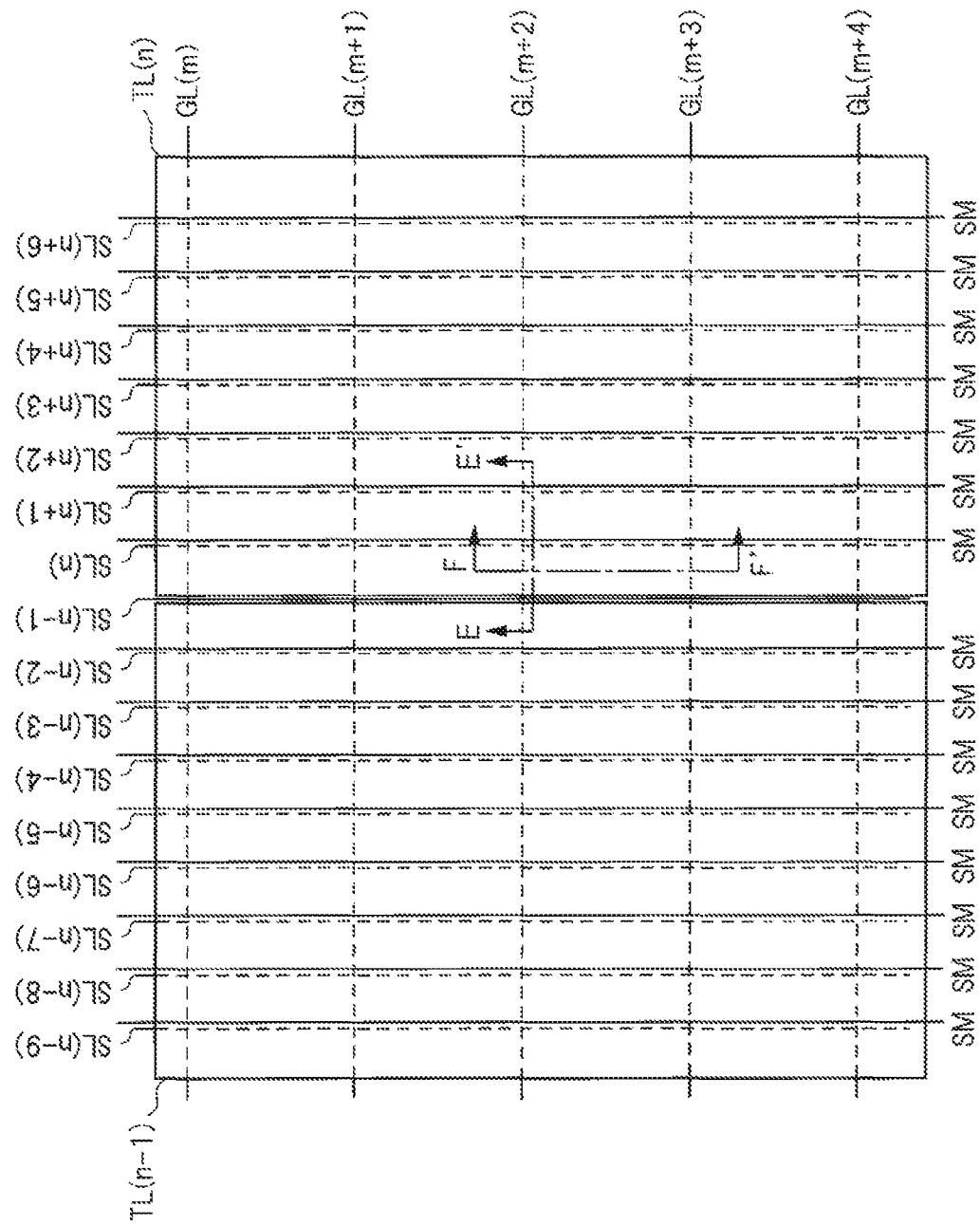
FIG. 27 is a plan view showing a configuration of the display apparatus according to the second embodiment.

FIG. 27 is a plan view of the liquid crystal display apparatus 1 according to the second embodiment. FIG. 28 shows cross-sectional views of the liquid crystal display apparatus 1 according to the second embodiment. FIG. 27 partially shows an area including the drive electrode TL(n) in the display area 2A. A cross section of an area indicated by a single-dot chain line E-E' in FIG. 27 is shown in FIG. 28A, and a cross section of an area indicated by a single-dot chain line F-F' in FIG. 27 is shown in FIG. 28B. An example of the structures of the drive electrodes, signal lines, scanning lines, and detection electrodes will be described with reference to FIGS. 27 and 28.

FIG. 27 partially shows the drive electrode TL(n) and the drive electrode TL(n−1) arranged close to the drive electrode TL(n). When seen in a plan view, the drive electrodes TL(n) and TL(n−1) are arranged so as to extend in the column direction (vertical direction) and so as to be in parallel with each other in the row direction (horizontal direction).

When seen in a plan view, a plurality of auxiliary electrodes SM extend in parallel with the drive electrodes TL(n)

and TL(n−1). In this drawing, seven auxiliary electrodes SM extend in parallel with the drive electrodes TL(n), and are electrically connected to the drive electrodes TL(n). And, eight auxiliary electrodes SM extend in parallel with the drive electrodes TL(n−1), and are electrically connected to the drive electrodes TL(n−1). When seen in a plan view, the scanning lines GL(m) to GL(m+4) extend so as to intersect with the drive electrodes TL(n) and TL(n−1). When seen in a plan view, a plurality of signal lines SL(n−9) to SL(n+6) are arranged so as to extend in the column direction and be in parallel with each other in the row direction to be in parallel with the drive electrodes TL(n) and TL(n−1).

In FIG. 28A, the first conductive layer 701 is formed on the first main surface TSF1 of the TFT glass substrate TGB (FIG. 7), and the scanning line GL(m+2)is formed by this first conductive layer 701. The insulating layer 702 such as silicon nitride is formed on the scanning line GL(m+2), and the second conductive layer 703 (FIG. 7) is formed on the insulating layer 702. By this second conductive layer 703, the signal lines SL(n−1) to SL(n+1) are formed.

On the signal lines SL(n−1) to SL(n+1), the insulating layer 704 made of an interlayer resin and an insulating layer such as silicon nitride is formed. On the insulating layer 704, the third conductive layer 705 (FIG. 7) is formed. By this third conductive layer 705, the drive electrode TL(n) and the auxiliary electrodes SM are formed. Here, as similar to the first embodiment, the drive electrode TL(n) is formed of a transparent electrode with high transmittance made of, for example, ITO, and the auxiliary electrode SM is formed of, for example, a low-resistance conductive layer made of, for example, aluminum (Al).

The insulating layer 706 (FIG. 7) such as silicon nitride is formed on the drive electrode TL(n), and a pixel electrode LDP is formed on the insulating layer 706. This pixel electrode LDP is also formed of a transparent electrode. Between the pixel electrode LDP and the second main surface CSF2 of the CF glass substrate CGB, the liquid crystal layer 707 is sandwiched. The detection electrode is formed on the first main surface CSF1 of the CF glass substrate CGB, and the color filter (not shown) is formed on the first main surface CSF2.

The detection electrodes are omitted in FIG. 27. However, according to the second embodiment, when seen in a plan view of FIG. 27, the plurality of detection electrodes extend in the row direction (horizontal direction) and are in parallel with each other in the column direction (vertical direction) so that the detection electrodes intersect with the signal lines SL(n−9) to SL(n+6) and with the drive electrodes TL(n) and TL(n−1) and are in parallel with the scanning lines GL(m) to GL(m+4). FIG. 28A shows the detection electrode RL(n) as an example.

FIG. 28B shows the cross section of the area indicated by the single-dot chain line F-F' intersecting with the single-dot chain line E-E' in FIG. 27, and therefore, FIG. 28B shows the scanning lines GL(m+3) and GL(m+2) formed of the first conductive layer 701 (FIG. 7). FIG. 28B also shows the drive electrode TL(n), which is formed of the third conductive layer 705, and the pixel electrode LDP. Note that the auxiliary electrode SM does not exist in the area indicated by the single-dot chain line F-F' as shown in FIG. 27, and therefore, FIG. 28B shows no auxiliary electrode SM. FIG. 28B further shows the detection electrodes RL(n−3) to RL(n+2) formed on the first main surface CSF1 of the CF glass substrate CGB arranged opposite to the TFT glass substrate TGB across the liquid crystal layer 707.

When seen in a plan view, the scanning lines/signal lines and drive electrodes overlap so that they intersect with one another as shown in FIG. 27. However, as shown in FIG. 28, the scanning lines/signal lines and drive electrodes overlap each other via the insulating layer and are electrically isolated from each other. The detection electrodes, which are omitted from FIG. 27, overlap the drive electrodes when seen in a plan view. However, as shown in FIG. 28, the detection electrodes overlap the drive electrodes via the insulating layer, and are electrically isolated from the drive electrodes.

<<Operation in Magnetic Field Touch Detection>>

FIG. 29 is a timing chart showing operations of the display apparatus 1 of the second embodiment. In FIG. 29, the horizontal axis represents time. FIG. 29A shows a periodically generated frame signal. The display apparatus 1 displays, for example, an image for one screen in one frame period F set by the frame signal. According to the second embodiment, the control circuit D-CNT shown in FIG. 19 performs control so that a plurality of display periods and a plurality of touch detection periods are generated alternately in one frame period F. Each of FIGS. 29B to 29G shows timing in one frame period F among a plurality of frame periods F. That is, the timing shown in each of FIG. 29B to 29G is generated in each of the plurality of frame periods F.

Here, FIG. 29B schematically shows display periods and touch detection periods generated in one frame period F. FIG. 29C shows the waveforms of the selection signals SEL1 and SEL2 supplied to the signal line selector 3A (FIG. 29). FIG. 29D shows the waveform of the magnetic-field enable signal SC_EN. FIGS. 29E and 29F show respective waveforms of the selection signals SN(0) and SN(1) among selection signals from the detection control circuit SX. FIG. 29G shows the waveform of the coil clock signal CLK. In FIG. 29, the selection signals SN(0) and SN(1) are shown as examples of the selection signals output from the detection control circuit SX. However, the same goes for arbitral selection signals SN(n−1) and SN(n) output from the detection control circuit SX.

As shown in FIG. 29B, the control circuit D-CNT performs control so that display periods "Display" and touch detection periods "Sense1 (Sense2)" are generated alternately in time series in each frame period F. FIG. 29 shows a case in which magnetic field touch detection is specified as touch detection.

In the display period Display, an image signal Sn is supplied from the signal line driver D-DRV (FIG. 19) to the signal line selector 3A so that the selection signals SEL1 and SEL2 are alternately set to the high level, the image signal is supplied to a proper signal line. In FIG. 29C, note that the selection signals SEL1 and SEL2 are shown as a single waveform in order to clearly indicate changes in the selection signals SEL1 and SEL2.

In the display period Display, the high-level display control signal DP_EN is supplied from the control circuit D-CNT to the switching drive circuit SC-DA. At this time, the low-level inverted display control signal /DP_EN is supplied from the control circuit D-CNT to the switching circuit SC-UA1 and to the signal line selector 3A. In this manner, the drive electrodes are electrically disconnected from the signal lines. At this time, the twelfth switches S110 and S111 in the switching drive circuit SC-DA are switched on by the high-level display control signal DP_EN, and therefore, the predetermined voltage VCOMDC is to the drive electrodes supplied as a display drive signal. The gate driver 5 (FIG. 19) is controlled so that a proper scanning signal is supplied from the gate driver 5 to the scanning lines GL(0) to GL(p). In this manner, in the display period Display, an image corresponding to the image signal Sn is displayed on the display panel 2A (FIG. 19).

As shown in FIG. 29D, the control circuit D-CNT sets the magnetic-field enable signal SC_EN to the high level in the touch detection period Sense1 (Sense2). In this manner, the detection control circuit SX sets the selection signals to the high level from SN(0) to SN(p) in this order. FIG. 29 shows a state in which the selection signal SN(0) is set at the high level in the touch detection period Sense1 and the selection signal SN(1) is set at the high level in the next touch detection period Sense2.

The touch detection period Sense1 (Sense2) has a magnetic field generating period TCG in which a magnetic field is generated by a magnetic field generating coil, and a magnetic field detection period TDT that follows the magnetic field generating period TCG. In the magnetic field detection period TDT, the magnetic field is detected by using a coil different from the magnetic field generating coil. That is, in the magnetic field generating period TCG, a magnetic field is generated by a magnetic field generating coil formed of drive electrodes, and a magnetic field energy is supplied to the pen. In the magnetic field detection period TDT, a magnetic field generated by the pen is detected by a magnetic field detection coil formed of detection electrodes. In the magnetic field generating period TCG, the control circuit D-CNT supplies the coil clock signal CLK to the signal wiring Lc as shown in FIG. 29G.

Since the magnetic-field enable signal SC_EN is set at the high level, a plurality of magnetic field generating coils are formed by using the drive electrodes TL(0) to TL(p) formed on the TFT glass substrate TGB, as described above with reference to FIGS. 21 to 23. For example, as described above with reference to FIGS. 22 and 23, one magnetic field generating coil is formed by using the drive electrodes TL(0), TL(1), TL(3), and TL(4), and one magnetic field generating coil is formed by using the drive electrodes TL(5), TL(6), TL(8), and TL(9).

Since the selection signal SN(0) is set at the high level, the coil clock signal CLK is supplied from the signal wiring Lc to the magnetic field generating coil corresponding to the selection signal SN(0) as a magnetic field drive signal as described above with reference to FIG. 23. As a result, the magnetic field generating coil formed of the drive electrodes TL(0), TL(1), TL(3), and TL(4) generates a magnetic field that changes in accordance with changes in the coil clock signal CLK.

In the magnetic field generating period TCG, if the pen is present (FIG. 1) in vicinity of the magnetic field generating coil formed of the drive electrodes TL(0), TL(1), TL(3), and TL(4), the magnetic field generating coil and the pen internal coil L1 are magnetically coupled to each other. In this manner, the capacitive element C in the pen is charged. On the other hand, at this time, the pen is not present in vicinity of the magnetic field generating coil, the magnetic field generating coil and the pen internal coil L1 are not coupled through magnetic fields, and therefore, the capacitive element C is not charged.

Since the magnetic-field enable signal SC_EN is set at the high level, the common terminal P is connected to the first terminal C1 at the fourteenth switch S130 of each of the unit switching circuits USCC(0) to USCC(p), as described above with reference to FIGS. 25 and 26. As a result, the ground voltage Vs is supplied to the one end of each of a plurality of coils formed of the paired detection electrodes (e.g., detection electrodes RL(0) and RL(1) and detection electrodes RL(2) and RL(3) shown in FIG. 25) via the fourteenth switches S130.

The coil clock signal CLK is stopped to shift the period from the magnetic field generating period TCG to the magnetic field detection period TDT. If the capacitive element C is charged in the magnetic field generating period TCG before the shift, the pen internal coil L1 generates a magnetic field in the magnetic field detection period TDT in accordance with electric charges charged on the capacitive element C. If the pen internal coil L1 is close to a magnetic field detection coil formed of detection electrodes, a magnetic field is generated between the coil L1 and the magnetic field detection coil. In this manner, in accordance with change in the magnetic field generated by the pen internal coil L1, a signal change is generated at the magnetic field detection coil to which the pen is close among the plurality of magnetic field detection coils, is amplified by each of the unit amplifying circuits UAMP(0) to UAMP(p), and is supplied to the detection circuit DET as the detection signal Rx.

In the magnetic field detection period TDT, note that the control circuit D-CNT puts the signal wiring Lc in, for example, a high-impedance state.

Next, the control circuit D-CNT sets the magnetic-field enable signal SC_EN to the low level to perform a display operation in the display period Display. After the display period Display, the control circuit D-CNT sets the magnetic-field enable signal SC_EN to the high level again. In the display period Display, note that the detection control circuit SX sets the selection signal SN(0) to SN(p) to the low level.

Since the magnetic-field enable signal SC_EN is set at the high level, a plurality of magnetic field generating coils are formed by using drive electrodes as similar to the touch detection period Sense1. At this time, the detection control circuit SX keeps the selection signal SN(0) at the low level, and changes the level of the selection signal SN(1) from the low level to the high level. As a result, the coil clock signal CLK is supplied to the magnetic field generating coil formed of the drive electrodes TL(5), TL(6), TL(8), and TL(9) that corresponds to the selection signal SN(1). That is, as shown in FIG. 23, the thirteenth switch S121 is switched on to connect the drive electrode TL(9) to the signal wiring Lc, and the control circuit D-CNT supplies the coil clock signal CLK to the signal wiring Lc.

As a result, in the magnetic field generating period TCG of the touch detection period Sense2, a magnetic field is generated by the magnetic field generating coil formed of the drive electrodes TL(5), TL(6), TL(8), and TL(9). An operation in the magnetic field detection period TDT following this magnetic field generating period TCG is the same as the operation in the magnetic field detection period TDT in the touch detection period Sense1.

In this manner, during one frame period F, the display operation and the magnetic field touch detection are alternately executed. In this case, in the magnetic field generating period TCG in one frame period F, the selection signals are set to the high level sequentially from SN(0) to SN(p), and therefore, it is detected whether the touch by the pen is performed or not from an area closer to the side 2-U of the display area 2A toward an area closer to the side 2-D.

As shown in FIG. 29C, note that the control circuit D-CNT sets both selection signals SEL1 and SEL2 to the high level in the touch detection period Sense1 (Sense2). As a result, in the touch detection period, the plurality of signal lines are electrically connected to the drive electrodes in an area closer to the side 2-U of the display area 2A and an area closer to the side 2-D of the same, so that the combined resistance of the drive electrodes is reduced.

When electric field touch detection is executed as touch detection in place of magnetic field touch detection, the magnetic-field enable signal SC_EN is set to the low level in the touch detection period Sense1 (Sense2). And, in the touch detection period Sense1 (Sense2), the control signal TSV, whose voltage changes periodically, is supplied in place of the coil clock signal CLK, from the control circuit D-CNT to the signal wiring Lc. As a result, as described above with reference to FIG. 23, a selected drive electrode (e.g., drive electrode TL(4)) among the drive electrodes is in the floating state, and the control signal TSV is supplied to the selected drive electrode as an electric field drive signal. Also in the touch detection period Sense2, a selected drive electrode (e.g., drive electrode TL(9)) is in the floating state, and the control signal TSV is supplied to the selected drive electrode.

In the case of electric field touch detection, the common terminal P is connected to the second terminal C2 at the fourteenth switch S130 as described above with reference to FIG. 26. Therefore, the paired detection electrodes (e.g., detection electrodes RL(0) and RL(1) and detection electrodes RL(2) and RL(3) shown in FIG. 25) are put in a floating state. Thus, in the touch detection period Sense1, a change in an electric field between the selected drive electrode TL(0) and each of the paired detection electrodes (detection electrodes RL(0) and RL(1) and detection electrodes RL(2) and RL(3), etc.) is amplified by the amplifying circuit AMP and is supplied to the detection circuit DET as the detection signal Rx. Similarly, in the touch detection period Sense2, a change in an electric field between the selected drive electrode TL(1) and each of the paired detection electrodes (detection electrodes RL(0) and RL(1) and detection electrodes RL(2) and RL(3), etc.) is amplified by the amplifying circuit AMP and is supplied to the detection circuit DET as the detection signal Rx. As described above with reference to FIG. 4, the electric field changes in accordance with the touch/untouch by the finger, and therefore, the detection circuit DET can detect the touch by the finger.

Figure 30A:
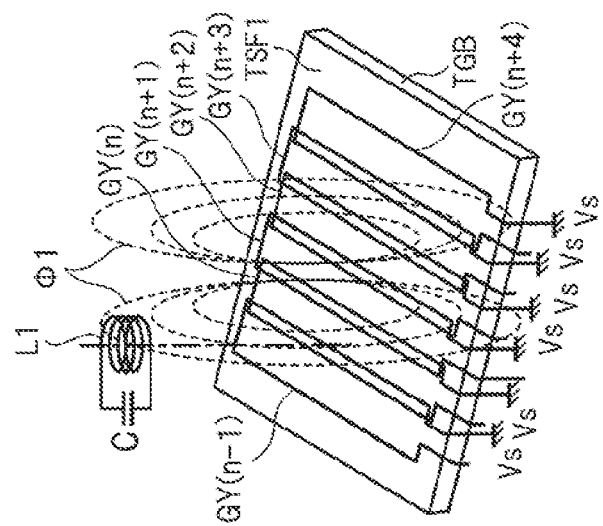
FIGS. 30A to 30C are explanatory diagrams each explaining magnetic field touch detection according to the second embodiment.
Figure 30B:
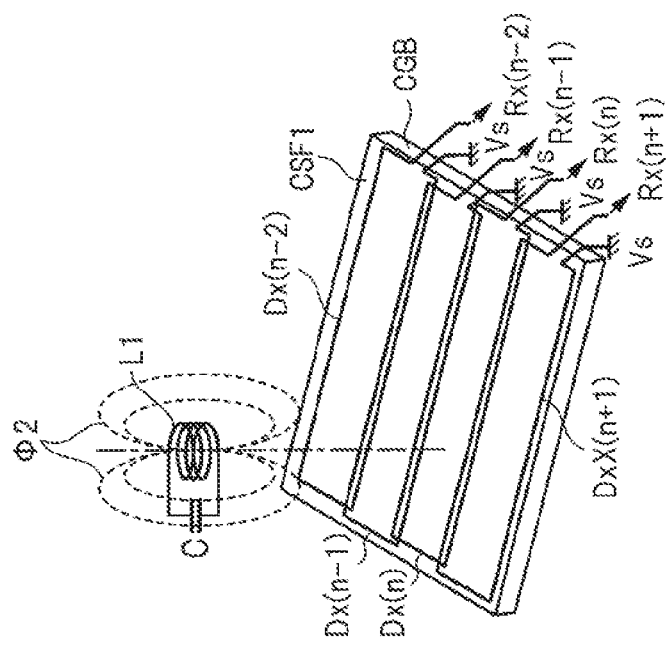
Figure 30C:
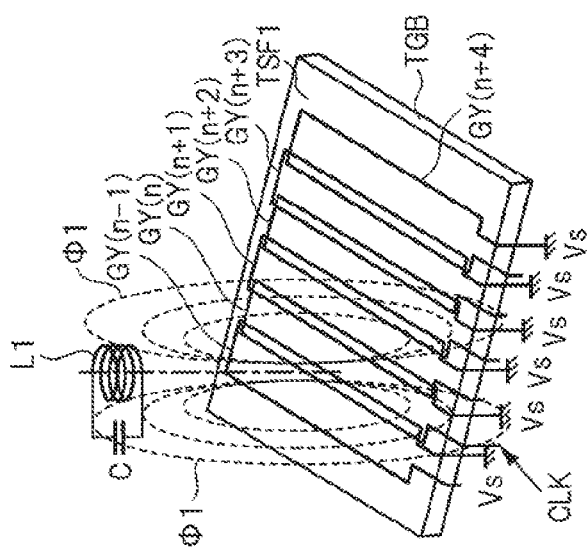

FIG. 30 show explanatory diagrams schematically showing operations in the magnetic field touch detection according to the second embodiment. FIGS. 30A and 30C show an operation in the magnetic field generating period TCG, and FIG. 30B shows an operation in the magnetic field detection period TDT.

In FIGS. 30A and 30C, each of reference characters GY(n−1) to GY(n+4) indicates the magnetic field generating coil formed of the drive electrodes on the first main surface TSF1 of the TFT glass substrate TGB. In FIG. 30B, each of reference characters DY(n−2) to DX(n+1) indicates the magnetic field detection coil formed of the detection electrodes on the first main surface CSF1 of the CF glass substrate CGB. In FIG. 30, a reference character L1 indicates the pen internal coil, a reference character C indicates the capacitive element in the pen, and the coil L1 and the capacitive element C are connected in parallel to form a resonance circuit.

In FIGS. 30A to 30C, for generalized description, the magnetic field generating coils and magnetic field detection coils are denoted by reference characters on the basis of the "n-th" coil. Hereinafter, the explanation will be made on the assumption that the magnetic field generating coil GY(n) in FIG. 30 corresponds to the magnetic field generating coil formed of the drive electrodes TL(0), TL(1), TL(3), and TL(4), and so that the magnetic field generating coil GY(n+1) corresponds to the magnetic field generating coil formed of the drive electrodes TL(5), TL(6), TL(8), and TL(9). The explanation will be made on the assumption that the magnetic field detection coil DX(n) in FIG. 30 corresponds to the magnetic field detection coil formed of the detection electrodes RL(0) and RL(1).

FIG. 30A shows the magnetic field generating period TCG of the touch detection period Sense1 of FIG. 29, FIG. 30B shows the magnetic field detection period TDT of the touch detection period Sense1, and FIG. 30C shows the magnetic field generating period TCG of the touch detection period Sense2.

In the magnetic field generating period TCG, the ground voltage Vs is supplied to one end of each of the magnetic field generating coils GY(n−1) to GY(n+4) formed of the drive electrodes. The coil clock signal CLK is supplied to the other end of the magnetic field generating coil GY(n) having the corresponding selection signal at the high level, out of the magnetic field generating coils GY(n−1) to GY(n+4). The magnetic field generating coil GY(n) is formed of the drive electrodes TL(0), TL(1), TL(3), and TL(4), and therefore, the drive electrode TL(2) sandwiched between these drive electrodes is the center of the magnetic field generating coil GY(n). Therefore, the magnetic field generating coil GY(n) generates a magnetic field that becomes the strongest at the drive electrode TL(2) in accordance with the changes in the coil clock signal CLK. FIG. 30A shows lines of magnetic force generated by the magnetic field generating coil GY(n) as "ϕ1".

FIG. 30A shows a state in which the coil L1 is close to the magnetic field generating coil GY(n). As an example, a case in which the center of the coil is aligned with the center of the magnetic field generating coil GY(n) (single-dot chain lines indicate the axis of the coil L1 in FIG. 30). Since the coil L1 and the magnetic field generating coil GY(n) are close to each other, the coil L1 and the magnetic field generating coil GY(n) are magnetically coupled to each other, so that the capacitive element C is charged.

By the electric charges charged on the capacitive element C, the coil L1 generates a magnetic field as shown in FIG. 30B. In this case, lines of magnetic force generated by the coil L1 are shown as "ϕ2" in FIG. 30B. In this example, a state in which the coil L1 is close to the magnetic field detection coil DX(n) is shown, and the coil L1 and the magnetic field detection coil DX(n) are magnetically coupled to each other.

As described above with reference to FIGS. 26 and 29, in the magnetic field detection period TDT, the ground voltage Vs is supplied to each one end of the magnetic field detection coils DX(n−2) to DX(n+1) are supplied with. As a result, a signal change on the basis of the ground voltage Vs as the reference occurs at the other end of the magnetic field detection coil DX(n), and is output from the switching amplification circuits SC-RA and SC-LA as the detection signal Rx. In this manner, it is detected that the pen is in close to the magnetic field detection coil DX(n).

In the next touch detection period Sense2, the selection signal corresponding to the magnetic field generating coil GY(n+1) arranged close to the magnetic field generating coil GY(n) is set at the high level, and the coil clock signal CLK is supplied to the other end of the magnetic field generating coil GY(n+1) as shown in FIG. 30C. As a result, in the magnetic field generating period TCG of the touch detection period Sense2, the magnetic field generating coil GY(n+1) generates a magnetic field in accordance with the coil clock signal CLK. In the case of FIG. 30C, the state in which the pen is close to the magnetic field generating coil GY(n) is kept. Therefore, no magnetic field coupling or weak magnetic field coupling occurs between the coil L1 and the magnetic field generating coil GY(n+1). As a result, the capacitive element C is not charged at all or charged with few electric charges.

Next, in the magnetic field detection period TDT of the touch detection period Sense2, the same magnetic field detection as shown in FIG. 30B is executed. In this case, since the capacitive element C is not charged at all or charged with few electric charges, a signal change is not caused or the caused signal change is small at the other end of the magnetic field detection coil DX(n). By determining the detection signal Rx(n) at this time, it can be detected that the pen is not close to the magnetic field generating coil GY(n+1) or distant from the magnetic field generating coil GY(n+1).

In the magnetic field touch detection, a magnetic field is generated by a magnetic field generating coil formed of drive electrodes, and a magnetic field from the pen is detected by a magnetic field detection coil formed of detection electrodes detects. That is, the coil that generates the magnetic field is different from the coil that detects the magnetic field. Therefore, the operation for detecting the magnetic field from the pen can be started even if the magnetic field generating coil transiently changes after the magnetic field drive signal (coil clock signal CLK) stops. In this manner, the delay of the detection can be prevented. The magnetic field detection can be started when the amount of the electric charge charged in the capacitive element C is relatively large, and therefore, the detection accuracy can be improved.

(Third Embodiment)

According to the first and second embodiments, the drive electrodes TL formed on the TFT glass substrate TGB and the detection electrodes RL formed on the CF glass substrate CGB are used in both cases of electric field touch detection and magnetic field touch detection. That is, the drive electrodes TL are used for magnetic field generation and electric field generation, while the detection electrodes RL are used for magnetic field detection and electric field detection. On the other hand, according to a third embodiment, the drive electrodes (first wirings) TL are used for magnetic field generation and electric field generation, the signal lines (second wirings) SL are used for magnetic field detection, and the detection electrodes (third wirings) RL are used for electric field detection.

The configuration of the display apparatus 1 of the third embodiment is similar to the configuration of the display apparatus 1 of the first embodiment shown in FIG. 5. That is, in FIG. 5, the third embodiment is different from the first embodiment in the configuration of the switching amplification circuit SC-D&.

Figure 31:
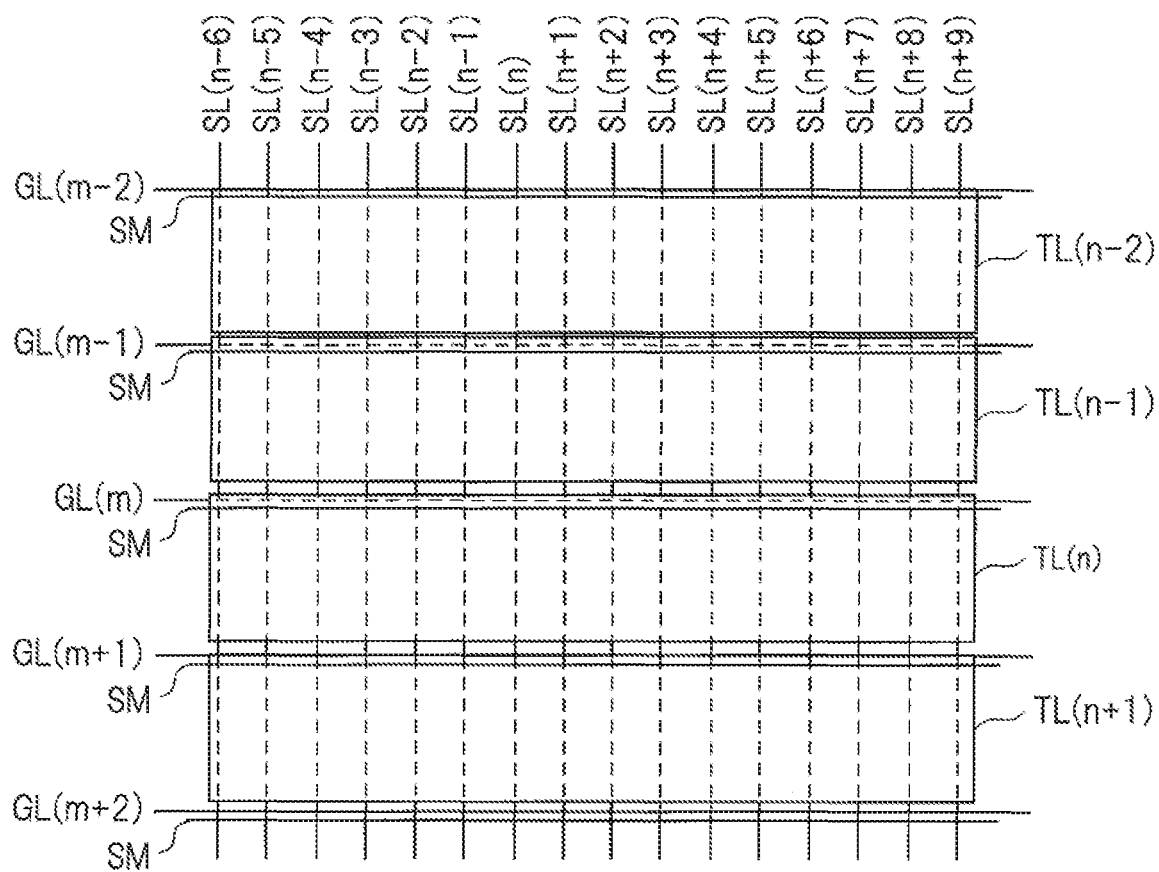
FIG. 31 is a plan view showing a configuration of a display apparatus according to a third embodiment.

FIG. 31 is a plan view of a configuration of the display apparatus 1 according to the third embodiment. FIG. 31 shows the plane of the display area 2. In FIG. 31, reference characters TL(n−2) to TL(n+1) indicate drive electrodes arranged so as to extend in the row direction (horizontal direction) and to be in parallel with each other in the column direction (vertical direction). And, reference characters GL(m−2) to GL(m+2) indicate scanning lines, reference characters SL(n−6) to SL(n+9) indicate signal lines arranged so as to intersect with the drive electrodes TL(n−2) to TL(n+1). Further, a reference character SM indicates an auxiliary electrode connected to the drive electrodes TL(n−2) to TL(n+1).

The drive electrodes TL(n−2) to TL(n+1) of FIG. 31 are connected to the first switch S10 and second switch S11 in vicinity of the side 2-R of the display area 2, as shown in FIGS. 9 and 10. The end (node TT2) of the drive electrode TL(n+1) is connected to the signal wiring Lc via the third switch S21 and to the signal wiring Lv via the fourth switch S31. The end (node TT1) of the drive electrode TL(n−2) is connected to the signal wiring Ls via the fifth switch S41.

As described above with reference to FIG. 9, in the magnetic field touch detection, the coil is formed of the drive electrodes TL(n−2) to TL(n+1). When the selection signal ST10 is set at the high level, the coil clock signal CLK is supplied to the node TT2, and the ground voltage Vs is supplied to to the node TT1. In this manner, a magnetic field is generated by the coil formed of these drive electrodes. As described above with reference to FIG. 10, in electric field touch detection, the fourth switch S31 is switched off so that the control signal TSV is supplied to the node TT2. As a result, the drive electrode TL(n+1) generates an electric field in accordance with the control signal TSV.

Figure 32:
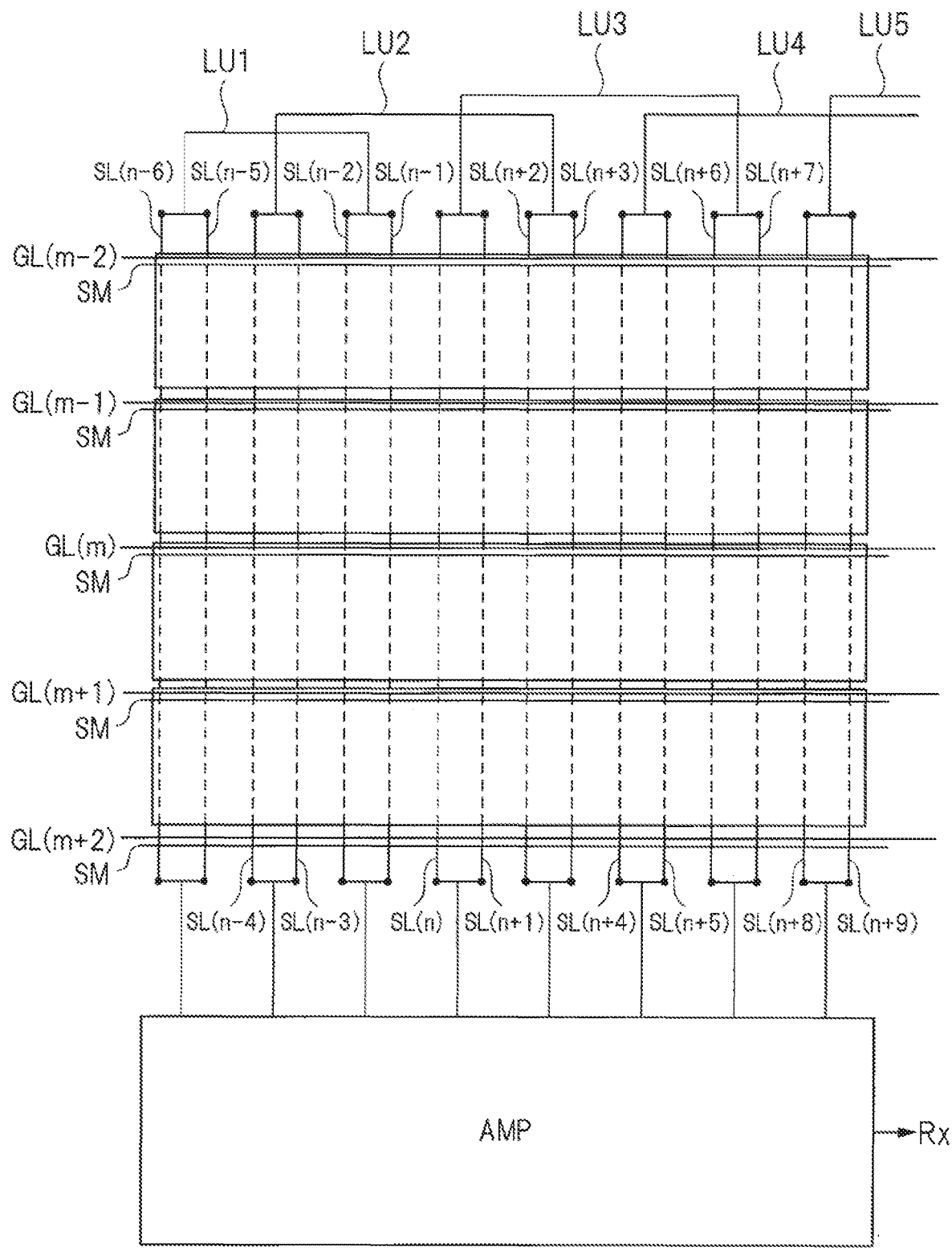
FIG. 32 is a plan view showing arrangement of a signal line in the display apparatus according to the third embodiment.

FIG. 32 shows a state of the signal lines in the magnetic field touch detection. In the display period, the signal lines SL(n−6) to SL(n+9) are separated from each other. In the magnetic field touch detection, two signal lines adjacent to each other are connected. That is, in an area closer to the side 2-D of the display area 2 (FIG. 5), a switch is connected between two signal lines adjacent to each other, and the two signal lines are connected to each other via this switch in the magnetic field touch detection by the magnetic-field enable signal SC_EN. And, in an area closer to the side 2-U of the display area 2 (FIG. 5), a switch is connected between two signal lines adjacent to each other, and the two signal lines are connected to each other via this switch in the magnetic field touch detection by the magnetic-field enable signal SC_EN.

FIG. 32 shows a state in the magnetic field touch detection in which the signal lines SL(n−6) and SL(n−5) are connected, the signal lines SL(n−4) and SL(n−3) are connected, and the signal lines SL(n−2) and SL(n−1) are connected. Similarly, FIG. 32 shows a state in which the signal lines SL(n) and SL(n+1) are connected, the signal lines SL(n+2) and SL(n+3) are connected, the signal lines SL(n+4) and SL(n+5) are connected, the signal lines SL(n+6) and SL(n+7) are connected, and the signal lines SL(n+8) and SL(n+9) are connected.

In order to form the magnetic field detection coils from the signal lines, signal wirings UL1 to LU5 are arranged in an area closer to the side 2-U, so that predetermined signal lines are connected to each other by the signal wirings UL1 to LU5. In FIG. 32, the signal lines SL(n−6) and SL(n−5) are connected to the signal lines SL(n−2) and SL(n−1) by the signal wiring LU1 in vicinity of the side 2-U, and the signal lines SL(n−4) and SL(n−3) are connected to the signal lines SL(n+2) and SL(n+3) by the signal wiring LU2 in vicinity of the side 2-U. And, the signal lines SL(n) and SL(n+1) are connected to the signal lines SL(n+6) and SL(n+7) by the signal wiring LU3 in vicinity of the side 2-U, and the signal lines SL(n+4) and SL(n+5) are connected to the signal lines not shown by the signal wiring LU4 in vicinity of the side 2-U. Further, the signal lines SL(n+8) and SL(n+9) are connected to the signal lines not shown by the signal wiring LU5 in vicinity of the side 2-U. Note that switches which are controlled to be switched on and off by the magnetic-field enable signal SC_EN are provided between the signal wirings U1 to U5 and the signal line, and the signal wirings U1 to U5 are connected to the signal line only in the magnetic field touch detection.

The interconnected signal lines are connected to the amplifying circuit AMP in vicinity of the side 2-D. The amplifying circuit AMP has a plurality of the integration circuits described above with reference to FIG. 11. A signal change caused at the interconnected signal lines is transmitted to each integration circuit, and an output of the integration circuit is supplied to the detection circuit DET as the detection signal Rx in the magnetic field touch detection. In the case of FIG. 32, a magnetic field detection coil is formed of the parallely-interconnected signal lines SL(n−6) and SL(n−5) and the parallely-interconnected signal lines SL(n−2) and SL(n−1). And, a magnetic field detection coil is formed of the parallely-interconnected signal lines SL(n−4) and SL(n−3) and the parallely-interconnected signal lines SL(n+2) and SL(n+3), and a magnetic field detection coil is formed of the parallely-interconnected signal lines SL(n) and SL(n+1) and the parallely-interconnected signal lines SL(n+6) and SL(n+7).

In the case of magnetic field touch detection, a magnetic field is generated by a magnetic field generating coil formed of drive electrodes in the magnetic field generating period TCG (FIG. 29). When the pen is present in vicinity of the magnetic field generating coil generating the magnetic field, the capacitive element C in the pen is charged. In the magnetic field detection period TDT (FIG. 29) following the magnetic field generating period TCG, a magnetic field from the pen is detected by a magnetic field detection coil formed of signal lines, and is transmitted to the amplifying circuit AMP. Based on the detection signal Rx from the amplifying circuit AMP, the detection circuit DET detects the presence of the pen and/or the handwriting pressure.

According to the third embodiment, a plurality of signal lines are connected in parallel with each other in the magnetic field touch detection. However, the invention is not limited to this example, and one signal line may be the winding of a magnetic field detection coil. Nevertheless, by connecting the plurality of signal lines in parallel with each other, the resistance of the magnetic field detection coil can be reduced.

Figure 33:
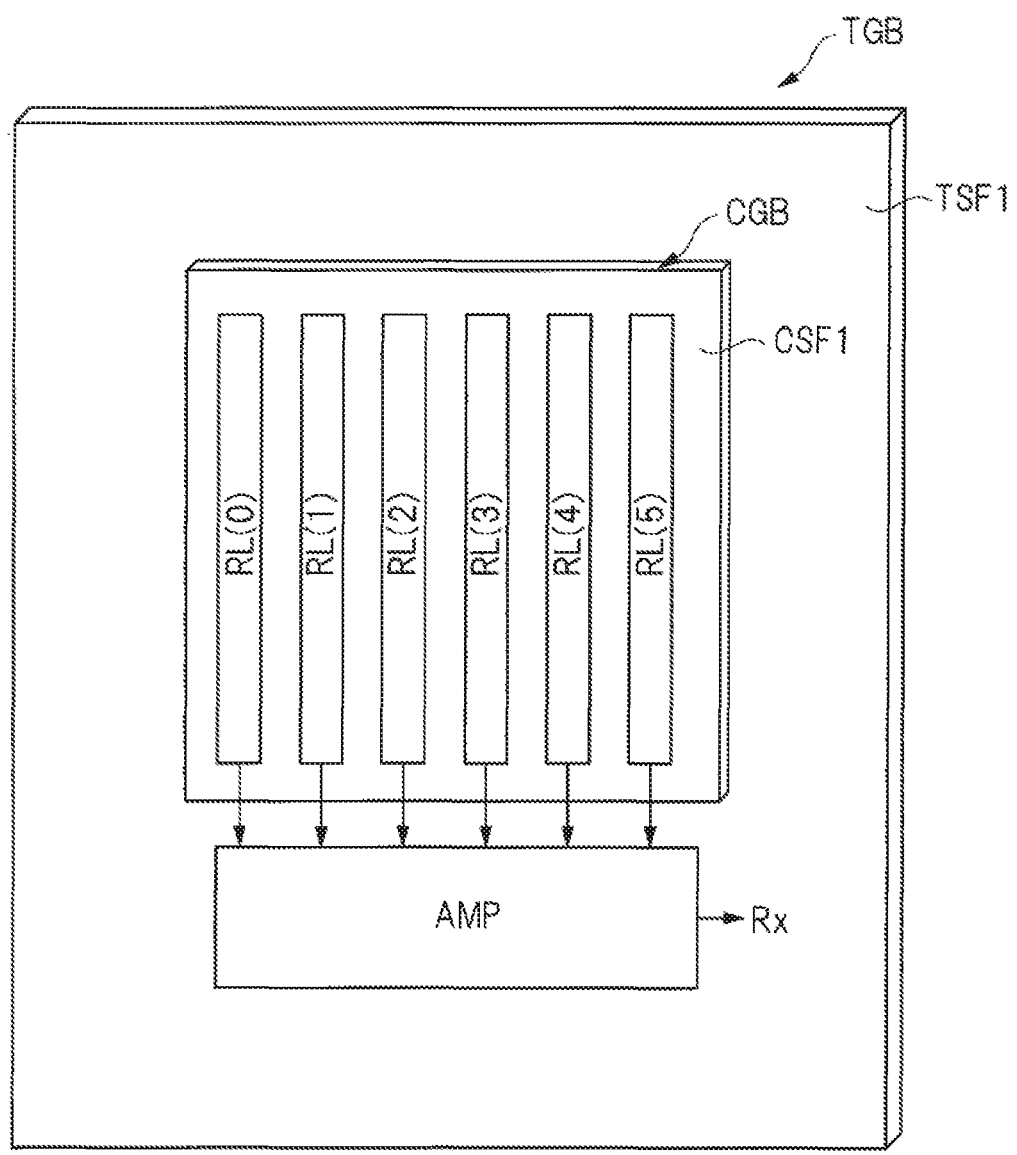
FIG. 33 is a plan view showing arrangement of a detection electrode in the display apparatus according to the third embodiment.

FIG. 33 is a plan view of a configuration of the display apparatus 1 according to the third embodiment. In FIG. 33, reference characters RL(0) to RL(5) indicate detection electrodes arranged on the first main surface CSF1 of the CF glass substrate CGB. Each of the detection electrodes RL(0) to RL(5) is arranged so as to extend in the column direction and to be in parallel with each other in the row direction although not shown in FIG. 31. That is, the detection electrodes RL(0) to RL(5) are arranged on the first main surface CSF1 of the CF glass substrate CGB so that they intersect with the drive electrodes TL(n−2) to TL(n+1) of FIG. 31 but are in parallel with the signal lines SL(n−6) to SL(n+9).

The detection electrodes RL(0) to RL(5) are connected to the amplifying circuit AMP in an area closer to the side 2-D of the display area 2 (FIG. 19). The amplifying circuit AMP has a plurality of the integration circuits described above with reference to FIG. 11. A signal change caused at the detection electrodes RL(0) to RL(5) is transmitted to each integration circuit, and an output of the integration circuit is supplied to the detection circuit DET as the detection signal Rx in the electric field touch detection.

In electric field touch detection, the control signal TSV whose voltage changes periodically is supplied to, for example, the drive electrode TL(n+1) of FIG. 31 as an electric field drive signal. A change in an electric field between the drive electrode TL(n+1) and each of the detection electrodes RL(0) to RL(5) is amplified by the amplifying circuit AMP, and then, is supplied to the detection circuit DET as the detection signal Rx. In this manner, it can be detected whether the finger touches or not, or others.

In the third embodiment, the amplifying circuit that amplifies the signal change in the magnetic field touch detection and the amplifying circuit that amplifies the signal change in the electric field touch detection may be the same as or different from each other.

According to the third embodiment, in the magnetic field touch detection and electric field touch detection, the signal changes are transmitted from the signal lines and detection electrodes to the amplifying circuit AMP in the area closer to the side 2-D of the display area 2. Therefore, the increase in the frame of the areas close to the sides 2-L and 2-R of the display area can be prevented.

According to the third embodiment, a magnetic field and an electric field are generated by using the same drive electrode, and are detected by using the signal line and the detection electrode formed of different conductive layers from each other. The invention is not limited to this example, but the magnetic field and the electric field may be generated by, for example, signal wirings (or electrodes) formed of different conductive layers from each other. For example, a magnetic field is generated by using a plurality of signal wirings arranged so as to extend in the column direction and to be in parallel with each other in the row direction. An electric field may be generated by using signal wirings arranged so as to extend in the row direction and to be in parallel with each other in the column direction. In this case, the magnetic field is detected by using the plurality of signal wirings arranged so as to extend in the row direction and to be in parallel with each other in the column direction. Also, the electric field is detected by using the signal wirings so as to extend in the column direction and to be in parallel with each other in the row direction. In this case, the magnetic field generation and detection are substantially shifted by 90 degrees from the electric field generation and detection. Even in this case, the detection accuracy can be improved since a magnetic field generating coil is different from a magnetic field detection coil.

(Fourth Embodiment)

According to a fourth embodiment, a plurality of magnetic field generating coils are arranged so as to overlap each other when seen in a plan view. By this overlap, an area where a generated magnetic field weakens can be reduced in the magnetic field touch detection, so that occurrence of an area where detection sensitivity is reduced can be prevented. The magnetic field detection coils are also arranged so as to overlap each other when seen in a plan view. An example in which the magnetic field generating coils as well as the magnetic field detection coils overlap each other has been already shown in FIG. 30. Obviously, only the magnetic field generating coils may be arranged so as to overlap each other, or only the magnetic field detection coils may be arranged so as to overlap each other.

Here, a configuration in which magnetic field generating coils overlap each other will be described as an example. The display apparatus 1 of the fourth embodiment is similar to the display apparatus of the first embodiment described above with reference to FIG. 5. A difference is made mainly in the configurations of the switching circuit SC-R, switching drive circuit SC-L, and detection control circuit SR. According to the fourth embodiment, switching control drive circuits SR-R and SR-L are used in place of the switching circuit SC-R, switching drive circuit SC-L, and detection control circuit SR shown in FIG. 5.

FIG. 34 is a circuit diagram showing a configuration of the switching control drive circuit SR-R according to the fourth embodiment. FIG. 35 is a circuit diagram showing a configuration of the switching control drive circuit (drive circuit or first switching circuit) SR-L according to the fourth embodiment. The switching control drive circuit SR-R is arranged along the side 2-R of the display area 2 (FIG. 5) in place of the switching circuit SC-R of FIG. 5, and is connected to the drive electrode in vicinity of the side 2-R. The switching control drive circuit SR-L is arranged along the side 2-L thereof (FIG. 5) in place of the switching drive circuit SC-L and the detection control circuit SR of FIG. 5, and is connected to the drive electrode TL in vicinity of the side 2-L. That is, when seen in a plan view, each of the drive electrodes TL(0) to TL(p) is arranged between the switching control drive circuit SR-R and the switching control drive circuit SR-L.

Each of the switching control drive circuits SR-R and SR-L has a plurality of unit selection circuits and a plurality of unit switching adjusting circuits corresponding to the unit selection circuits. Here, each unit selection circuit corresponds to a drive electrode arranged in an area where a strong magnetic field is generated in the magnetic field touch detection. The unit switching adjusting circuits are controlled by the unit selection circuits corresponding thereto.

In the switching control drive circuit SR-R, a plurality of unit selection circuits USR-R(0) to USR-R(p) and a plurality of unit switching adjusting circuits USC-R(0) to USC-R(p) have the same configuration as each other. Therefore, FIG. 34 shows configurations of unit selection control circuits USR-R(n−2) to USR-R(n+1) corresponding to the drive electrodes TL(n−6) to TL(n+9), and unit switching adjusting circuits USC-R(n−2) to USC-R(n+1) corresponding to these unit selection control circuits.

Also in the switching control drive circuit SR-L, a plurality of unit selection circuits USR-L(0) to USR-L(p) and a plurality of unit switching adjusting circuits USC-L(0) to USC-L(p) have the same configuration as each other. Therefore, FIG. 35 shows configurations of unit selection control circuits USR-L(n−2) to USR-L(n+1) corresponding to the drive electrodes TL(n−6) to TL(n+9), and unit switching adjusting circuits USC-L(n−2) to USC-L(n+1) corresponding to these unit selection control circuits.

According to the first embodiment, as shown in FIG. 9, each of the double-winding magnetic field generating coils is formed by using the drive electrode in the magnetic field touch detection. On the other hand, according to the fourth embodiment, each of magnetic field generating coils is formed by using a one-half-winding drive electrode in the magnetic field touch detection. That is, in the magnetic field touch detection, one magnetic field generating coil is formed by using the drive electrodes TL(n−6), TL(n−5), and TL(n+2) as the winding, and one magnetic field generating coil is formed by using the drive electrodes TL(n), TL(n+1), and TL(n+8) as the winding.

When one magnetic field generating coil is formed by using, for example, the drive electrodes TL(n−6), TL(n−5), and TL(n+2) as the winding, the area sandwiched between these drive electrodes, i.e., the drive electrodes TL(n−4) to TL(n+1) are inside the magnetic field generating coil, so that a strong magnetic field is generated. Similarly, when one magnetic field generating coil is formed by using the drive electrodes TL(n), TL(n+1), and TL(n+8) as the winding, the area sandwiched between these drive electrodes, i.e., the drive electrodes TL(n+2) to TL(n+7) are inside the magnetic field generating coil, so that a strong magnetic field is generated. In this manner, the area where the strong magnetic field is generated can be prevented from being divided.

<<Switching Control Drive Circuit SR-R>>

In the magnetic field touch detection, each of the unit selection control circuits USR-R(0) to USR-R(p) provided to the switching control drive circuit SR-R outputs a magnetic field control signal C-R that specifies an area (drive electrodes) where the strong magnetic field is generated. In electric field touch detection, each of the unit selection control circuits sets the magnetic field control signal C-R so as to have a predetermined voltage. Further, in the display period, each unit selection control circuit outputs a display control signal D-R that specifies a drive electrode to which a display drive signal is to be supplied.

The explanation will be made while exemplifying the unit selection control circuits USR-R(n−1) and USR-R(n) and the unit switching adjusting circuits USC-R(n−1) and USC-R(n) shown in FIG. 34.

In the magnetic field touch detection, the unit selection control circuits USR-R(0) and USR-R(p) sequentially set the magnetic field control signals C-R(0) to C-R(p) to the high level. For example, the magnetic field control signals C-R(n−2), C-R(n−1), C-R(n), and C-R(n+1) are sequentially set to the high level. In the electric filed touch detection, the unit selection control circuits USR-R(0) and USR-R(p) set the magnetic field control signals C-R(0) to C-R(p) to the low level. Further, in the display period, the unit selection control circuits USR-R(0) and USR-R(p) set the display control signals D-R(0) to D-R(p) that specify drive electrodes to which the display drive signals are supplied, to the high level.

<<Configuration of Unit Switching Adjusting Circuit USC-R>>

A configuration of the unit switching adjusting circuit USC-R will be described while the unit switching adjusting circuit USC-R(n−1) is the representative. The unit switching adjusting circuit USC-R(n−1) has fifteenth switches R210 to R215, sixteenth switches R220 to R225, and a signal wiring 6340. Here, the sixteenth switches R220 to R225 are connected between a voltage wiring LV1 and the drive electrodes TL(n−4) to TL(n+1) corresponding to the corresponded unit selection control circuit USR-R(n−1). These sixteenth switches R220 to R225 are controlled to be switched by the display control signal D-R(n−1) output from the corresponding unit selection control circuit USR-R(n−1).

The fifteenth switch R210 is connected between the signal wiring 6340 and the drive electrode TL(n−6) arranged close to the drive electrodes TL(n−4) to TL(n+1) corresponding to the unit selection control circuit USR-R(n−1). The fifteenth switch R211 is connected between the voltage wiring LV2 and the drive electrode TL(n−5) arranged close to the drive electrodes TL(n−4) to TL(n+1) corresponding to the unit selection control circuit USR-R(n−1). Further, the fifteenth switch R212 is connected between the signal wiring 6340 and the drive electrode TL(n+2) arranged close to the drive electrodes TL(n−4) to TL(n+1) corresponding to the unit selection control circuit USR-R(n−1). Still further, one ends of the fifteenth switches R213 to R215 are connected to the drive electrodes TL(n+3) to TL(n+5), respectively, and the other ends thereof are put in a floating state. These fifteenth switches R213 to R215 are provided so that the fifteenth switches are regularity arranged. Therefore, if it is not required to ensure the regularity of the fifteenth switches, the fifteenth switches R213 to R215 may be not provided. The fifteenth switches R210 to R215 are controlled to be switched by the magnetic field control signal C-R(n−1) output from the corresponding unit selection control circuit USR-R(n−1).

The other unit switching adjusting circuits have the same configuration as that of the unit switching adjusting circuit USC-R(n−1). In FIG. 34, the fifteenth switches forming the unit switching adjusting circuit USC-R(n) are indicated as (R210) to (R215), the sixteenth switches are indicated as (R220) to (R225), and the signal wiring is indicated as (6340). Similarly, the fifteenth switches R212 to R215 in the unit switching adjusting circuit USC-R (n−2) are indicated as [R212] to [R215], the sixteenth switches R224 and R225 therein are indicated as [R224] and [R225], and the signal wiring 6340 therein is indicated as [6340]. And, the fifteenth switches R210 and R211 in the unit switching adjusting circuit USC-R (n+1) are indicated as <R210> and <R211>, the sixteenth switches R220 and R221 therein are indicated as <R220> and <R221>, and the signal wiring 6340 therein is indicated as <6340>.

The fifteenth switches R210 to R213 included in the unit switching adjusting circuit corresponding to the unit selection control circuit (such as the unit selection control circuit USR-R(n−1)) are divided into two sets, and two sets are connected to predetermined respective drive electrodes that are arranged so as to sandwich the drive electrodes TL(n−4) to TL(n+1) corresponding to the unit selection control circuit therebetween. That is, the fifteenth switches R210 to R213 are divided into a set of the fifteenth switches R210 and R211 and another set of the fifteenth switches R212 and R213, and the two sets are connected to the predetermined electrode adjacent to the drive electrode TL(n−4) and the predetermined electrode adjacent to the drive electrode TL(n+1).

<<Switching Control Drive Circuit SR-L>>

In the magnetic field touch detection, each of the unit selection control circuits USR-L(0) to USR-L(p) provided to the switching control drive circuit SR-L outputs a magnetic field control signal C-L that specifies an area (drive electrodes) where the strong magnetic field is generated. In electric field touch detection, each of the unit selection control circuits outputs an electric field control signal that specifies a drive electrode to which an electric field drive signal is to be supplied. According to the fourth embodiment, the magnetic field control signal C-L is also used as the electric field control signal. Further, in the display period, each unit selection control circuit outputs a display control signal D-L that specifies a drive electrode to which a display drive signal is to be supplied.

The explanation will be made while exemplifying the unit selection control circuits USR-L(n−1) and USR-L(n) and the unit switching adjusting circuits USC-L(n−1) and USC-L(n) shown in FIG. 35.

In the magnetic field touch detection, the unit selection control circuits USR-L(0) and USR-L(p) sequentially set the magnetic field control signals C-L(0) to C-L(p) to the high level. For example, the magnetic field control signals C-L (n−2), C-L(n−1), C-L(n), and C-L(n+1) are sequentially set to the high level. In the electric filed touch detection, the unit selection control circuits USR-L(0) and USR-L(p) set a magnetic field control signal (such as C-L(0)) corresponding to a drive electrode to which an electric field drive signal is supplied, to the high level, and set the other magnetic field control signals (such as C-L(1) to C-L(p)) to the low level. In electric filed touch detection, when the drive electrodes to which the electric field drive signals are supplied are sequentially specified, for example, the unit selection control circuits USR-L(0) and USR-L(p) set the magnetic field control signals to the high level from C-L(0) to C-L(p). In the display period, the unit selection control circuits USR-L(0) and USR-L(p) set display control signals D-L(0) to D-L(p) to the high level.

<<Configuration of Unit Switching Adjusting Circuit USC-L>>

Next, a configuration of the unit switching adjusting circuit USC-L will be described while the unit switching adjusting circuit USC-L(n−1) shown in FIG. 35 is the representative. The unit switching adjusting circuit USC-L (n−1) has seventeenth switches L210 to L215, eighteenth switches L220 to L225, and a signal wiring 6341. Here, the eighteenth switches L220 to L225 are connected between a voltage wiring LV1 and the drive electrodes TL(n−4) to TL(n+1) corresponding to the corresponded unit selection control circuit USR-L(n−1). These eighteenth switches L220 to L225 are controlled to be switched by the display control signal D-L(n−1) output from the corresponding unit selection control circuit USR-L(n−1).

The seventeenth switch L210 is connected between the signal wiring LL1 and the drive electrode TL(n−6) arranged close to the corresponding drive electrodes TL(n−4) to TL(n+1), and the seventeenth switch L211 is connected between the signal wiring 6341 and the drive electrode TL(n−5) arranged close to the corresponding drive electrodes TL(n−4) to TL(n+1). Further, the seventeenth switch L212 is connected between the signal wiring 6341 and the drive electrode TL(n+2) arranged close to the corresponding drive electrodes TL(n−4) to TL(n+1). Still further, one ends of the seventeenth switches L213 to L215 are connected to the drive electrodes TL(n−3) to TL(n−1), respectively, and the other ends thereof are put in a floating state. These seventeenth switches L213 to L215 are the same as the fifteenth switches R213 to R215 described above, and therefore, the description for them is omitted. The seventeenth switches L210 to L215 are controlled to be switched by the magnetic field control signal C-L(n−1) output from the corresponding unit selection control circuit USR-L(n−1).

The other unit switching adjusting circuits have the same configuration as that of the unit switching adjusting circuit USC-L(n−1). In FIG. 35, the seventeenth switches forming the unit switching adjusting circuit USC-L(n) are indicated as (L210) to (L215), the eighteenth switches are indicated as (L220) to (L225), and the signal wiring is indicated as (6341). Similarly, the seventeenth switches L212 to L215 in the unit switching adjusting circuit USC-L (n−2) are indicated as [L212] to [L215], the eighteenth switches L224 and L225 therein are indicated as [L224] and [L225], and the signal wiring 6341 therein is indicated as [6341]. And, the seventeenth switches L210 and L211 in the unit switching adjusting circuit USC-L (n+1) are indicated as <L210> and <L211>, the eighteenth switches L220 and L221 therein are indicated as <L220> and <L221>, and the signal wiring 6341 therein is indicated as <6341>.

The seventeenth switches L210 to L212 included in the unit switching adjusting circuit corresponding to the unit selection control circuit (such as the unit selection control circuit USR-L(n−1)) are divided into two sets, and two sets are connected to predetermined respective drive electrodes (TL(n−6), TL(n−5), and TL(N+2)) that are arranged so as to sandwich the drive electrodes TL(n−4) to TL(n+1) corresponding to the unit selection control circuit therebetween.

<<Magnetic Field Touch Detection>>

Next, with reference to FIGS. 34 and 35, an operation in magnetic field touch detection will be described. Here, the explanation will be made about a case in which it is detected whether or not the area of the drive electrodes TL(n−4) to TL(n+1) is being touched by the pen or not in the magnetic field touch detection.

In order to detect the touch by the pen in the area of the drive electrodes TL(n−4) to TL(n+1), the unit selection control circuits USR-R(n−1) and USR-L(n−1) corresponding to the drive electrodes TL(n−4) to TL(n+1) output the high-level magnetic field control signals C-R(n−1) and C-L(n−1). At this time, the other unit selection control circuits (e.g., USR-R(n) and USR-L(n)) output the low-level magnetic field control signals (e.g., C-R(n) and C-L(n)). In the magnetic field touch detection, the display control signals D-R(n−1), D-R(n), D-L(n−1) and D-L(n) are set at the low level.

In the magnetic field generating period TCG, the control circuit D-CNT supplies the periodically-changing coil clock signal CLK to the signal wiring LL1. In the magnetic field touch detection period, the ground voltage Vs is supplied to the voltage wiring LV2.

Since the magnetic field control signal C-R(n−1) is at the high level, the fifteenth switches R210 to R212 are switched on in the unit switching adjusting circuit USC-R(n−1). As a result, in the unit switching adjusting circuit USC-R(n−1), the drive electrode TL(n−6) is connected to the signal wring 6340 via the fifteenth switch R210, and the drive electrode TL(n−5) is connected to the voltage wring LV2 via the fifteenth switch R211. In the unit switching adjusting circuit USC-R(n−1), the drive electrode TL(n+2) is connected to the signal wring 6340 via the fifteenth switch R212.

On the other hand, since the magnetic field control signal C-L(n−1) is at the high level, the seventeenth switches L210 to L212 are switched on in the unit switching adjusting circuit USC-L(n−1). As a result, in the unit switching adjusting circuit USC-L(n−1), the drive electrode TL(n−6) is connected to the signal wring LL1 via the seventeenth switch L210, and the drive electrode TL(n−5) is connected to the signal wring 6341 via the seventeenth switch L211. In the unit switching adjusting circuit USC-L(n−1), the drive electrode TL(n+2) is connected to the signal wring 6341 via the seventeenth switch L212.

In this manner, the drive electrodes TL(n−6), TL(n−5) and the drive electrode TL(n+2), which are arranged in parallel with each other across the area from the drive electrodes TL(n−4) to TL(n+1), are connected in series between the voltage wiring LV2 and the signal wiring LL1. As a result, a magnetic field generating coil obtained by winding these drive electrodes one and half (1.5) times as the winding is formed.

In the magnetic field generating period TCG, the coil clock signal CLK is supplied to the signal wiring LL1, and therefore, a magnetic field that changes in accordance with the changes in the coil clock signal CLK is generated in the magnetic field generating coil. If the pen is present in vicinity of the area from the drive electrodes TL(n−4) to TL(n+1), the capacitive element C in the pen is charged by magnetic field energy generated in the magnetic field generating coil.

By the electric charge charged on the capacitive element C in the pen, the pen internal coil generates the magnetic field in the magnetic field detection period TDT. The magnetic field generated by the pen is detected by the magnetic field detection coil formed of the detection electrodes RL(0) to RL(p) and is supplied to the detection circuit DET as the detection signal Rx.

When the magnetic field generating coil is formed of the drive electrodes TL(n−6) and TL(n−5) and the drive electrode TL(n+2), the magnetic field control signal C-R(n) and magnetic field control signal C-L(n) from the unit selection control circuit USR-R(n) and unit selection control circuit USR-L(n) are at the low level, and therefore, the fifteenth switches (R210) to (R215) and the seventeenth switches (L210) to (L215) in the unit switching adjusting circuits USC-R(n) and USC-L(n) are switched off. Therefore, in the unit switching adjusting circuits USC-R(n) and USC-L(n), therefore, the drive electrodes are not connected to the signal wirings (6340) and (6341), the voltage wiring LV2, and the signal wiring LL1, and therefore, the magnetic field generating coil is not formed.

<<Electric Field Touch Detection>>

In electric field touch detection, the unit selection control circuits USR-L(0) to USR-L(p) output the magnetic field control signals C-L(0) to C-L(p) as electric field control signals. For example, a case of selecting the drive electrode TL(n−6) as a drive electrode that generates an electric field will be described as follows.

The unit selection control circuit USR-L(n−1) sets the magnetic field control signal C-L(n−1) to the high level output as an electric field control signal. At this time, the other unit selection control circuits USR-L(0) to USR-L(n−2), and USR-L(n) to USR-L(p) output the low-level magnetic field control signals. The unit selection control circuits USR-R(0) to USR-R(p) output the low-level magnetic field control signals C-R(0) to C-R(p). Note that this period is not the display period, and therefore, the display control signals D-L and D-R are at the low level.

As a result, the fifteenth switches are switched off. At this time, by the high-level magnetic field control signal C-L(n−1), the seventeenth switches L210 to L215 are switched on. Since the seventeenth switch L210 is switched on, the drive electrode TL(n−6) is connected to the signal wiring LL1 via the seventeenth switch L210.

In electric field touch detection, the control circuit D-CNT supplies the control signal TSV, whose voltage changes periodically, to the signal wiring LL1. In this manner, the control signal TSV is supplied to the drive electrode TL(n−6) as a magnetic field drive signal. Since the fifteenth switch is at off, the drive electrode TL(n−6) is put in a floating state, and the magnetic field drive signal is supplied to the drive electrode TL(n−6), so that an electric field that changes in accordance with the magnetic field drive signal is generated.

A change in the electric field between the detection electrodes RL(0) to RL(p) and the drive electrode TL(n−6) is supplied to the detection circuit DET as the detection signal Rx, so that the touch by the finger is detected.

In the display period, for example, the unit selection control circuits USR-R(0) to USR-R(p) and the unit selection control circuits USR-L(0) to USR-L(p) output the high-level display control signals D-R(0) to D-R(p) and the high-level display control signals D-L(0) to D-L(p), respectively. In this manner, the sixteenth switches and eighteenth switches are switched on, so that the drive electrodes TL(0) to TL(p) are connected to the voltage wiring LV1 in vicinity of the side 2-R and the side 2-L in the display area 2. The control circuit D-CNT supplies a display drive voltage to the voltage wiring LV1 in the display period. In this manner, in the display period, the display drive voltage is supplied to the drive electrodes TL(0) to TL(p).

The configurations of coils overlapping each other have been described while exemplifying the magnetic field generating coils. Meanwhile, the magnetic field detection coils may also overlap each other.

The example in which the switching control drive circuits SR-R and SR-L of FIGS. 34 and 35 are used for the liquid crystal display apparatus 1 of FIG. 5 has been described as the fourth embodiment. Meanwhile, the switching control drive circuits SR-R and SR-L may also be used for the liquid crystal display apparatus 1 of FIG. 19. In this case, since the signal lines and the drive electrodes extend in parallel with each other, the signal lines can be connected in parallel to the drive electrodes in touch detection as described in the second embodiment, so that the resistance of the drive electrodes can be further reduced.

FIG. 9 shows the example in which the magnetic field generating coil is formed of the drive electrodes close to each other (e.g., drive electrodes TL(n–6) to TL(n–3)). The invention is not limited to this example. For example, in FIG. 9, one or a plurality of drive electrodes may be sandwiched between the drive electrode (n–5) and the drive electrode (n–4). In this case, the area of the drive electrodes sandwiched between the drive electrode TL(n–5) and the drive electrode TL(n–4) is inside the magnetic field generating coil, and a strong magnetic field is generated in this area. Similarly, FIG. 11 shows the example in which the magnetic field detection coil is formed of the detection electrodes close to each other (e.g., detection electrodes RL(n–3) to RL(n)). The invention is not limited to this example For example, in FIG. 11, one or a plurality of detection electrodes may be sandwiched between the detection electrode (n–2) and the detection electrode (n–1). In this case, the area of the detection electrodes sandwiched between the detection electrode TL(n–2) and the detection electrode TL(n–1) is inside the magnetic field generating coil, and the detection of magnetic field is improved in this area.

FIG. 12 shows the example in which the sixth switches S50 to S53 are formed of the single-pole double-throw switches. Meanwhile, the invention is not limited to this example. Since it is only required to put a detection electrode to which an electric field drive signal is supplied in a floating state in electric field touch detection, the sixth switch may be a single-pole single-throw switch connected between the detection electrode RL and the ground voltage Vs. In this case, the single-pole single-throw switch is switched on in the magnetic field touch detection to connect the detection electrode RL to the ground voltage Vs, and is switched off in electric field touch detection. The fourteenth switch S130 of FIG. 26 is not limited to a single-pole double-throw switch, either, and may be a single-pole single-throw switch.

The TFT glass substrate TGB can be regarded as a first substrate having an area of pixel (pixel area) partitioned by a plurality of signal lines and a plurality of scanning lines. In this case, the CF glass substrate CGB can be regarded as a second substrate opposite to the first substrate. In the magnetic field generating period, for example, a plurality of magnetic field generating coils (first coils) are arranged on the first substrate, as shown in FIG. 9. Each magnetic field generating coil is rectangular when seen in a plan view. Along side of the rectangular magnetic field generating coil is arranged so as to extend in the row direction (first direction) and is in parallel with each other in the column direction (second direction). In magnetic field detection period, a plurality of magnetic field detection coils are arranged on the TFT glass substrate TGB or CF glass substrate CGB so as to intersect with the plurality of magnetic field generating coils. For example, as shown in FIG. 11, each magnetic field detection coil is also rectangular when seen in a plan view, and a long side of the rectangular magnetic field detection coil is arranged so as to extend in the column direction (second direction) and is in parallel with each other in the row direction (first direction).

In the scope of the idea of the present invention, various modified examples and alteration examples could have been easily thought up by those who skilled in the art, and it would be understood that these various modified examples and alteration examples belong to the scope of the present invention.

For example, the ones obtained by appropriate addition, removal, or design-change of the components to/from/into each of the above-described embodiments by those who skilled in the art or by addition, omitting, or condition-change of the step to/from/into each of the above-described embodiments are also within the scope of the present invention as long as they include the concept of the present invention.

For example, the second embodiment has described a case in which the drive electrodes TL(0) to TL(p) and the signal lines SL(0) to SL(p) extend in the column direction and are arranged in parallel with each other in the row direction. However, the row direction and the column direction change depending on the viewpoint. A case in which the drive electrodes TL(0) to TL(p) and the signal lines SL(0) to SL(p) extend in the row direction and are arranged in parallel with each other in the column direction by the change of the viewpoint is also included in the scope of the present invention. A term "parallel" used in the present specification means extensions from one end to the other end without intersecting with each other. Thus, even if one line (or electrode) is inclined partially or entirely with respect to the other line (or electrode), this state is also assumed to be "parallel" in the present specification as long as these lines do not intersect with each other from one end to the other end.

What is claimed is:

1. A display apparatus comprising:
a first substrate and a second substrate with a liquid crystal layer therebetween;
a plurality of common electrodes extending along a first direction;
a pixel array having a plurality of pixel electrodes arranged on an insulating layer, wherein the pixel electrodes are opposite side to the common electrodes;
a plurality of signal lines arranged along each column of the pixel array, each of the signal lines supplying an image signal to a plurality of pixels arranged along the corresponding column;
a first line extending along the second direction so as to be opposite to first ends of the common electrodes and supplied with a first voltage;
a second line extending along the second direction so as to be opposite to the first ends of the common electrodes and supplied with a second voltage different from the first voltage;
a third line extending along the second direction so as to be opposite to the first ends of the common electrodes and supplied with a clock signal;
a first switching circuit arranged on the first substrate, coupled to second ends of the common electrodes, forming a first coil by connecting between at least two common electrodes in a magnetic field detection period and disconnecting between the at least two common electrodes in an electric field detection period;
a second switching circuit configured to couple the first ends of the common electrodes to the first line, to the second line and to the third line, connecting the first coil between the first line and the third line in the magnetic field detection period, connecting the disconnected common electrode to the third line without connecting the disconnected common electrode to the first line in the electric field detection period, and connecting the first ends of the common electrodes to the second line in a display period; and a detection circuit coupled to a second coil which is formed on the second substrate, which is extended along the second direction;

wherein the plurality of common electrodes are arranged in parallel with each other in the pixel array, and wherein an externally-approaching object is detected by using one of the magnetic field and the electric field, and when the externally-approaching object is detected by the magnetic field, a magnetic field from the externally-approaching object is detected by the second coil.

2. The display apparatus according to claim 1, wherein the drive circuit outputs the magnetic field drive signal to the first coil which is coupled between the output of the drive circuit and a first voltage, when the externally-approaching object is detected by using the magnetic field; and wherein the detection circuit detects a signal change at a second coil coupled between the detection circuit and a second voltage in the second coils when the externally-approaching object is detected by using the magnetic field.

3. The display apparatus according to claim 2, wherein the second switching circuit that switches a connection between the first coil and the first voltage in accordance with determination indicating either the externally-approaching object is detected by using the magnetic field or an electric field; and a third switching circuit that switches a connection between the second coil and the second voltage in accordance with determination indicating either the externally-approaching object is detected by using the magnetic field or an electric field, wherein the second switching circuit electrically disconnects the first coil from the first voltage when the externally-approaching object is detected by using the electric field, and the third switching circuit electrically disconnects the second coil from the second voltage when the externally-approaching object is detected by using the electric field, and, when the externally-approaching object is detected by using the electric field, an electric field drive signal is supplied to the common electrodes so that a signal change at wiring in the second coil is detected by the detection circuit.

4. The display apparatus according to claim 1, wherein the first substrate has a first main surface on which the plurality of signal lines and the plurality of drive electrodes are arranged, wherein the second substrate has a first main surface and a second main surface arranged opposite to the first main surface of the first substrate, the second substrate being separated from the first substrate, and wherein the second coil being formed of wirings arranged on the first main surface of the second substrate.

5. The display apparatus according to claim 2, wherein the first substrate has a first main surface on which the plurality of signal lines and the plurality of drive electrodes are arranged; and the second substrate has a first main surface and a second main surface arranged opposite to the first main surface of the first substrate, the second substrate being separated from the first substrate, wherein the second coil being formed of a plurality of wirings arranged on the first main surface of the second substrate.

6. The display apparatus according to claim 5, wherein the plurality of wirings are extended along the second direction and are arranged in parallel in the first direction.

7. The display apparatus according to claim 2, wherein the detection circuit has a plurality of unit detection circuits that detect the signal change at a plurality of second coils.

8. A display apparatus comprising:

a first glass substrate having a first main surface;

a liquid crystal layer whose transmittance changes in accordance with a potential;

a second glass substrate having a first main surface and a second main surface opposite to the first main surface of the first glass substrate across the liquid crystal layer;

a plurality of signal lines arranged on the first main surface of the first glass substrate so as to be in parallel with each other on the first main surface of the first glass substrate when seen in a plan view and so as to extend in a first direction;

a plurality of common electrodes;

a plurality of pixel electrodes arranged on an insulating layer, wherein the pixel electrodes are opposite to the common electrodes;

a plurality of detection electrodes arranged on the first main surface of the second glass substrate so as to be in parallel with each other on the first main surface of the second glass substrate when seen in a plan view and so as to intersect with the plurality of common electrodes;

a first line extending along the second direction so as to be opposite to first ends of the common electrodes and supplied with a first voltage;

a second line extending along the second direction so as to be opposite to the first ends of the common electrodes and supplied with a second voltage different from the first voltage;

a third line extending along the second direction so as to be opposite to the first ends of the common electrodes and supplied with a clock signal;

a first switching circuit coupled to second ends of the common electrodes, forming a first coil by connecting between at least two common electrodes in a magnetic field detection period and disconnecting between the at least two common electrodes in an electric field detection period;

a second switching circuit configured to couple the first ends of the common electrodes to the first line, to the second line and to the third line, connecting the first coil between the first line and the third line in the magnetic field detection period, connecting the disconnected common electrode to the third line without connecting the disconnected common electrode to the first line in the electric field detection period, and connecting the first ends of the common electrodes to the second line in a display period; and a detection circuit that, when an externally-approaching object is detected by using a magnetic field, detects a signal change at a second coil formed of a plurality of first detection electrodes among the plurality of detection electrodes.

9. The display apparatus according to claim 8, wherein the first switching circuit that controls a connection between the first coil and a first voltage in accordance with determination indicating either the externally-approaching object is detected by using a magnetic field or an electric field; and the second switching circuit that controls a connection between the second coil and a second voltage in accordance with determination indicating either the externally-approaching object is detected by using a magnetic field or an electric field, wherein, when the externally-approaching object is detected by using the magnetic field, the first coil and the second coil are connected to the first voltage and the second voltage by the first switching circuit and the second switching circuit, and a drive signal for generating the magnetic field is supplied from the drive circuit to the first coil, and, when the externally-approaching object is detected by using the electric field, the first coil and the second coil are electrically insulated from the first voltage and the second voltage by the first switching circuit and the second switching circuit, and a drive signal for generating the electric field is supplied from the drive circuit to the first coil.

10. A display apparatus comprising:

a first substrate having a plurality of signal lines, a plurality of scanning lines, and a pixel area partitioned by the plurality of signal lines and the plurality of scanning lines;

a second substrate opposite to the first substrate;

a plurality of rectangular first coils whose long side includes common electrode and is arranged on the first substrate so as to extend in a first direction and so as to be in parallel with a second direction crossing to the first direction, the plurality of rectangular first coils generating a magnetic field in a magnetic field detection period; and a plurality of rectangular second coils arranged on the first substrate or the second substrate so as to intersect with the plurality of first coils, the plurality of rectangular second coils each detecting the magnetic field in the magnetic field detection period, a first line extending along the second direction so as to be opposite to first ends of the common electrodes and supplied with a first voltage;

a second line extending along the second direction so as to be opposite to the first ends of the common electrodes and supplied with a second voltage different from the first voltage;

a third line extending along the second direction so as to be opposite to the first ends of the common electrodes and supplied with a clock signal;

a switching circuit configured to couple the first ends of the common electrodes to the first line, to the second line and to the third line, connecting a rectangular first coil between the first line and the third line in the magnetic field detection period, connecting the common electrode in the rectangular first coil to the third line without connecting the rectangular first coil between the first line and the third line in the electric field detection period, and connecting the common electrodes to the second line in a display period; and wherein a plurality of pixel electrodes to display an image is arranged in the pixel area and are opposite to the common electrode.

* * * * *